(12) United States Patent
Hasegawa et al.

(10) Patent No.: US 6,536,566 B2
(45) Date of Patent: Mar. 25, 2003

(54) VIBRATION-DAMPING DEVICE FOR VEHICLES

(75) Inventors: Koichi Hasegawa, Kasugai (JP); Rentaro Kato, Kasugai (JP); Yoshinori Yasumoto, Kasugai (JP); Masaaki Hamada, Kounan (JP); Yutaka Tazuke, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/796,087

(22) Filed: Feb. 27, 2001

(65) Prior Publication Data

US 2001/0032764 A1 Oct. 25, 2001

(30) Foreign Application Priority Data

| Mar. 1, 2000 | (JP) | 2000-055464 |
| Mar. 1, 2000 | (JP) | 2000-055470 |
| Mar. 1, 2000 | (JP) | 2000-055478 |
| Mar. 1, 2000 | (JP) | 2000-055481 |
| Mar. 1, 2000 | (JP) | 2000-056555 |
| Feb. 28, 2000 | (JP) | 2000-052621 |

(51) Int. Cl.$^7$ ................................................. F16F 15/02
(52) U.S. Cl. ......................................................... 188/378
(58) Field of Search .......................... 267/141.1, 141.2, 267/152, 153, 281, 293; 188/378, 379; 248/562, 636, 638; 464/180

(56) References Cited

U.S. PATENT DOCUMENTS

| 2,714,161 A | | 7/1955 | Featherstun |
| 3,612,222 A | | 10/1971 | Minor |
| 4,706,788 A | * | 11/1987 | Inman et al. ............... 188/378 |
| 5,326,324 A | * | 7/1994 | Hamada ..................... 464/180 |
| 5,671,909 A | * | 9/1997 | Hamada et al. ........... 267/141.1 |

FOREIGN PATENT DOCUMENTS

| JP | 125878 | 8/1938 |
| JP | 57-52305 | 3/1982 |
| JP | 64-42591 | 3/1989 |
| JP | 3-86227 | 8/1991 |
| JP | 4-46246 | 4/1992 |
| JP | 9-329182 | 12/1997 |
| WO | WO 00/14429 | 3/2000 |

* cited by examiner

Primary Examiner—Christopher P. Schwartz
(74) Attorney, Agent, or Firm—Beyer Weaver & Thomas, LLP

(57) ABSTRACT

A vibration-damping device comprising: at least one rigid housing member fixedly disposed in a vibrative member; and a plurality of independent mass members disposed non-adhesively and independently in the at least one housing member such that each of the plurality of independent mass members is opposed to the at least one housing member with a given spacing therebetween in a vibration input direction, and is displaceable relative to the at least one housing member. The each independent mass member is independently displaced relative to the at least one housing member so that the independent mass member and the housing member are brought into elastic impact against each other at their respective abutting surfaces which are opposed to each other in the vibration input direction.

58 Claims, 24 Drawing Sheets

VIBRATION-DAMPING DEVICE FOR VEHICLES

This application is based on Japanese Patent Applications No. 2000-52621 filed Feb. 28, 2000 and Nos. 2000-55464, 2000-55470, 2000-55478, 2000-55481 and 2000-56555 filed Mar. 1, 2000, the contents of which are incorporated hereinto by reference.

BACKGROUND OF THE INVENTION

1. Field of the Invention

The present invention generally relates to a vibration damper installed in a vibrative member of a vehicle, for reducing vibration of the vibrative member. More particularly, the present invention is concerned with such a vibration damper which is novel in construction and which is suitably applicable to the vibrative members such as suspension arms, sub flames, body panels, mounting brackets, and vibrative members used in an engine unit and an exhaustion system, for exhibiting an excellent vibration-damping effect with respect to vibrations of these vibrative members.

2. Description of the Related Art

As vibration-damping means for damping or reducing vibration excited in vehicles such as an automotive vehicle, there are known (a) a mass damper wherein a mass member is fixed to a vibrative member, (b) a dynamic damper wherein a mass member is supported by and connected to the vibrative member via a spring member and (c) a damping material which is a sheet-like elastic member and secured to the vibrative member. However, these conventional devices suffer from various potential problems. For example, (a) the mass damper and (b) the dynamic damper both require a relatively large mass of the mass member, and exhibit desired vibration-damping effect only to significantly narrow frequency ranges. (c) The damping material suffers from difficulty in stably exhibiting a desired damping effect, since the damping effect of the damping material is likely to vary depending upon the ambient temperature.

The present assignee has been disclosed in International Publication WO 00/14429 a novel vibration damper used for an automotive vehicle, which includes a housing member having an inner space and fixed to the vibrative member, and an independent mass member which is accommodated in an inner space of the housing member without being bonded to the housing member, so that the independent mass member is displaceable or movable relative to the housing member, while being independent of the housing member. In the disclosed vibration damper, the independent mass member is moved into and impact the housing member, upon application of a vibrational load to the damper, whereby the vibration of the vibrative body is effectively reduced or absorbed based on loss or dissipation of energy caused by sliding friction generated between the abutting surfaces of the mass member and the housing member and caused by collision or impact of the independent mass member against the housing member. This proposed vibration damper is capable of exhibiting a high damping effect over a sufficiently wide frequency range of frequency of input vibrations, while having a relatively small mass of the mass member.

In order to stably establish a desired damping effect of the vibration damper disclosed in the above-indicated document, it is required to precisely control parameters including a distance of spacing or gap between the abutting surface of the independent mass member and the abutting surface of the housing member, and coefficient of restitution of these abutting surfaces, since the damping effects of the disclosed vibration damper depend upon these parameters. The independent mass member is further required to make a bouncing, sliding or rolling motions. Namely, the independent mass member is required to repeatedly impact and bounce off the housing member so as to repeatedly apply impact energy to the housing member, upon application of the vibrational load to the independent mass member.

As a result of intensive studies in an attempted to further developing the vibration damper as described above, the inventors of the present invention have found that a vibration damper having a housing member and a plurality of independent mass members accommodated in the housing member and comprehensively tuned, exhibits a damping effect which is different from that exhibited by the vibration damper wherein the suitably tuned single mass member is accommodated in the housing member. In particular, a difference in the vibration-damping effects have still found between the vibration damper having the plurality of independent mass member and the vibration damper having a single mass member, even if the total mass of the plurality of mass members is made equal to the mass of the single mass member. This difference may stem from that bouncing or restituting characteristics of each of the plurality of mass members are different from those of the single mass member.

SUMMARY OF THE INVENTION

It is therefore a first object of this invention to provide an improved vibration-damping device for vehicles, which is capable of exhibiting a desired damping effect with high efficiency.

It is a second object of this invention to provide a method of producing the vibration-damping device of this invention.

The above first object may be attained according to the following modes (1)–(34) and (37)–(44) of the invention, and the second object may be attained according to the following modes (35) and (36) of the invention. Each of these modes of the invention is numbered like the appended claims and depends from the other mode or modes, where appropriate, to indicate possible combinations of elements or technical features of the invention. It is to be understood that the present invention is not limited to those modes of the invention and combinations of the technical features, but may otherwise be recognized based on the thought of the present invention that disclosed in the whole specification and drawings or that may be recognized by those skilled in the art in the light of the disclosure in the whole specification and drawings.

(1) A vibration-damping device for damping vibrations of a vibrative member of a vehicle, comprising: (a) at least one rigid housing member fixedly disposed in the vibrative member; and (b) a plurality of independent mass members disposed non-adhesively and independently in the at least one housing member such that each of the plurality of independent mass members is opposed to the housing member with a given spacing therebetween in a vibration input direction, and is displaceable relative to the housing member, the each of said plurality of independent mass members being independently displaced relative to said housing member so that the independent mass member and the housing member are brought into elastic impact against each other at respective abutting surfaces thereof which are opposed to each other in the vibration input direction.

In the vibration-damping device constructed according to the above mode (1) of the present invention, the plurality of independent mass members are comprehensively tuned. Namely, a ground total of the masses of the plurality of independent mass member is suitably tuned or determined for assuring desired damping characteristics of the present vibration-damping device. Consequently, the required mass of each of the plurality of independent mass members is made relatively smaller, facilitating the relative movement between the each independent mass member and the housing member, upon application of a vibrational load to the damping device. Namely, bouncing movement of the each independent mass member is effectively induced. In this condition, the independent mass members are effectively forced to move into and impact the housing member, whereby the vibration-damping device can exhibit a desired vibration-damping effect with high efficiency. It should be noted that the housing member may be provided as a box-like member or the like, which is made of a rigid material such as metal and which is formed independently of and fixedly attached to a vibrative member as a subject member whose vibrations to be damped. It may be possible to provide the housing member by utilizing an interior space of a hollow portion of the vibrative member, or alternatively by utilizing partially the vibrative member as a part of the housing member.

(2) A vibration-damping device according to the above-indicated mode (1), wherein a total mass of the plurality of independent mass members is held within a range of 5–10% of a mass of the vibrative member.

Namely, if the total mass of the plurality of independent mass members is smaller than 5% of the mass of the vibrative member, the vibration-damping device possibly suffers from difficulty in exhibiting a desired damping effect, and if the total mass of the plurality of independent mass members is larger than 10% of the mass of the vibrative member, the vibration-damping device suffers from a problem of increase in the overall weight of the device.

(3) A vibration-damping device according to the above-indicated mode (1) or (2), wherein the each of the plurality of independent mass members has a mass within a range of 10–1000 g.

Namely, if the mass of the each independent mass member is smaller than 10 g, the vibration-damping device may suffer from deterioration of its damping effect owing to impact of the independent mass members against the housing member. If the mass of the independent mass member is larger than 1000 g, the independent mass is less likely to make the bouncing movement or displacement thereof, upon application of the vibrational load to the vibration-damping device. Preferably, the each independent mass member has a mass of 10–300 g, more preferably 10–100 g, yet more preferably 10–50 g. This arrangement permits favorable bouncing movement or displacement of the each independent mass member relative to the housing member.

(4) A vibration-damping device according to any one of the above-indicated modes (1)–(3), wherein the plurality of independent mass members comprises at least two of the independent mass members, the at least two of the independent mass members being identical with each other.

In this mode (4), the at least two independent mass members have the same characteristics as for the displacements thereof relative to the housing member. This arrangement permits a high capacity of tuning of the vibration-damping device with respect to a specific frequency vibration, resulting in a significantly improved damping effect of the vibration-damping device with respect to vibrations in a predetermined frequency band.

(5) A vibration-damping device according to any one of the above-indicated modes (1)–(4), wherein at least one of the plurality of independent mass members is tuned differently from the other independent mass members.

In this mode (5), the vibration-damping device can exhibit an excellent vibration-damping effect with respect to the input vibrations having different frequency bands, or over a relatively wider frequency range. Different tuning of the independent mass members may be effected by varying properties of the independent mass members, in terms of a mass and a coefficient of restitution with respect to the housing member, or by varying the spacing between the abutting surfaces of the independent mass members and the housing member.

(6) A vibration-damping device according to any one of the above-indicated modes (1)–(5), wherein at least one of the plurality of independent mass members includes a mass body made of a rigid material.

Namely, each of the plurality of independent mass members may be entirely formed of a rubber elastic body, a synthetic resin material, or a foamed body of the rubber or synthetic resin materials. In order to reinforce the independent mass member, it may be possible to bond a rigid members made of metal to the independent mass member formed of the above-indicated elastic body or the foamed body. According to the above mode (6), the independent mass member includes the mass body formed of rigid materials having higher gravity such as metal or stones, whereby the independent mass member is made compact in size and has a sufficiently large mass thereof. This arrangement results in a decrease in overall size of the vibration-damping device. In the case where the independent mass member includes the mass body formed of the rigid materials, at least one of the abutting surfaces of the independent mass member and the housing member may be formed of an elastic layer made of a rubber elastic body or a synthetic resin material.

(7) A vibration-damping device according to any one of the above-indicated modes (1)–(6), wherein the at least one housing member includes a space for accommodating at least one of the plurality of independent mass members, which space is separated from the external space.

This arrangement is effective to prevent entrance of contaminants or water between the abutting surfaces of the independent mass member and the housing member, whereby the vibration damping effect according to this mode (7) can exhibit a desired damping effect with high stability, leading to improved reliability and durability of the device.

The construction of the housing member is not particularly limited. The portion or region of the housing member used as the space for accommodating the at least one of the plurality of independent mass members (hereinafter referred to as the "mass member accommodating space") is not particularly limited, but may be determined while taking into account the configuration and construction of the housing, vibration mode of the input vibrations, as well as the configuration and construction of the independent mass members as employed. In the case of the plate-shaped housing member, for example, a plurality of bores or through holes serving as the mass member accommodation spaces may be formed such that the through holes are independent of each other and are juxtaposed with each other in the width direction of the housing member. In the case of the thick-walled housing member, such a plurality of bore or through holes serving as the mass member accommodation spaces can be formed in series in the wall thickness direction of the housing member. In the case of the longitudinal housing member, the plurality of bores each serving as the mass member accommodation space may be arranged in series in the longitudinal direction of the housing member, or alternatively at least one through hole extending through the housing member in the longitudinal direction is formed as the mass member accommodation space and receives a plurality of the independent mass members.

(8) A vibration-damping device according to any one of the above-indicated modes (1)–(7), wherein the at least one housing member is formed with a plurality of through holes which are independent of each other and extend parallel to each other, each of the through holes being adapted to accommodate at least one of the plurality of independent mass members.

In this mode (8), the housing member facilitates arrangement of the plurality of independent mass member. This housing member can be effectively formed by extrusion of an aluminum alloy. Namely, an extruded product of the aluminum alloy has the plurality of through holes continuously extending in the protruding direction. The extruded product is cut off by a suitable length, thereby providing the housing member.

(9) A vibration-damping device according to any one of the above-indicated modes (1)–(8), wherein the at least one housing member has a supporting rod, and at least one of the plurality of independent mass members has an annular block shape and is disposed radially outwardly of the supporting rod of the housing member, the at least one independent mass member being brought into elastic impact against an outer circumferential surface of the supporting rod, upon application of a vibrational load.

This arrangement eliminates a need for the rigid housing member disposed outwardly of the independent mass member, leading to reduction in the overall size of the vibration-damping device, while maintaining a sufficient mass of the independent mass member. In addition, the abutting surfaces of the housing member (i.e., the supporting rod) and the abutting surface of independent mass member (i.e., the annular block) can be made cylindrical, whereby the vibration damping device can exhibit high damping effect with respect to vibrations applied in any radial directions perpendicular to an axis of the supporting rod.

(10) A vibration-damping device according to any one of the above modes (1)–(9), wherein a plurality of the independent mass members are connected with each other via a flexible connecting member such that the plurality of the independent mass members are separately displaceable relative to each other, and the at least one housing member having a plurality of accommodation spaces which are substantially continuous with each other and cooperate to accommodate the plurality of the independent mass members.

According to the present invention, the plurality of independent mass members are only required to be physically independent of the housing member, and to be substantially displaceable or movable separate from each other, when the vibrational loads are applied to the vibration-damping device. The arrangement according to the above mode (10) allows easier handing of the plurality of independent mass members. The plurality of independent mass members flexibly connected with each other may be installed in accommodation spaces formed in the housing member, which are substantially continuous with each other and cooperate to accommodate the plurality of said independent mass members. This arrangement facilitates manufacture of the desired vibration-damping device. The appropriately selection of a material for the connecting member is effective to stabilize a state of the displacement of each of the plurality of independent mass members and a resultant state of impact of the each independent mass member against the housing member.

(11) A vibration-damping device according to any one of the above-indicated mode (1)–(10), wherein at least one of the abutting surfaces of the housing and the independent mass members has a Shore D hardness of 80 or lower, as measured in accordance with ASTM method D-2240.

Namely, hardness or other properties of the abutting surfaces of the independent mass member and the housing member may preferably be held within a given range, in order to assure an improved damping effect of the present vibration-damping device and a reduced impact noise upon impact of the abutting surfaces of the independent mass member and the housing member. In this mode (11), the abutting surfaces are arranged to have a Shore D hardness of 80 or lower, more preferably, within a range of 20–40. For the same technical attempt, the abutting surfaces of the independent mass member and the housing member may preferably be arranged to have a modulus of elasticity within a range of $1-10^4$ MPa, more preferably, $1-10^3$ MPa, and a loss tangent is not less than $10^{31\ 3}$, more preferably within a range of 0.01–10, preferably.

(12) A vibration-damping device according to any one of the above-indicated modes (1)–(11), wherein the at least one housing member is formed of a rigid material having a modulus of elasticity of $5\times10^3$ MPa or more.

It is noted that a high damping effect of the device and a reduced impact noise upon impact of the independent mass member against the housing member may be achieved by suitably controlling coefficient of restitution between the independent mass member and the housing member. In this respect, the housing member may be formed of a rigid material having a modulus of elasticity of $5\times10^3$ MPa or more. For instance, the housing member is desirably formed of a metallic material such as iron. Alternatively, the housing member is formed of rigid materials having a relatively low rigidity, e.g., a rigid resin material having a modulus of elasticity within a range of $5\times10^3-5\times10^4$ MPa. The use of the housing member formed of the rigid materials having a relatively low rigidity, is effective to minimize the impact noise and to improve damping characteristics of the vibration-damping device with respect to a low frequency band. In the case where the housing member has a relatively low rigidity, the abutting surfaces may be suitably arranged to have a modulus of elasticity which is made smaller than that of the housing member. More preferably, the modulus of elasticity of the abutting surfaces is held within a range of 1–100 MPa. This arrangement permits a desired strength and durability of the housing member, and an improved damping effect of the vibration-damping device with respect to low frequency vibrations, for example.

(13) A vibration-damping device according to any one of the above-indicated modes (1)–(12), wherein the given spacing between the abutting surface of the each of the plurality of independent mass member and the abutting surface of the at least one housing member has a distance within a range of 0.05–0.8 mm, and the each independent mass member may be reciprocally movable by a distance of 0.1–1.6 mm between at least two abutting surfaces of the housing member which are opposed to each other in the vibration input direction, with the independent mass member therebetween.

In this mode (13), the each independent mass member is brought into elastic impact at its both sides, which are opposed to each other in the vibration input direction, against the respective abutting surfaces of the housing member which are opposed to each other with the independent mass member therebetween in the vibration input direction. In particular, the distance of the reciprocal movement of the independent mass member between the abutting surfaces of the housing member is determined within a range of 0.1–1.6 mm, whereby the vibration-damping device can exhibit high damping effect with respect to high frequency vibrations over the wide frequency range, which vibrations are likely to be excited in the vehicles and desired to be damped.

It should be noted that the configuration and the structure of the independent mass member are not particularly limited, but may be suitably determined taking into account characteristics of a location to which the vibration damping device is fixed, and the configuration of the housing member.

(14) A vibration-damping device according to any one of the above-indicated modes (1)–(13), wherein at least one of the plurality of independent mass members has a flat-plate shape, and the at least one housing member includes an accommodation space for accommodating the flat-plate shaped independent mass member, the flat-plate shaped independent mass member having opposite surfaces thereof which are opposed to each other in a thickness direction thereof, and which are opposed to respective portions of an inner surface of the housing member in the vibration input direction, at least one of each of the opposite major surfaces of the flat-plate shaped independent mass member and the corresponding opposite portion of the inner surface of the housing member including a partially protruding portion having a plane protruding end face which serves as the abutting surface.

Namely, intensive analysis of the present inventor has revealed that the flat-plate shaped independent mass member is likely to excite its bouncing movement or displacement relative to the housing member, whereby the vibration-damping device using the flat-plate shaped independent mass members can effectively exhibit an excellent damping effect based on impact of the independent mass members against the at least one housing member. In addition, the presence of the partially protruding portions formed on at least one of the mutually opposite surfaces of the independent mass member and the housing member causes partial impacts of the mutually opposite surfaces of the independent mass member and the housing member. This arrangement facilitates the bouncing movement or displacement of the independent mass member, resulting in further improved damping effect of the vibration-damping device. While the technical reasons for this improvement of the damping effect have not yet been revealed, it may be considered as follow: The each flat-plate shaped mass member installed in position with its opposite major surfaces opposed to each other in the vibration input direction, has a higher weight distribution in the vibration input direction, in comparison with that of the spherical mass, leading to difficulty in assuring the bouncing movement of the independent mass member with a horizontal attitude with respect to the vibration input direction. Namely, the independent mass member is likely to make a slight displacement about its center axis in the width direction thereof and a rolling displacement about its center axis in the longitudinal direction. Thus, the flat-plate shaped independent mass member is likely to be displaceable or movable upon application of the vibrational load.

The partially protruding portion may be formed on any one of the mutually opposite surfaces of the independent mass member and the housing member. The height, number, configuration, size or other features of the partially protruding portion are not particularly limited, but may be determined, taking into account the configuration, size and mass of the independent mass member, so that the independent mass member and the housing member are brought into impact against each other only at the partially protruding portion formed thereon. A material for forming the partially protruding portion is not particularly limited. For instance, the partially protruding portion may be made of elastic materials such as a rubber elastic body and a synthetic resin material, or alternatively may be made of rigid materials such as metal. In the case where the partially protruding portion is made of a rigid material, at least one of the protruding end face of the partially protruding portion and the corresponding abutting surface on which the partially protruding portion is brought into impact, may be covered with an elastic layer, e.g., a rubber elastic body layer.

(15) A vibration-damping device according to the above-indicated mode (14), wherein the flat-plate shaped independent mass member includes a flat-plate shaped mass body made of metal and having opposite plane surfaces which are opposed to each other in a thickness direction thereof, and which are opposed to respective portions of the inner surface of the housing member in the vibration input direction, and an elastic layer formed on and secured to a surface of the flag-plate shaped mass body, the partially protruding portion being formed of the elastic layer.

In this mode (15), the use of the metallic flat-plate shaped mass body permits a sufficiently high gravity of the independent mass member with ease. Further, the presence of the partially protruding portion formed of the elastic layer can assure the partial impact of the independent mass member against the housing member. The elastic layer may be made of a rubber material. For instance, the elastic layer may be formed on and secured to the mass body, upon vulcanization of a rubber material for forming the elastic layer within a mold for forming the elastic layer, for example. Alternatively, the elastic layer may be fixedly formed by coating a liquid rubber on the surface of the mass body. Further, the elastic layer may also be formed as an attachment in the form of a cap, a ring, or the like, which is removably inserted onto the outer surface of the mass body. Since the partially protruding portion is formed on the side of the independent mass member, the independent mass member and the housing member may be impacted against each other with a stabilized abutting surface area, in comparison with the partially protruding portion which is formed on the side of the housing member.

(16) A vibration-damping device according to the above-indicated mode (14) or (15), wherein the flat-plate shaped independent mass member having a rectangular shape, and including the partially protruding portions formed at longitudinally opposite end portions thereof, respectively.

In this mode (16), the rectangular shaped independent mass member is brought into impact against the housing member at its longitudinally opposite end portions. This arrangement is effective to induce the bouncing displacement of the independent mass member relative to the housing member upon application of the vibrational load to the device. It may be possible that the partially protruding portions are formed on the corresponding portions of the inner surface of the housing member, instead of on the longitudinally opposite sides of the independent mass member.

In the above-indicated modes (15) and (16), the partially protruding portion may be formed on one or both of the opposite surfaces of the independent mass member. In the case where the partially protruding portion is formed on one of the opposite surfaces of the independent mass member, the partially protruding portion preferably be formed on the vertically lower one of the opposite surfaces, which is held in contact with the housing member due to the gravity acting thereon in the static state of the device.

(17) A vibration-damping device according to any one of the above-indicated modes (14)–(16), wherein the opposite surfaces of the flat-plate shaped independent mass member include partially protruding portions, respectively.

In this mode (17), the independent mass member impact via their partially protruding portions against the housing member, in both opposite surfaces thereof which are opposed to each other in the vibration input direction. This arrangement further induces the bouncing displacement of the independent mass member relative to he housing member, whereby the vibration damping device can exhibit further improved damping effect based on the impact of the independent mass member against the housing member.

(18) A vibration-damping device according to any one of the above-indicated modes (1)–(17), wherein at least one of the plurality of independent mass member includes at least one abutting projection in the form of a projection or a ridge, which is formed at a surface thereof which are opposed to the housing member in the vibration input direction, the at least one abutting projection being made of an elastic material, protruding toward the housing member in the vibration input direction, and having a protruding end portion serving as the abutting surface of the independent mass member.

In this mode (18), the abutting surface of the independent mass member can be provided by the abutting projection that is made of an elastic material and has a relatively large free surface for deformation. This arrangement permits low dynamic spring characteristics of the abutting surface of the independent mass member, whereby resonance frequency of the bouncing movement of the independent mass member can be tuned to a low frequency band. Owing to the resonance of the independent mass member, the independent mass member can provide its bouncing displacement and repeatedly impacted against the housing member upon application of the low frequency vibrations, even if the applied vibration energy is relatively small. Thus, the vibration-damping device according to the present mode (18) of the invention can exhibit high damping effect even for the low frequency vibration.

Preferably, the abutting projection may be formed of an elastic material and has a Shore D hardness of 80 or lower, more preferably within a range of 20–40 as measured in accordance with ASTM method D-2240. The configuration of the abutting projection may be suitably determined, taking into account the configuration of the independent mass member and the desired elasticity of the abutting projection. For instance, the abutting projection may be a straight or curved ridge extending continuously or discontinuously in a desired direction, or alternatively may be a plurality of projections which are independent with each other. The abutting projection is hopefully compressively deformed upon abutting contact with the housing member, leading to high durability of the abutting projection.

The size, number, material and other features of the abutting projection are not particularly limited, but may be suitably determined depending upon the mass of the independent mass member and required vibration damping characteristics of the vibration damping device, while taking into account required vibration damping effects and durability of the elements.

(19) A vibration-damping device according to the above-indicated mode (18), wherein the at least one abutting projection has a height within a range of 0.5–1.0 mm and a width within a range of 1.0–3.0 mm.

(20) A vibration-damping device according to the above-indicated mode (18) or (19), wherein the protruding end portion of the at least one abutting projection has a tapered shape.

(21) A vibration-damping device according to any one of the above-indicated modes (18)–(20), wherein the at least one independent mass member is a longitudinally extended member, and the abutting projection is a ridge formed on the outer circumferential surface of the independent mass member and continuously extending in a circumferential direction of the independent mass member.

In the above-indicated modes (18)–(21), each of the plurality of independent mass members may be entirely formed of a rubber elastic body, a synthetic resin material, or a foamed body of the rubber or synthetic resin materials. In order to reinforce the independent mass member, it may be possible to bond a rigid members made of metal to the independent mass member formed of the above-indicated elastic body or the foamed body. In the case where the independent mass member is formed of the elastic material, the abutting projection is integrally formed with the independent mass member, preferably. This arrangement permits a simple construction and improved manufacturing efficiency of the independent mass member. Alternatively, the independent mass member includes a mass body formed of a rigid material having a higher gravity such as metal or stones.

(22) A vibration-damping device according to any one of the above-indicated modes (18)–(21), wherein the at least one independent mass member includes a rigid mass body, the abutting projection formed of an elastic material being formed on an outer circumferential surface of the rigid mass body.

This arrangement of the mode (22) makes it possible to provide the independent mass member which is made compact in size and which is large in mass. The use of the rigid mass body is effective to prevent deformation of the independent mass member overall, leading to stability in characteristics of the displacement of the independent mass member and in the vibration damping effect of the damping device.

(23) A vibration-damping device according to the above-indicated mode (22), wherein the at least one independent mass member further includes an elastic layer formed on and bonded to an entire surface of the circumferential surface of the mass body with a constant thickness, the abutting projection being integrally formed on the outer surface of the elastic layer.

According to this mode (23), the resonance frequency of the bouncing movement of the independent mass member can be tuned to a lower frequency band, resulting in a high degree of freedom in tuning the resonance frequency of the vibration-damping device.

In the above-indicated modes (18)–(23), the abutting projection may be formed independently of the independent mass member. For instance, the abutting projection may be integrally formed on an outer surface of an attachment in the form of a cap or a cover, which is removably inserted onto the outer surface of the mass body.

(24) A vibration-damping device according to any one of the above-indicated modes (18)–(23), wherein the at least one independent mass member includes a rigid mass body longitudinally extending with a constant cross sectional shape, and the abutting projection is formed of an elastic ring inserted onto an outer circumferential surface of the independent mass member.

The use of the elastic ring permits an easy formation of the abutting projection in the form of the ridge. This arrangement also facilitates replacement of the abutting projection. In this respect, the independent mass member may have a positioning groove formed in its outer circumferential surface, for facilitating positioning of the elastic ring relative to the independent member, upon replacement thereof.

Meanwhile, intensive studies have been made by the inventors of the present invention on the vibration damping device according to any of the above-indicated modes (1)–(24) of the present invention, and have revealed that damping effects of the vibration damping device depend upon parameters such as a mass of the independent mass member, a distance of spacing or gap between the abutting surface of the independent mass member and the abutting surface of the housing member, and modulus of elasticity or coefficient of restitution between these abutting surfaces. In order to stably establish a desired damping effect of the vibration-damping device, it is required to precisely control these parameters so as to excite repeated bouncing movement of the independent mass member and resultant repeated impact of the independent mass member against the housing member, thereby applying repeatedly impact energy to the housing member, upon application of the vibrational load to the independent mass member. As a result of the extensive analysis conducted by the inventors, it was also revealed that the vibration damping devices which are made identical with each other in terms of the mass of the independent mass member, the coefficient of restitution between these abutting surfaces, the distance of spacing between the abutting surface, or the like, still exhibit different damping effects due to variations in conditions of impact and bounce of the independent mass member against and from the housing member.

It was further revealed that friction between the abutting surfaces of the independent member and the housing member has great impact on the damping effect of the vibration damping device in which the independent mass member is opposed to the housing member with the slightly small spacing therebetween and is oscillated at a relatively high frequency in a complicated displacement condition. The further studies have been made in view of the above, and result in a vibration-damping device constructed according to the mode (25) of the present invention.

(25) A vibration-damping device according to any one of the above-indicated modes (1)–(24), wherein at least one of the plurality of independent mass member being arranged such that at least one of the abutting surface of the independent mass member and the abutting surface of the housing member is formed of a rubber elastic body, the at least one independent mass member and the at least one housing member being impacted against each other via the rubber elastic body with a coefficient of kinetic friction of 0.4 or lower between the abutting surfaces thereof.

In this mode (25), the independent mass member is likely to be displaced relative to the housing member. Namely, the arrangement of the present mode facilitates the bounding displacement of the independent mass member relative to the housing member, resulting in high damping effect based of the vibration damping device based on the impact of the independent mass member against the housing member. Since the kinetic friction between the abutting surfaces of the independent mass member and the housing member is suitably arranged as indicated above, the independent mass member is less likely to suffer from or free from a trouble of its displacement, e.g., sticking of the mass member to the housing member. Thus, the vibration-damping device of the present invention can exhibit a desired damping effect with high stability. In this respect, the "coefficient of kinetic friction" is interpreted to mean a coefficient of friction between two surfaces which are sliding over each other. The rubber elastic body may be applicable to both of the abutting surfaces of the independent mass member and the housing member, which surfaces are opposed to each other in the primary vibrational load receiving direction. Further, the rubber elastic body is also applicable to the abutting surfaces of the independent mass member and the housing member which are opposed to each other in the direction perpendicular to the primary vibrational load receiving direction.

(26) A vibration-damping device according to the above-indicated mode (25), wherein the rubber elastic body is subjected to a surface treatment by hydrochloric acid.

This arrangement of the mode (26) makes it possible to change the surface condition of the rubber elastic body for decreasing the coefficient of kinetic friction, while maintaining spring characteristics of the whole rubber elastic body. A rubber material for forming the rubber elastic body may be selected from natural rubber and diene rubbers having a double bond in a primary chain, such as isoprene rubber, butadiene rubber, butyl rubber, styrene-butadiene rubber, nitrile rubber, chloroprene rubber. The selected rubber material is vulcanized, thereby providing the rubber elastic body. A surface hardening treatment is executed on the obtained rubber elastic body by simply dropping the rubber elastic body to a hydrochloric acid aqueous solution having a predetermined concentration of the hydrochloric acid. As a result of the surface hardening treatment, a chlorine layer (i.e., a replacement of the double bond by the chlorine) is formed on the outer surface of the rubber elastic body. The thickness of the chlorine layer is preferably determined within a range of 1–20 μm, so as to prevent a significant deterioration of the spring characteristics of the rubber elastic body, and assure a desired durability of the layer.

(27) A vibration-damping device according to the above-indicated mode (25) or (26), wherein the rubber elastic body being coated by a low-frictional thin resin layer secured thereto.

In this mode (27), the thickness of the low-frictional resin layer formed on the surface of the elastic body layer is made smaller sufficiently, making it possible to maintain the spring characteristics and coefficient of restitution of the whole rubber elastic body, while decreasing the coefficient of the kinetic friction of the surface of the rubber elastic body. It is noted that the surface of the rubber elastic body is required to exhibit desired wear resistance, elasticity and flexibility. To meet these requirements, a material for the thin resin layer is preferably selected from a group consisting of fluororesin, polyamide resin and the like. The thickness of the thin resin layer is generally determined within a range of 10–50 μm, so as to prevent a significant deterioration of the spring characteristics of the rubber elastic body. The method for forming the thin resin layer is not particularly limited. For instance, a resin sheet is laminated on the surface of the rubber elastic body and is fused by heat application, thereby providing the thin resin layer adhered to the outer surface of the rubber elastic body. For forming the thin resin layer with high stability, the thin resin layer may be preferably as follow: First, a powdered resin materials is applied and stuck on the outer surface of the rubber elastic body, by means of electrostatic coating. The powdered resin is fused by heat application, e.g., by heat ray irradiation or by induction heating.

(28) A vibration-damping device according to any one of the above-indicated mode (25)–(27), wherein the rubber elastic body is made of a rubber composition which contains at least one of mica, polytetorafluoroethylene, and graphite.

In this mode (28), the rubber elastic body itself is capable of serving as the abutting surface having a low friction coefficient, leading to high durability of the abutting surface, in comparison with the above mentioned thin layers formed on the rubber elastic body. The rubber composition may be mixed with at least one of mica, polytetorafluoroethylene, or graphite at any rate. The amount of the mixture may be determined taking into account characteristics of the employed rubber composition, required characteristics of the abutting surface.

It is to be understood that a combination of two or more of the above-indicated modes (25)–(28) may be employed to establish the coefficient of kinetic friction of 0.4 or lower between abutting surfaces of the independent mass member and the housing member.

In the vibration damping device constructed according to any one of the above-indicated modes (25)–(28), both of the abutting surfaces of the independent mass member and the housing member are preferably constituted by the rubber elastic body, and are subjected to additional treatment or treatments according to any one or more of the above-indicated modes (26)–(28), thereby establishing the coefficient of kinetic friction of 0.4 or lower between the abutting surfaces of the independent mass member and the housing member. Alternatively, one of the abutting surfaces of the independent mass member and the housing member may be constituted by the rubber elastic body which is subjected to one or more of the treatment or treatments according to any one of the above-indicated modes (26)–(28).

(29) A vibration-damping device according to any one of the above-indicated modes (25)–(28), wherein the abutting surface of the independent mass member is formed of the elastic rubber body, while the abutting surface of the housing member is covered by a solid coating layer made of a resin material having a low friction coefficient.

The arrangement of the mode (29) makes it possible to decrease coefficient of friction of the abutting surface of the housing member with ease, even in the case where the abutting surface of the housing member is not constituted by the rubber elastic body. Preferably, the solid coating layer of the low frictional resin is a solid-lubricating layer, more preferably is a solid-lubricating layer formed of a fluororesin by baking coating.

(30) A vibration-damping device according to any one of the above-indicated modes (25)–(29), wherein the independent mass member and the housing member are opposed to each other at respective surfaces which are opposed to each other in the vibration input direction, at least one of the surfaces of the independent mass member and the housing member having a partially protruding portion protruding toward the opposed surface, a protruding end face of the protruding portion serving as the abutting surface, the abutting surface being formed of the rubber elastic body, and a coefficient of kinetic friction between the abutting surfaces of the independent mass member and the housing member is set to 0.4 or lower.

In this mode (30), the protruding end face of the partially protruding portion serves as the abutting surface. This permits decrease in area of the abutting surface, thereby further facilitating movement or displacement of the independent mass member relative to the housing member, upon application of the vibrational load. Thus, the vibration-damping device exhibits high damping effect based on the impact of the independent mass member against the housing member. Namely, the independent mass member may be forced to move or displace not only in the vibration input direction, but also about a plurality of axes of displacement, owing to the decreased abutting surface. Accordingly, it may be considered that the use of the partially protruding portion may provide the substantially same effect caused by the above-mentioned decrease in the coefficient of kinetic friction between the abutting surfaces of the independent mass member and the housing member.

(31) A vibration-damping device according to any one of the above-indicated modes (1)–(30), wherein at least one of the plurality of independent mass member is arranged such that at least one of the independent mass member and the housing member being covered by a coating rubber layer formed of coating of a liquid rubber on a surface thereof, at least one of the abutting surfaces of the independent mass member and the housing member being formed of the coating rubber layer.

In the above mode (31), the coating rubber layer is formed of the liquid rubber by coating, making it possible to form the sufficiently thin rubber layer with high preciseness on the surface of the independent mass member and/or the surface of the housing member, without using a mold for molding the coating rubber layer. Namely, this arrangement permits high dimensional accuracy of the coating rubber layer, resulting in high dimensional accuracy of the spacing between the abutting surfaces of the independent member and the housing member which surfaces are opposed to each other in the vibration input direction. Thus, the vibration-damping device can exhibits desired damping effects with stability. In addition, the coating rubber layer has a wall thickness which is made sufficiently smaller, making it possible to make the size of the independent mass member as large as possible, within a limited accommodation space. In this respect, the independent mass member is made of a high gravity material such as iron, so that the large-sized independent mass member may exhibit improved damping effects.

(32) A vibration-damping device according to the above-mode (31), wherein the coating rubber layer having a thickness within a range of 0.03–0.5 mm.

If the thickness of the coating rubber layer is made smaller than 0.03 mm, the coating rubber layer is likely to be damaged or peeled off from the independent mass member, upon impact of the independent mass member against the housing member, resulting in low durability of the coating rubber layer. If the thickness of the coating rubber layer is made larger than 0.5 mm, the coating rubber layer is likely to suffer from unacceptable distortion thereof due to shrinkage of the liquid rubber upon vulcanization, resulting in difficulty in establishing high dimensional accuracy of the spacing between the abutting surfaces of the independent mass member and the housing member. Therefore, the coating rubber layer having a thickness within a range of 0.03–0.5 mm permits the high dimensional accuracy thereof and the resultant dimensional accuracy of the spacing between the abutting surfaces of the independent mass member and the housing member, while assuring improved durability thereof. More preferably, the thickness of the coating rubber layer is held within a range of 0.05–0.3 mm.

(33) A vibration-damping device according to the above-indicated mode (31) or (32), wherein the abutting surface of the independent mass member is covered by the coating rubber layer, and having a chamfered corner.

In this mode (33), the corner of the abutting surface of the independent mass member is chamfered, so that the portion of the coating rubber layer which covers the chamfered corner of the independent mass member is less likely to suffer from or free from a problem of stress concentration, upon impact of the independent mass member and the housing member. Thus, the coating rubber layer is free from a problem of undesirable damage caused by the stress concentration, and accordingly enjoys improved durability. The chamfered corner may have various configurations, such as a rounded surface, a C-shaped surface, a narrow-width surface and the like. The chamfering may be conducted by an optional method including cutting and pressing.

(34) A vibration-damping device according to any one of the above-indicated modes (31)–(33), wherein the independent mass member is partially covered by the coating rubber layer, and is exposed to the atmosphere at a portion which does not constitute the abutting surface thereof.

In this mode (34), the portion of the independent mass member, which is exposed to the atmosphere, may be utilized for handing the independent mass member. For instance, the coating operation of the liquid rubber may be executed, while the independent mass member being supported at the exposed portion thereof by a suitable support member, whereby the coating operation is performed with high efficiency. Preferably, the independent mass member includes the exposed portion located in one of longitudinally opposite end portions thereof.

(35) A method of manufacturing a vibration-damping device defined in the above-indicated modes (31)–(34), comprising a step of: forming the coating rubber layer on at least one of the independent mass member and the housing member, by coating a liquid rubber on a surface of the at least one of the independent mass member and the housing member.

According to the above mode (35), the coating rubber layer may be formed of the liquid rubber by coating with ease, without needing for a mold. Therefore, the coating rubber layer can be manufactured with simple facilities and with improved efficiency. Further, the thin coating rubber layer can be formed with high dimensional accuracy, according to the method of this mode.

Various kinds of rubber materials or compositions may be employed for preparing the liquid rubber. For instance, the materials for the liquid rubber may be selected from the group consisting of natural rubber, a synthetic rubber including styrene-butadiene rubber, ethylene-propylene rubber, butadiene rubber, chloroprene rubber, nitrile rubber, butyl rubber, acrylic rubber, isoprene rubber, and elastomeric resin. In view of physical properties, production efficiency, handling of the respective rubber materials, diene rubbers and chlorine rubbers may be employed, preferably. More preferably, a mixture of the natural rubber and diene or chlorine rubbers may be employed. As well known in the art, the prepared rubber composition may also mixed with known additives such as a vulcanizing agent, vulcanizing aid, antioxidant, plasticizer, softener, reinforcing filler, filler and the like. The thus obtained rubber composition is dissolved in a desired solvent, thereby providing the liquid rubber of the prepared rubber composition. The solvent may be suitably determined depending upon the rubber composition. For instance, the solvent may consist solely of toluene, methyl alcohol, cyclohexane, isobutyl methyl ketone, or the like, or may be a mixture of two or more of the above-indicated materials. The above-mentioned components of the liquid rubber may be mixed with each other at a suitable proportion so that the obtained liquid rubber exhibits a desired viscosity suitable for forming the liquid rubber layer with a constant thickness.

The thus prepared liquid rubber may be applied on the surface of the independent mass member and/or the surface of the housing member, by spraying, brush application, roll coater, or the like, preferably, by dipping. Namely, the independent mass member and/or the housing member is immersed in the liquid rubber retained in a suitable container. The liquid rubber coating applied on the surface of the independent mass member and/or the surface of the housing member is then subjected to a drying treatment and the following heating and warming treatment by using hot air. The liquid rubber coating is subjected to a vulcanizing operation as needed.

Before the application of the liquid rubber, the surfaces of the independent mass member and/or the surface of the housing member is preferably subjected to degreasing, cleaning or washing, chemical conversion coating, adhesive treatment, or the like. The adhesive treatment is not essential to practice of the present mode of the invention. It may be possible to provide raised and recessed portions between the coating rubber layer and the surface of the independent mass member or the housing member, whereby the coating rubber layer is adhere to the surface of the independent mass member of the housing member owing to the mechanical engagement of the raised and recessed portions. Namely, the raised and recessed portions constitute an engaging mechanism.

Further, the above-described steps for forming the coating rubber layer is desirably executed after the forming of independent mass member and the housing member is finished. However, it may be possible to finish the forming of the independent mass member and the housing member after the coating rubber layer is formed.

(36) A method of manufacturing a vibration-damping device according to the above-indicated mode (35), wherein the step of forming the coating rubber layer on at least one of the independent mass member and the housing member, is executed a plurality of times to thereby form a lamination of the coating rubber layer.

According to the method of this mode (36), the thickness of the coating rubber layer is suitably adjusted by changing the repetition times of the step of forming the coating rubber layer. In particular, the thickness of the coating rubber layer formed by a single execution of the forming step can be set to tens of micrometer or lower, whereby the thickness of the coating rubber layer can be controlled with high accuracy. For producing the lamination of the coating rubber layer, the following method is preferably employed, for example. First, the coating rubber layer is formed on the surface of the independent mass member or the housing member, according to the above-described step. The formed coating rubber layer is then subjected to a drying treatment. Next, another coating rubber layer is formed on the dried coating rubber layer. This cycle of steps are executed optional number of times, thereby providing the lamination of the coating rubber layer.

(37) A vibration-damping device according to any one of the above-indicated modes (1)–(37), wherein the vibrative member comprises a rotational member which is rotatable about a center axis thereof, and the housing member being fixedly disposed in the rotational member, the abutting surfaces of the independent mass member and the housing member being opposed to each other in a circumferential direction about the center axis of the rotational member.

In the vibration-damping device according to the above mode (37), the each independent mass member is induced to provide its bouncing movement or displacement relative to the housing member in the vibration input direction, upon application of the vibrational load. In this condition, the independent mass member impacts against and bounces off the housing member repeatedly, whereby the vibration of the rotational member as the vibrative member is effectively attenuated or absorbed based on loss or dissipation of energy caused by sliding friction generated between the abutting surfaces of the mass member and the housing member and caused by collision or impact of the independent mass member against the housing member. That is, the vibration damping device constructed according to the above mode (37) exhibits its damping effect owing to impact of the independent mass member on the housing member, rather than the resonance of the mass member, whereby the vibration damping device can exhibit an excellent damping effect with respect to vibrations over a wide frequency range with the mass member whose mass is made smaller than that of the mass member in the conventional vibration damper. Besides, the damping effect of the vibration-damping device is insensitive to the change of the ambient temperature, whereby the vibration-damping device can exhibit a desired damping effect with high stability.

Since the each independent mass member is non-adhesively disposed in the housing member, and accordingly is independently displaceable relative to the housing member, the vibration damping device of the present mode of the invention can exhibit the desired damping effect based on the impact of the independent against the housing member, with respect to any vibrations applied in a direction perpendicular to the center axis of the rotational member, and applied in a rotational direction of the rotational member. Thus, the vibration-damping device is capable of damping various kinds of input vibrations which are different from each other in terms of frequency and direction.

The housing member may be provided as a box-like member or the like, which is made of a rigid material such as metal and which is formed independently of and fixedly attached to the rotational member as a subject member whose vibrations to be damped. This arrangement permits high dimensional accuracy of the housing member with ease, irrespective of any conditions of the rotational member. It may be possible to provide the housing member by utilizing an interior space of a hollow portion of the rotational member, or alternatively by utilizing partially the rotational member as the housing member. In this arrangement, the housing member is made simple in construction and compact.

(38) A vibration-damping device according to the above-indicated mode (37), wherein the housing member is partially constituted by utilizing the rotational member.

With respect to the above-indicated mode (37), the rotational member includes a rotational disk used as a power transmitting member, such as pulleys and gears, which is rotatable about a center axis thereof and extending in the direction perpendicular to the center axis.

(39) A vibration-damping device according to the above-indicated mode (37), wherein the rotational member comprises a power transmitting rotational disk extending in a direction perpendicular to the center axis, the plurality of independent mass members being disposed in a radially intermediate portion of the rotational disk.

In the above mode (39), the housing member may be integrally formed with the rotational disk. Alternatively, the housing member may be formed independently of and fixed to the housing member. Further, the independent mass members are independent of the rotational disk serving as the power-transmitting member. Therefore, the vibration-damping device of this mode (39) may be integrally installed in the rotational disk, without interrupting a rotational power-transmitting path of the rotational disk. Thus, the present vibration-damping device assures high efficiency of the power transmission, and high durability.

Preferably, the each independent mass member including the spacing between the abutting surfaces of the independent mass member and the housing member, is disposed in an interior space which is formed within the housing member and which is separated from the external space. This arrangement is effective to prevent entrance of contaminants or water between the abutting surfaces of the independent mass member and the housing member, leading to high stability of the damping effect of the vibration-damping device. In this respect, the interior space need not to be completely separated from the external area, but may be communicated with the external area through minute communication holes, for thereby avoiding a pressure change in the interior space due to a change in the ambient temperature.

(40) A vibration-damping device according to any one of the above-indicated modes (37)–(39), wherein the plurality of independent mass member are disposed in the rotational member such that the independent mass members being spaced apart from each other in the circumferential direction about the center axis, the independent mass members being arranged such that a center of gravity of overall of the plurality of independent mass members being located on the center axis of the rotational member, upon rotation of the rotational member about the center axis.

The arrangement of this mode (40) is effective to eliminate or minimize a possibility of occurrence of a bending force caused by centrifugal force of the respective independent mass members, which adversely affects on the rotational member, resulting in no need for a balance member. In order to establish a rotation of the rotational member with the gravity of the whole independent mass members being located on the center axis of the rotational member, for example, the plurality of independent mass members are disposed in the rotational member such that the independent mass members are spaced apart from each other in the circumferential direction about the center axis, with a given spacing therebetween, so that the gravity of the all independent mass members are located on the center axis of the rotational member owing to the centrifugal forces acting on the respective independent mass members upon rotation of the rotational member. It may be possible to arrange the vibration damping device of this mode such that the independent mass members is constituted by a plurality of annular mass members and are disposed in the rotational member such that the independent mass members are spaced apart from each other in the axial direction with a given spacing therebetween. This modification also permits the above-indicated rotation of the rotational member with the center of the gravity of the all-independent mass members being located on the center axis of the rotational member.

(41) A vibration-damping device according to the above-indicated mode (40) wherein each of the plurality of independent mass members includes two circumferentially opposite end portions which are opposed to each other in the circumferential direction about the center axis of the rotational member and which serve as the abutting surfaces of the independent mass member, the each of the independent mass member being brought into elastic impact at the circumferentially opposite end portions thereof against the housing member in said circumferential directions about the axis of the rotational member.

In this mode (41), the independent mass members are independent of each other and are independently displaced or moved relative to the housing member. Thus, the vibration-damping device of this mode can exhibit a high damping effect based on the impacts of the respective independent mass members against the housing member. In particular, the each independent mass member has a relatively small mass, facilitating the bouncing displacement of the each independent mass member relative to the housing member, whereby the vibration-damping device can exhibit an improved damping effect. In addition, the centripetal force acting on the each independent mass member by the housing member can be offset or canceled between the independent mass members, thereby eliminating or reducing the possibility of the occurrence of the bending force acting on the rotational member.

(42) A vibration-damping device according to the above-indicated mode (41) wherein at least one of the plurality of independent mass member is constituted by an arcuate block member which extends parallel to the center axis of the rotational member with an arc cross sectional shape which extends in the circumferential direction of the rotational member with a given circumferential length.

The arrangement of the above mode (42) is effective to practice the vibration-damping device according to the above-indicated mode (41). Further, the use of the independent mass member in the form of the arcuate block makes it possible that the independent mass member impact against the housing member with a relatively large abutting surface area in the circumferential direction and in the radial direction perpendicular to the center axis.

(43) A vibration-damping device according to the above-indicated modes (41) or (42), wherein at least one of the plurality of independent mass member is constituted by a solid rod having a circular cross sectional shape and extending parallel to the center axis of the rotational member.

This arrangement of this mode (43) is effective to practice the above-indicated mode (41). The vibration-damping device constructed according to the present mode is capable of exhibiting substantially identical damping effect with respect to vibrations applied in any radial directions perpendicular to a center axis of the independent mass member.

(44) A vibration-damping device according to any one of the above-indicated modes (37)–(39), wherein at least one of the plurality of independent mass member is constituted by an annular mass member continuously extending in the circumferential direction about the center axis of the rotational member, the abutting surfaces of the annular mass member and the housing member being opposed to each other in the circumferential direction about the center axis of the rotational member and being brought into elastic impact against each other in the circumferential direction.

In this mode (44), the annular independent mass member is less likely to suffer from or free from a problem of centrifugal force acting thereon, since the centrifugal force is likely to be canceled, leading to a stable attitude of the annular independent mass member. In one advantageous arrangement of the above preferred mode (44) of the invention, one of the abutting surfaces of the independent mass member and the housing member may be provided with a plurality of engaging recesses, and the other surface may be provided with a plurality of engaging protrusions which are brought into abutting contact with the engaging recesses in the circumferential direction about the center axis of the circumferential direction.

BRIEF DESCRIPTION OF THE DRAWINGS

The above and other objects, features advantages and technical and industrial significance of the present invention will be better understood by reading the following detailed description of the present preferred embodiments or modes of the invention when considered in connection with the accompanying drawings in which.

DETAILED DESCRIPTION OF THE PREFERRED EMBODIMENT

Figure 1:
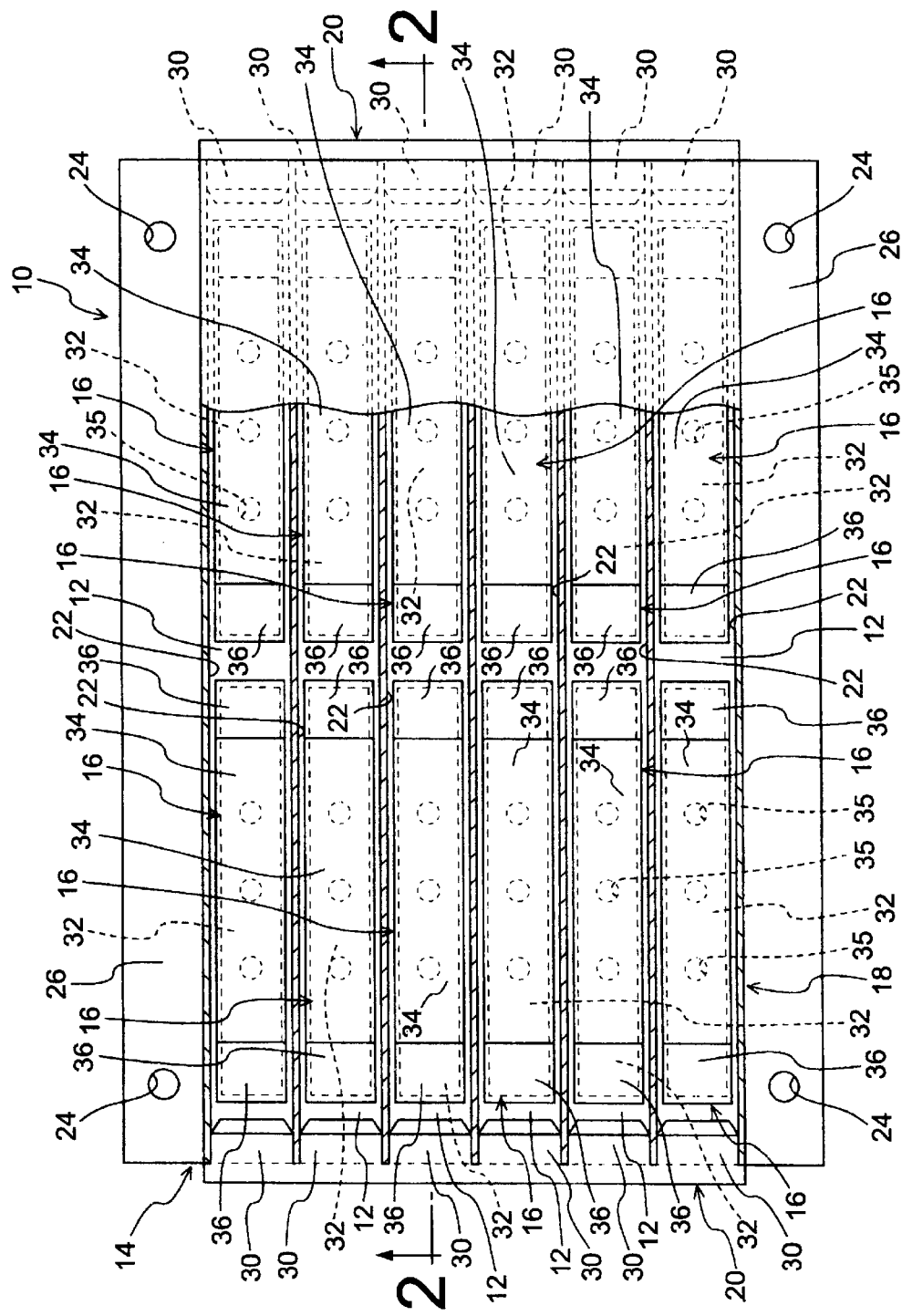
FIG. 1 is a partially cutaway view in a top plane of a vibration damper for vehicles constructed according to a first embodiment of the present invention.
Figure 2:
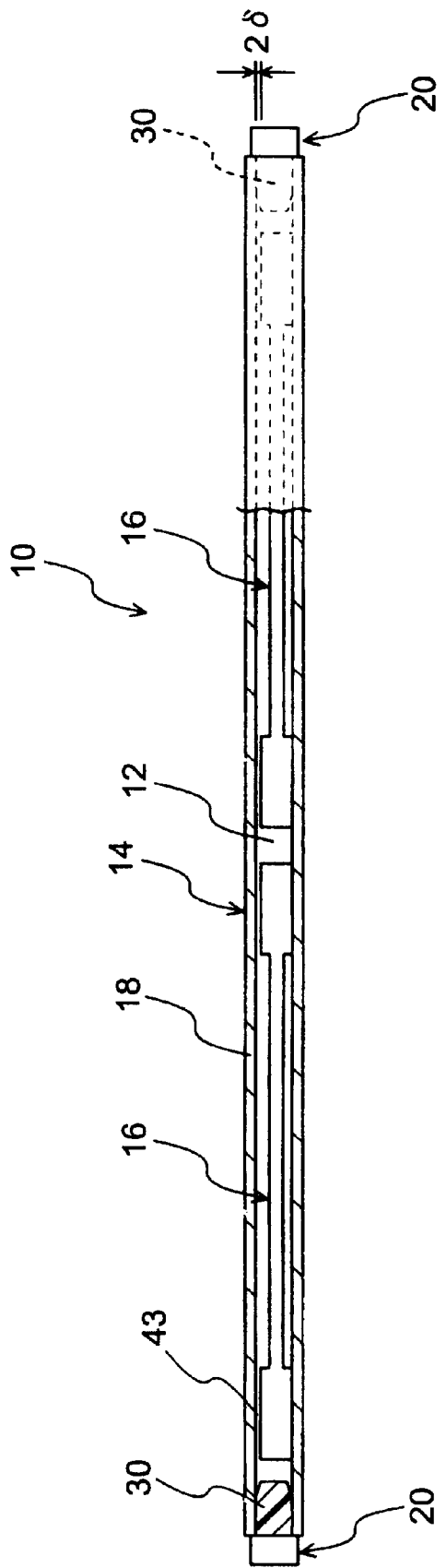
FIG. 2 is a cross sectional view taken along line 2—2 of FIG. 1.

Referring to FIGS. 1 and 2, there is shown a vibration damper 10 constructed according to a first embodiment of the present invention. The vibration damper 10 includes a box-like shaped housing 14 having a plurality of interior spaces 12 which are independent of each other, and a plurality of independent or separate mass members which are accommodated within the plurality of interior space, respectively. The vibration damper 10 is installed in position such that a housing 14 is fixed to a vibrative member such as a body of an automotive vehicle (not shown) which excites vibrations to be damped.

The housing 14 consists of a housing body 18 in the form of a generally thick-walled rectangular plate, and cover members 20, 20 fixed to the longitudinally opposite end face of the housing body 18. The housing body 18 has a plurality of through holes 22 (e.g., six through holes 22 in the present embodiment) each extending therethrough in its longitudinal direction with a constant rectangular cross sectional shape. These through holes 22 extend parallel to each other in the longitudinal direction of the housing body 18 while being spaced apart from each other in the direction perpendicular to the longitudinal direction. The housing body 18 also has fixing members 26, 26 integrally formed at and extending outwardly from the opposite sides thereof, respectively. Each of the fixing members 26 has threaded holes 24, so that the housing 14 is attached to the power unit by bolts that are screwed in the threaded holes 24, respectively. In the present embodiment, the housing body 18 is formed of an aluminum alloy by extrusion. The housing body 18 is also made rigid enough to have a modulus of elasticity of $5 \times 10^3$ MPa or more.

Each of the cover members 20 is a rectangular plate member whose configuration is similar to that of the corresponding one of the longitudinal opposite end face of the housing body 18. The each cover member 20 has a plurality of protrusions 30 (six protrusions 30 in the present embodiment) integrally formed at respective positions of one of opposite major surface thereof, which respective positions correspond to that of through holes 22 of the housing body 18. The thus formed cover members 20, 20 are fixed to the opposite end faces of the housing body 18 such that the protrusions 30 are forcedly pressed into the bores of the through holes 22, respectively, thereby providing a plurality of accommodation spaces which are partially defined by respective through holes 22 and are independent or separated from one another. In the present embodiment, the cover members 20 are both formed by casting of metallic materials such as iron, or alternatively by an injection molding of a synthetic resin material.

Figure 3:
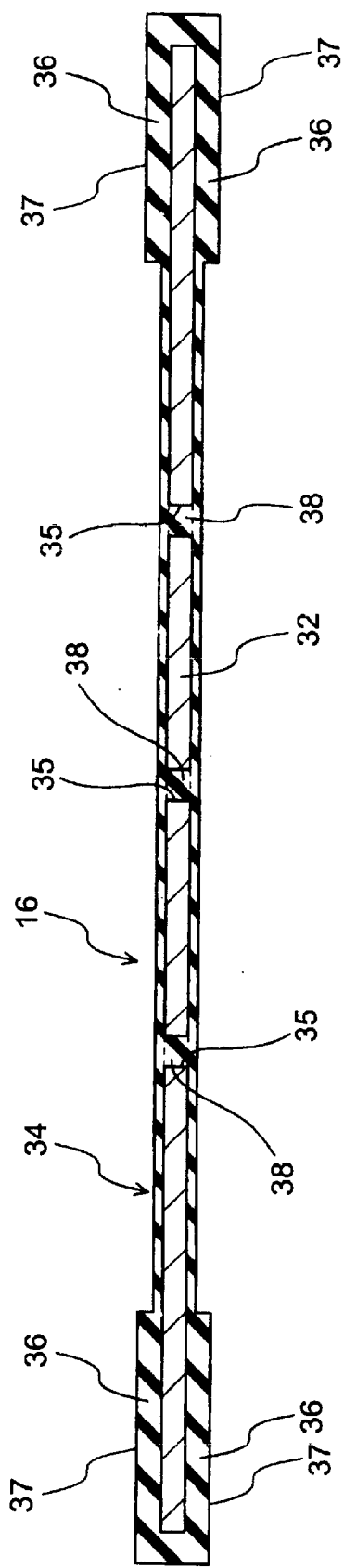
FIG. 3 is a longitudinal cross sectional view of an independent mass member used in the vibration damper of FIG. 1.

Referring next to FIG. 3, each of the independent mass members 16 is constituted by a metallic mass 32 as a mass body and an abutting rubber elastic body 34. The metallic mass 32 is a rectangular plate-like member and has three communication holes 35 formed at its intermediate portions, such that the communication holes 35 are spaced apart from each other in the longitudinal direction of the metallic mass 32 and extend through the thickness of the metallic mass 32. The abutting rubber elastic body 34 in the form of a generally thin-walled rubber layer, is secured to and covers the entire area of the surface of the metallic mass 32. The abutting rubber elastic body 34 has thick-walled portions as partially protruding portions, which are formed at the longitudinally opposite end portions of the metallic mass 32 such that the thick-walled portions extend in the longitudinal direction over the length of about ⅕ (one-fifth) of the longitudinal length of the metallic mass 32 with a constant wall-thickness. That is, each of the thick-walled portions of the abutting rubber elastic layer 34 at the corresponding end portion of the metallic mass 32 as a pair of elastic protruding portions 36 which protrude outwardly from the opposite major surfaces of the metallic mass 32. Since the thick-walled portions of the abutting rubber elastic body 34 extend with a constant wall-thickness, each of the elastic protruding portions 36 has a protruding end face 37 which is made flat like the inner surface of the corresponding accommodation space 12. In the present embodiment, the protruding end faces 37 serve as the abutting surface of the independent mass member 16. The protruding end faces 37 have a Shore D hardness of 80 or lower, more preferably, within a range of 20–40, a modulus of elasticity within a range of $1$–$10^4$ MPa, more preferably, $1$–$10^3$ MPa, and a loss tangent is not less than $10^{-3}$, more preferably within a range of 0.01–10.

The abutting rubber elastic body 34 also has three connecting portions 38 integrally formed at the central portions thereof, which connecting portions 38 are adapted to fill the respective through holes 35 and function to connect the respective portions of the abutting elastic body which are formed on the opposite major surfaces of the metallic mass 32.

The independent mass member 16 may be formed by injection molding of a suitable rubber material, for instance. Namely, the metallic mass 32 previously formed is placed in position in a mold cavity of a mold designed for molding the abutting rubber elastic layer 34. The suitable rubber material is injected into the mold cavity to fill the mold cavity with the rubber material. The rubber material filling the mold cavity is vulcanized and is bonded to the metallic mass 32 simultaneously, whereby the independent mass member 16 is provided as an integrally vulcanized product.

Two of the thus constructed independent mass members 16 are installed within the each accommodation space 12 such that the two independent mass members 16 are arranged in series. Each of the independent mass members 16 is dimensioned such that the width and height of the independent mass member 16 are smaller than those of the accommodation space 12, respectively, while the length of the independent mass member 16 is smaller than a half of the length of the accommodation space 12. This arrangement assures that each of the independent mass members 16 is spaced apart from the accommodation space 12 by a given spacing, when the independent mass member 16 is located in the central portion of displacement thereof in its width, height and length directions, thereby permitting displacement of the independent mass member 16 independent of the housing 14.

In the present embodiment, particularly, a spacing: $2\delta$ between the independent mass member 16 and the inner surface of the accommodation space 12 in the thickness direction thereof is dimensioned to be held in a range of 0.1–1.6 mm so that the vibration damper 10 exhibits a desired damping effect with respect to a vibrational load applied in the thickness direction of the housing 14. When the independent mass member 16 is located in the central portion of its displacement in its thickness direction, a half spacing: $\delta$, (e.g., $\delta$=0.05–0.8 mm) is left between the elastic protruding portions 36, 36 of the abutting rubber elastic body 34 and the upper and lower surfaces of the accommodation space 12, respectively. In this condition, the independent mass member 16 moves upward and impacts at the protruding end faces of the upper elastic protruding portions 36 on the corresponding portion of the upper surface of the accommodation space 12, and moves downward and impacts at the protruding end faces of the lower elastic protruding portions 36 on the lower surface of the accommodation space 12. The surface areas of the protruding end faces of the upper or lower elastic protruding portions 36 are determined to be not larger than ⅓ (one-third) of the surface area of the corresponding portion of the upper or lower surface of the accommodation space 12, e.g., about ¼ (one-fourth) in the present embodiment. It is noted that the corresponding portion of the upper or lower surface of the accommodation space 12 has a configuration substantially identical with the corresponding upper or lower surfaces of the independent mass member 16. In the static state of the vibration damper 10 shown in FIG. 2, where the housing 14 is not subjected to the vibration of the vibrative body, the independent mass members 16 is held in contact with the lower surface of the accommodation space 12, and are space apart from the upper surface of the accommodation surface 12 with the predetermined spacing: $2\delta$ therebetween.

The independent mass members 16 are also arranged in terms of mass such that the total amount of mass of all of the mass members 16 is held within a range of 5–10% of the mass of the vibrative member. In this respect, the vibration damper 10 of the present embodiment includes twelve independent mass members 16 rather than a single independent mass member. This arrangement makes it possible that each of the independent mass members 16 have a mass smaller than 5–10% of the mass of the vibrative body, e.g., 10–1000 g in the present embodiment, for example.

The metallic mass 32 may be made of a ferrous metal or other metallic material having a sufficiently high specific gravity and rigidity. On the other hand, the abutting rubber elastic body 34 may be made of any known rubber materials including a natural rubber. In the present embodiment, a rubber material, which provides an elastic body having a Shore D hardness of 20–40, may be preferably employed.

In the thus constructed vibration damper 10 of the present embodiment, the independent masses 16 accommodated within each of the housings 14 are displaced relative to the corresponding housing 14 upon application of a vibrational load to the damper 10. Namely, the independent masses 16 are forced to move into and impact at the abutting rubber elastic body 34 the inner wall of the housing 14, whereby the vibration damper 10 exhibits a damping effect owing to effects of sliding friction and impact of the independent mass members 16 against the housing 14. It is noted that the vibration damper 10 constructed according to the present embodiment is dimensioned so as to exhibit a desired damping effect with respect to input vibrations applied in the thickness direction of the independent mass member 16. Namely the vibration damper 10 exhibits its damping effect owing primary to impact of the independent mass members 16 on the inner wall of the respective accommodation spaces 12 of the housing 14, rather than the resonance of the mass member. Therefore, the vibration damper 10 can exhibit an excellent damping effect with respect to input vibrations over a wide frequency range, and assures a stable vibration damping characteristics thereof which is insensitive to a condition of the ambient temperature.

In particular, the vibration damper 10 of the present embodiment is arranged such that (a) the independent mass members 16 are formed independently of the housing 14 and are enclosed within the respective interior spaces 12 of the housing 14 with a predetermined gap therebetween, so as to allow a free displacement of the independent mass members 16 within the interior spaces 12, (b) the independent mass members 16 and the housing 14 are elastically impacted against each other, at their abutting surfaces and (c) the housing 14 and the each independent mass members 16 are opposed to each other in a vibration input direction with a minute gap distance therebetween. In this arrangement, a velocity of the relative displacement between the independent mass members 16 and the housing 14 can be suitably adjusted, permitting control of condition and energy of impact between the independent mass members 16 and the housing 14. With this advantage of the present invention, i.e., the control of the condition and energy of the impact between the independent mass members 16 and the housing 14, the vibration damper 10 of the present invention can exhibit an excellent vibration damping effect with respect to vibrations over a wide frequency range, i.e., ranging from at around 10 Hz to 100 Hz or more, which vibrations are prone to be excited in an automotive vehicle. That is, the vibration damper of the present invention is simple in construction and can exhibit a significantly improved damping effect with respect to the vibrations excited in the vehicle, by only adjusting the gap distance between the abutting surface of the each independent mass member 16 and the abutting surface of the housing 14, and properties of these abutting surfaces. It should be noted that the damping effect of the present vibration damper 10 cannot be achieved by conventional vibration damper for vehicles.

According to the vibration damper 10 of the present embodiment, a plurality of independent mass members 16 are employed as a mass member, rather than a single mass member. In other words, the single mass member is divided into the plurality of independent mass members 16, in this embodiment. Each of the independent mass members 16 is suitably dimensioned such that a total mass of the plurality of independent mass members 16 is meet the requirement for assuring that the vibration damper 10 exhibits a high damping effect with respect to the vibration of the vehicle body. This arrangement is effective to decrease a required mass of each independent mass member 16, effectively exciting bouncing displacement or movement of the independent mass members 16 relative to the housing 14, upon application of a vibrational load to the vibration damper 10. Therefore, the vibration damper 10 using the plurality of divided mass members 16 can exhibit an excellent damping effect, in comparison with a damper wherein a single independent mass member is required to have a mass which is similar to the above-indicated total mass of the plurality of independent mass members 16.

Since the independent mass member 16 is constituted by a flat plate member in the present embodiment, the independent mass member 16 has a great weight distribute in its opposite major surfaces extending in a direction perpendicular to the vibration input direction in which the vibrational load is applied. In addition, the independent mass member 16 is arranged to have its abutting surface area not larger than ⅓ (one-third) of that of the above-mentioned corresponding portions of the upper or lower surfaces of the inner wall, facilitating or further exciting the bouncing displacement of the each independent mass member 16 relative to the housing 14, resulting in a further improved damping effect of the vibration damper 10, owing to the impact or collision of the independent mass member 16 on the inner wall of the accommodation space 12 of the housing 14. It may be appreciated that the damping device 10 is likely to excite not only the bouncing displacement of the independent mass members 16 but also a complex movement of the independent mass members 16 at about a plurality of axes of the independent mass members 16, thereby further facilitating the bouncing displacement of the independent mass members 16.

Figure 4:
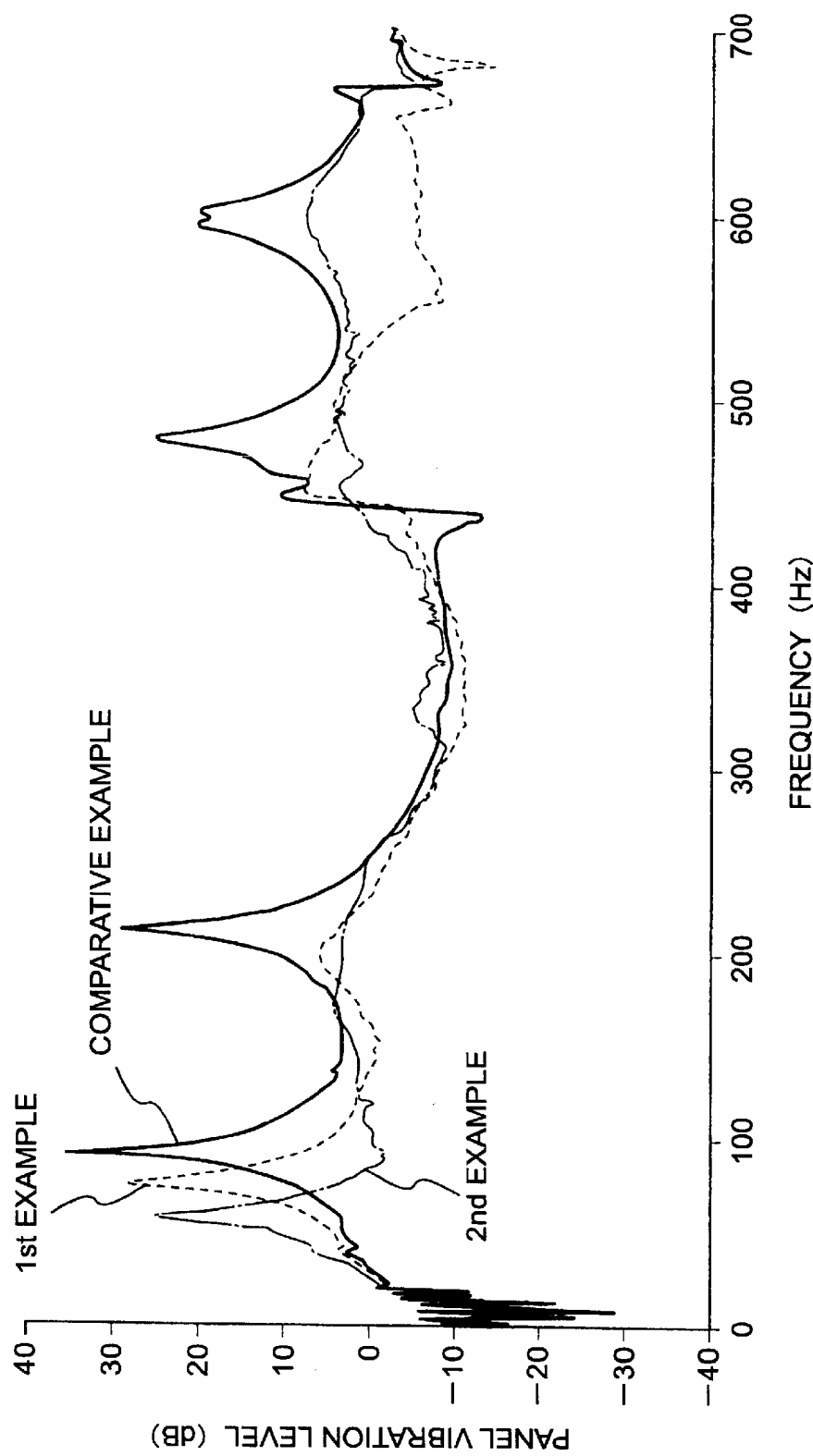
FIG. 4 is a graph showing oscillation characteristics of the vibration damper of FIG. 1 and a modification of the vibration damper, in terms of frequency.

A specimen of the vibration damper 10 constructed according to the present embodiment is prepared as a first example, and is fixed to a first panel as a vibrative member. In the first example, twelve independent mass members 16 are arranged to have a 20 g weight per each and a 240 g in total. The vibration levels of the first panel were actually measured, when the panel is oscillated by a suitable sweep oscillator applied with a signal having a continuously changing frequency. The measurement is indicated in a graph of FIG. 4. Another specimen of the vibration damper constructed according to the present embodiment is also prepared as a second example, which is identical in construction with the vibration damper of the first example, except that the vibration damper of the second example includes twenty-four independent mass members 16 which are arranged to have a 10 g weight per each and a 240 g in total. The vibration damper of the second example is also fixed to a second panel as the vibrative member, and the vibration levels of the second panel were also measured under the same condition as in the first example. The measurement is also indicated in the graph of FIG. 4. As a comparative example, a plate provided with no vibration damper was oscillated under the same condition as in the above examples and the vibration levels were actually measured. The measurement is also indicated as a comparative example in the graph of FIG. 4.

The measurements indicated in the graph of FIG. 4 reveal that the vibration damper of the first example which includes the twelve 20 g weighted independent mass members 16 and the vibration damper of the second example which includes the twenty-four 10 g weighted independent mass members 16 can both exhibit a high damping effect over a sufficiently wide frequency range.

It should be appreciated that the vibration damper 10 constructed according to the present embodiment is adapted to damp vibrations of the vibrative member based primary on a loss or dissipation of vibrative energy caused by the impact of the independent mass members 16 on the housing 14. Namely, the damping effect of the vibration damper 10 is less likely to be sensitive to frequencies of the input vibrations, and is less likely to suffer from a change of the spring characteristics of the rubber elastic body 30 due to the change of the ambient temperature or the like. Thus, the vibration damper 10 can exhibit the desired vibration damping effect with respect to input vibration over the wide frequency range, with high stability.

Referring next to FIGS. 5–11, there are shown a second through a sixth embodiments constructed according to the present invention wherein the each independent mass 16 are desirably modified. In the following the second through sixth embodiments, the reference numerals used in the first embodiment will be used to identify the structurally or functionally identical or corresponding elements, and redundant description of these elements will not be provided, in the interest of brevity and simplification of the description.

Figure 5:
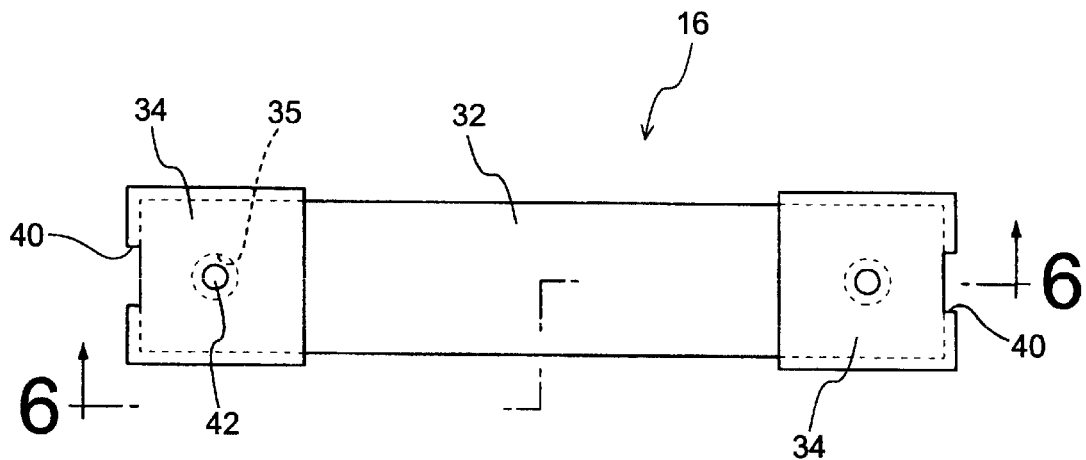
FIG. 5 is a longitudinal cross sectional view of an independent mass member used in a vibration damper for vehicles constructed according to a second embodiment of the present invention.
Figure 6:
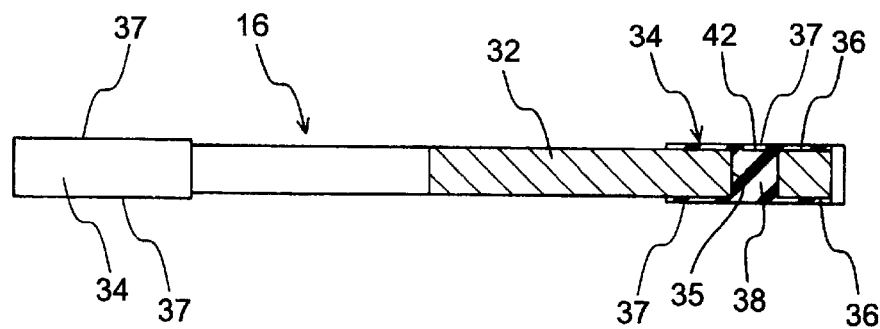
FIG. 6 is a cross sectional view taken along line 6—6 of FIG. 5.

Referring next to FIGS. 5 and 6, there is shown an independent mass member 16 which is used in a vibration damper constructed according to a second embodiment of the present invention. The independent mass member 16 includes a rectangular flat-plate shaped metallic mass 32 as in the first embodiment. A pair of abutting rubber elastic bodies 34, 34 are formed on and bonded to the entire surface of the longitudinally opposite end portions of the metallic mass 32, respectively. Namely, only the longitudinally opposite end portions of the metallic mass 32 is covered by the abutting rubber elastic body 34, in this embodiment. The abutting rubber elastic bodies 34, 34 serve as elastic protruding portions 36, 36 having flat abutting surfaces 37, 37. The metallic mass 32 includes two through holes 35, 35 formed therethrough in the longitudinally opposite end portions thereof. Each of the abutting rubber elastic bodies 34, 34 includes a connecting portion 38 integrally formed therein and filling the corresponding through hole 35 for connecting the upper-side and lower-side portions of the abutting rubber elastic body 34 with each other, which portions respectively cover the upper and lower surfaces of the metallic mass 32, as viewed in FIG. 5.

The independent mass member 16 includes two cutouts 40, 40 formed at its longitudinally opposite end faces, respectively, due to the presence of the support plate of a mold for molding the abutting rubber elastic bodies. The each connecting portion 38 partially define at its upper end face a recess 42 open in a generally central portion of the corresponding abutting surface 37. A gate (not shown) for introducing a rubber material into a mold is open in the recess 42, whereby burrs formed around the gate opening are not appear in the abutting surface 37.

A plurality of the independent mass member 16 constructed as described above are accommodated within the accommodation spaces 12 of the housing 14, as in the first embodiment, whereby the vibration damping device of the second embodiment can exhibit the excellent damping effect of the present invention as described above with respect to the vibration damper 10 of the first embodiment.

Figure 7:
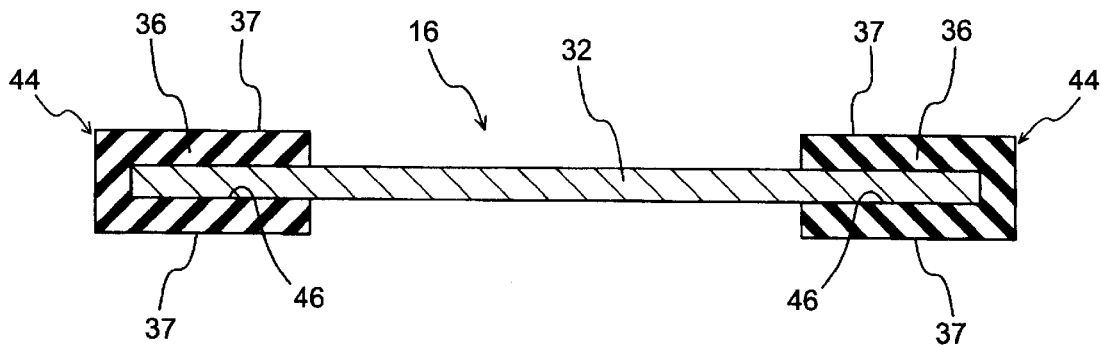
FIG. 7 is a longitudinal cross sectional view of an independent mass member used in a vibration damper for vehicles constructed according to a third embodiment of the present invention.

Referring next to FIG. 7, there is shown an independent mass member 16 which is used in a vibration damper constructed according to a third embodiment of the present invention. The independent mass member 16 includes a rectangular flat-plate shaped metallic mass 32 as in the first embodiment, and a pair of elastic cups 44, 44, which are inserted onto the longitudinally opposite end portions of the metallic mass 32, respectively. Each of the elastic cups 44 having a rectangular block shaped elastic member having a hole 46 open in one of its longitudinally opposite end faces. The hole 46 has a configuration corresponding to the configuration of each of the longitudinally opposite end portions of the metallic mass 32. The each elastic cup is arranged to have a constant wall thickness entirely, so that the upper and lower portion of the elastic cup 44 are placed on respective upper and lower surfaces of the metallic mass 32 with flat outer surfaces. Thus, the each cup 44 are disposed onto the corresponding end portion of the metallic mass 32 and serves as the elastic protruding portions 36, 36 having respective abutting surfaces 37, 37.

In other words, the elastic cup 44, 44 are similar in construction to the longitudinally opposite end portions of the abutting rubber elastic body (34) of the independent mass member (16) used in the vibration damper (10) of the first embodiment.

A plurality of the thus constructed independent mass member 16 of the third embodiment are accommodated within the accommodation spaces 12 of the housing 14, as in the first embodiment, whereby the vibration damping device of the third embodiment can exhibit the excellent damping effect of the present invention as described above with respect to the vibration damper 10 of the first embodiment.

In the independent mass member 16 of the third embodiment, the elastic cups 44 are independent of the metallic mass member 32, so that the elastic cups 44 may be provided as replaceable members.

Figure 8:
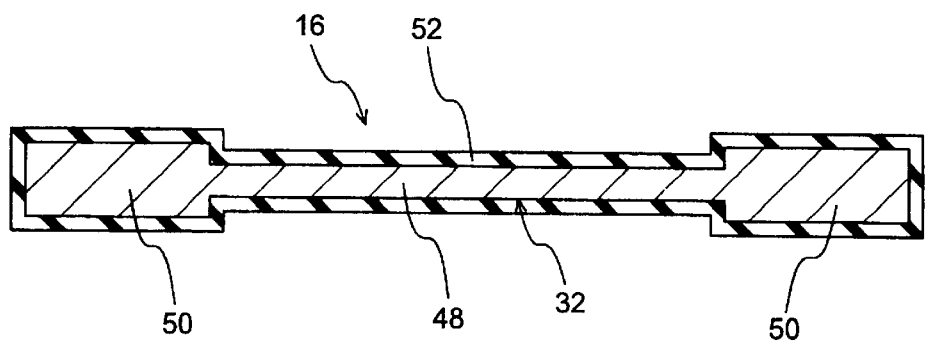
FIG. 8 is a longitudinal cross sectional view of an independent mass member used in a vibration damper for vehicles constructed according to a fourth embodiment of the present invention.

Referring next to FIG. 8, there is shown an independent mass member used in a vibration damper constructed according to the fourth embodiment of the present invention. The independent mass member 16 includes a rectangular flat-plate shaped metallic mass 32 as in the first embodiment. The metallic mass 32 has a wall thickness which varies in the longitudinal direction thereof. Namely, the metallic mass 32 includes a longitudinally intermediate thin-walled portion 48 and a pair of thick-walled portions 50, 50 which are opposed to each other in the longitudinal direction with the thin-walled portion 48 therebetween. The thick-walled portions 50, 50 protrudes upwardly and downwardly from the upper and lower surfaces of the thin-walled portion 48, as seen in FIG. 8. The upper and lower protruding end faces of the each thick-walled portion 50 are made flat, and extend in a direction perpendicular to a thickness direction of the metallic mass 32.

An abutting rubber layer 52 is formed on and secured to over the entire surface of the metallic mass 32, whereby the metallic mass 32 is entirely covered by the abutting rubber layer 52. The abutting rubber layer 52 has a generally constant wall-thickness over the entire area.

Namely, the independent mass member 16 of the fourth embodiment, includes the thick-walled portions 50, 50 and the abutting rubber layer 52 secured thereto which cooperate to each other to provide protruding portions protruding outwardly in the thickness direction thereof and constituting the abutting surfaces 37.

A plurality of the independent mass member 16 constructed as described above, are accommodated within the accommodation spaces 12 of the housing 14, as in the first embodiment, to thereby constitute the vibration damper of the fourth embodiment of the invention. This vibration damper of the fourth embodiment can exhibit an excellent damping effect with respect to vibrations applied in the thickness direction of the independent mass members 16, based on the impact of the independent mass members 16 against the housing 14.

In particular, the independent mass member 16 of the fourth embodiment includes the metallic mass 32 which has the thick-walled portion 50 at its longitudinally opposite end portions. In comparison with the first embodiment, this arrangement of the fourth embodiment makes it possible to obtain a relatively large mass of the independent mass member 16 without requiring changing in the size of the independent mass member 16.

Figure 9:
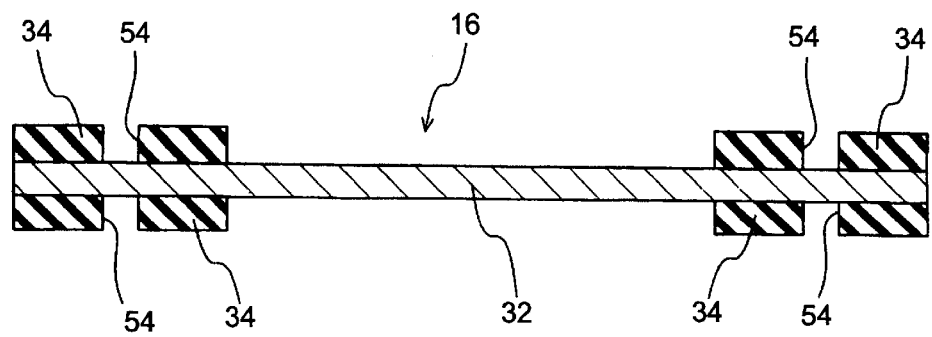
FIG. 9 is a longitudinal cross sectional view of an independent mass member used in a vibration damper for vehicles constructed according to a fifth embodiment of the present invention.

Referring next to FIG. 9, there is shown an independent mass member used in a vibration damper constructed according to the fifth embodiment of the present invention. The independent mass member 16 includes a rectangular flat-plate shaped metallic mass 32 as in the first embodiment, and four abutting rubber elastic bodies 34, which are formed on and secured to the longitudinally opposite end portions of the upper and lower surfaces of the metallic mass 32 as seen in FIG. 9. Each of the abutting rubber elastic bodies 34 protrudes outwardly from the corresponding surface of the metallic mass 32.

The each abutting rubber elastic body 34 has a generally rectangular flat-plate shape with a constant thickness, like the elastic protruding portions 36 in the vibration damper 10 of the first embodiment. The each abutting rubber elastic body 34 has a groove-shaped cutout 54 which extend continuously or discontinuously in a width direction of the metallic mass 32.

A plurality of the independent mass member 16 constructed as described above, are accommodated within the accommodation spaces 12 of the housing 14, as in the first embodiment, to thereby constitute the vibration damper of the fifth embodiment of the invention. This vibration damper of the fifth embodiment can exhibit an excellent damping effect with respect to vibrations applied in the thickness direction of the independent mass members 16, based on the impact of the independent mass members 16 against the housing 14.

In particular, the independent mass member 16 of the fifth embodiment, the each abutting rubber elastic body 34 is formed with the cutout 54. The shape, size number and position of the cutout 54 may be suitably changed, whereby elastic characteristics of the abutting rubber elastic body 34 (i.e., the abutting surface 37) are suitably changed, and bouncing characteristics of the independent mass member 16 are accordingly desirably adjusted. Thus, the vibration damper of this embodiment is capable of varying frequency characteristics of its damping effect.

Figure 10:
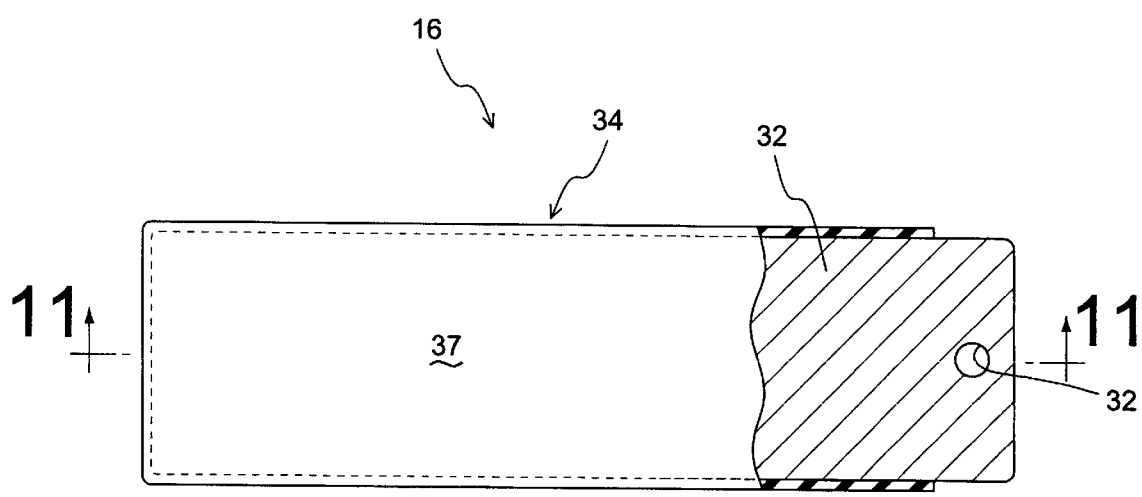
FIG. 10 is a partially sectional plane view of an independent mass member used in a vibration damper for vehicles constructed according to a sixth embodiment of the present invention.
Figure 11:
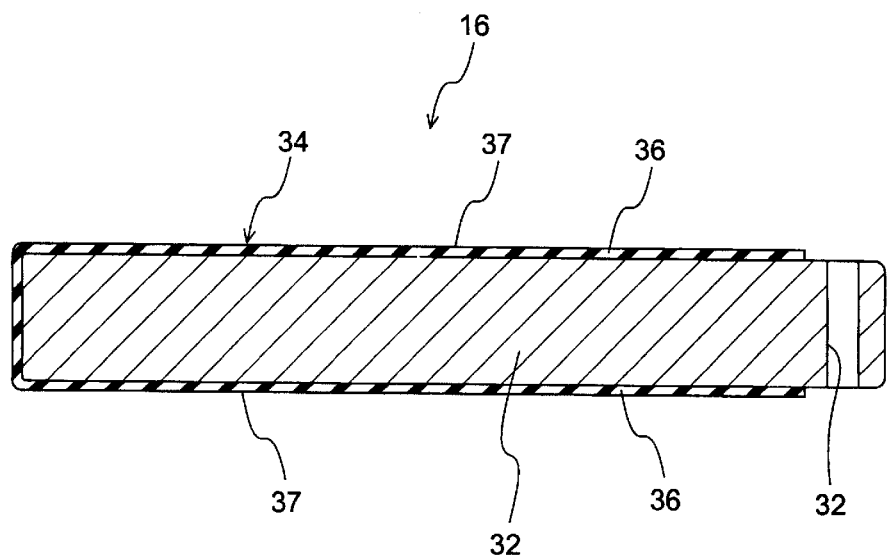
FIG. 11 is a cross sectional view taken along line 11—11 of FIG. 10.

Referring next to FIGS. 10 and 11, there is shown a independent mass member 16 used in a vibration damper constructed according to a sixth embodiment of the invention. The independent mass member 16 includes a rectangular flat-plate shaped metallic mass 32 as in the first embodiment, and an abutting elastic body 34 in the form of a coating layer (hereinafter referred to as the "coating rubber layer 34"). The coating rubber layer 34 is bonded by vulcanization to the substantially entire area of the metallic mass 32, with a substantially constant thickness. Only one of longitudinally opposite end portion of the metallic mass 32 is exposed to the atmosphere. That is, the coating rubber layer 34 is formed on both opposite major surfaces of the metallic mass 32 which are opposed to each other in the thickness direction of the metallic mass 32, and constitutes on the both surfaces elastic protruding portions 36, 36. Each of the elastic protruding portions 36 extends over the substantially entire area of the corresponding major surface of the metallic mass 32 and protrudes outwardly from the corresponding major surface of the metallic mass 32. The protruding end face of the elastic protruding portion 36 serves as an abutting surface 37.

A plurality of the independent mass member 16 constructed as described above, are accommodated within the accommodation spaces 12 of the housing 14, as in the first embodiment, to thereby constitute the vibration damper of the sixth embodiment of the invention. This vibration damper of the sixth embodiment can exhibit an excellent damping effect with respect to vibrations applied in the thickness direction of the independent mass members 16, based on the impact of the independent mass members 16 against the housing 14.

In the independent mass member 16 of the sixth embodiment, the coating rubber layer 34 is formed on the substantially entire area of the metallic mass 32 with the substantially constant thickness. Such a coating rubber layer 34 may be preferably formed as follow: First, a liquid rubber is applied by coating to a predetermined surface area of the metallic mass 32. The applied liquid rubber is bonded by vulcanization to the predetermined surface area of the metallic mass 32, thereby providing the coating rubber layer 34 which extends over the substantially entire area of the metallic mass 32 with the given constant thickness. In this respect, the excessively large thickness of the coating rubber layer 34 may cause distortion of the coating rubber layer due to shrinkage of the liquid rubber upon vulcanization, possibly resulting in deterioration of the dimensional accuracy of the covering rubber layer 34. The excessively small thickness of the coating rubber layer 34 may cause difficulty in assuring practical durability of the coating rubber layer 34. Therefore, the coating rubber layer 34 having a thickness within a range of 0.03–0.5 mm, more preferably 0.05–0.3 mm.

Figure 12:
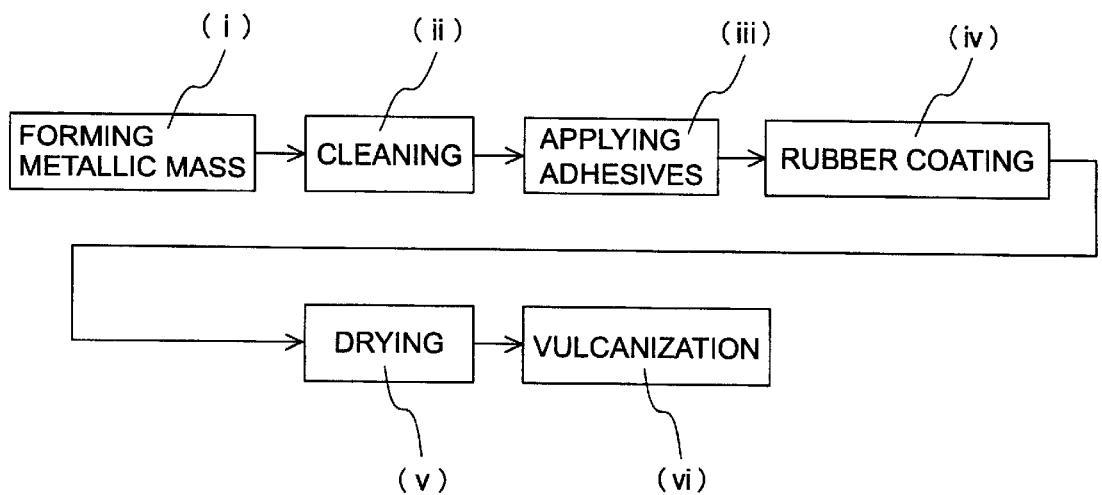
FIG. 12 is a simplified flow-sheet showing steps of manufacturing the independent mass member of FIG. 10.

There will be described a method of producing the coating rubber layer 34 with reference to FIGS. 12 and 13, by way of example. First, at the step (i) of FIG. 12, the rectangular flat-plate shaped metallic mass 32 is formed. The metallic mass 32 is formed with a through hole 56 formed at its longitudinally opposite end portion. Subsequently, at the step (ii) of FIG. 12, the metallic mass 32 is subjected to a cleaning or washing treatment. After the cleaning treatment is executed, the metallic mass 32 is subjected to other surface treatments such as degreasing, chemical conversion coating, or the like. Then, at the step (iii) of FIG. 12, a desired adhesive is applied to the surface of the metallic mass 32. For the adhesives, rubber chloride adhesives or phenolic adhesives may be employed, for example. At the following step (iv), the metallic mass 32 is subjected to a suitable rubber coating treatment, thereby providing the independent mass member 16 wherein a rubber coating layer 58 is formed on the surface of the metallic mass 32.

Figures 13A, 13B:
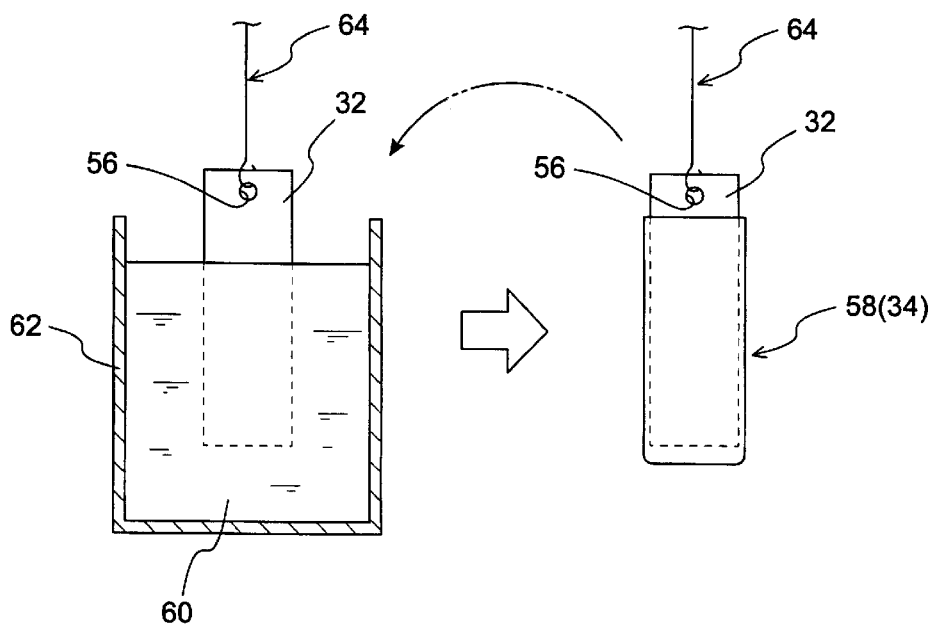
FIG. 13 is an illustrative view showing a part of steps of manufacturing the independent mass member of FIG. 10.

Referring to FIGS. 13A and 13B, there is shown show a method of the rubber coating treatment, by way of example. First, as shown in FIG. 13A, a suitable liquid rubber 60 to form the desired coating rubber layer 34 (58) is prepared. The composition of the liquid rubber 60 is not particularly limited. For instance, a natural rubber is mixed with suitable additives such as a vulcanizing agent, vulcanizing aid, antioxidant, plasticizer, softener and reinforcing filler, then is dissolved in a desired solvent, such as toluene. The thus prepared liquid rubber 60 is retained in a suitable container 62. The metallic mass 32 is dipped in the liquid rubber 60 retained in the container 62, whereby the rubber coating layer 58 is formed on the surface of the metallic mass 32, as shown in FIG. 13B. Upon dipping the metallic mass 32 in a mass of the liquid rubber 66, the metallic mass 32 is hanged and supported by a suitable hanger 64 whose support portion is inserted into and engaged with the through hole 56 of the metallic mass 32, thereby facilitating handing of the metallic mass 32.

Referring back to FIG. 12, the metallic mass 32 with the rubber-coating layer 58 formed thereon is then subjected to a drying treatment at the step (v). For instance, the drying treatment is executed as follow: The metallic mass 32 with the rubber coating layer 58 is exposed to the atmosphere having a optional temperature, for a predetermined period of time (e.g., 23° C.×24 hours), while being hanged by the hanger 64 with its vertical attitude. Finally, at the step (vi), the metallic mass member 28 is heated at a high temperature for a predetermined period of time (e.g., 150° C.×3 hours), whereby the rubber coating layer 58 is vulcanized and bonded to the surface of the metallic mass 32.

There is obtained the desired independent mass member 16 wherein the metallic mass 32 is substantially entirely covered by the coating rubber layer 34 secured thereon. As indicated by the allow in FIGS. 13, the step (iv) of the rubber coating and the step (v) of the drying may be alternately executed for several times, thereby forming a lamination of the rubber coating layers 58 having a relatively large wall-thickness, on the surface of the metallic mass 32.

As is apparent from the foregoing explanation, the independent mass member 16 includes the rubber coating layer 34 which is formed of the liquid rubber by coating, making it possible to form a thin-walled coating rubber layer 34 with high preciseness and with high effectiveness, in comparison with a conventional elastic rubber layer which is formed by vulcanizing a rubber material in a mold. Thus, the spacing distance between the abutting surfaces of the independent mass member and the housing 14 can be precisely controlled, resulting in high stability of damping characteristics of the vibration damper of the present embodiment.

Further, the thickness of the coating rubber layer 34 can be made small sufficiently, making it possible to enlarge the size of the metallic mass 32 as much as possible within the limited accommodation space 12, leading to a high degree of freedom in designing a dimension of the metallic mass 32. With the decrease of the thickness of the coating rubber layer 34, the independent mass member 16 can be made compact, leading to decrease in size of the vibration damper.

In addition, the coating rubber layer 34 can be formed with simple facilities, without requiring a mold, a mold clamping device and an injection device, those are conventionally used for forming the coating rubber layer by molding. Thus, the independent mass member 16 of this embodiment can be manufactured with a decreased manufacturing cost and with high efficiency.

The coating rubber layer 34 formed by coating of the liquid rubber has a wall-thickness which is sufficiently made smaller than the abutting elastic body (34) formed by vulcanization of a rubber material in a mold. Therefore, the coating rubber layer 34 is less likely suffer from or is free from a problem of deterioration of the dimensional accuracy thereof due to a shrinkage of the rubber material upon vulcanization, assuring high dimensional accuracy of the coating rubber layer 34.

The edges of the metallic mass member 32 are chamfered. This arrangement is effective to eliminate or reduce a problem of stress concentration at local portions of the coating rubber layer formed on or around the edges of the metallic mass member 32, upon collision between the independent mass member and the housing 14. The coating rubber layer 34 enjoys low possibility of damage or defects thereof, resulting in improved durability of the vibration damper constructed according to this embodiment.

In the independent mass member 16, the metallic mass member 32 has a through hole 56 formed at a portion away from the abutting surface 37 of the independent mass member 16, and the provision of the through hole 56 assures an easy handling of the metallic mass member during the above-indicated rubber coating operation, leading to high efficiency of the rubber coating operation.

In the illustrated rubber coating operation, the metallic mass 32 is hanged by and from the hanger 64 while having a vertical attitude. Namely, the metallic mass 32 extends downwardly from the hanger 64 in the vertical direction. In this condition, the metallic mass 32 is dipped in a mass of the liquid rubber 60. The metallic mass 32 with the rubber-coating layer 58 formed thereon, is then exposed to the atmosphere for the drying, while having the vertical attitude, whereby gravity acts evenly on the substantially entire area of the coating rubber layer 58. Thus, the coating rubber layer 58 is less likely to suffer from adverse effect of gravity, even in the case where a relatively long-time drying operation is required, whereby the coating rubber layer 34 can be formed with a substantially constant thickness, with high dimensional accuracy, especially in comparison with the case where the metallic mass 32 is held in a horizontal attitude during the drying operation.

According to the method of producing the coating rubber layer 34 as described above, the coating rubber layer 34 is formed on and bonded by vulcanization to a predetermined area of the metallic mass 32, which is previously subjected to cleaning treatments including washing and degreasing, and adhesive treatments including chemical conversion coating and application of an adhesive. While the predetermined area of the metallic mass 32 is adapted to impact against the housing 14 via the coating rubber layer 34, the coating rubber layer 34 has high stability resistive to a long-term use, without suffering from problems of peeling off of the coating rubber layer from the metallic mass 32, or the like, owing to the above-indicated treatment performed on the surface of the metallic mass 32.

Figure 14:
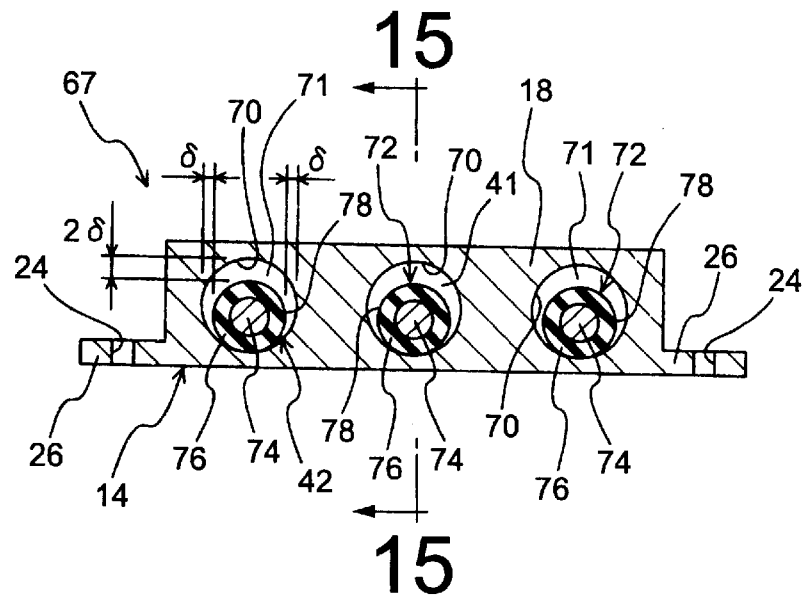
FIG. 14 is an elevational view in transverse cross section of a vibration damper constructed according to a seventh embodiment of the present invention.
Figure 15:
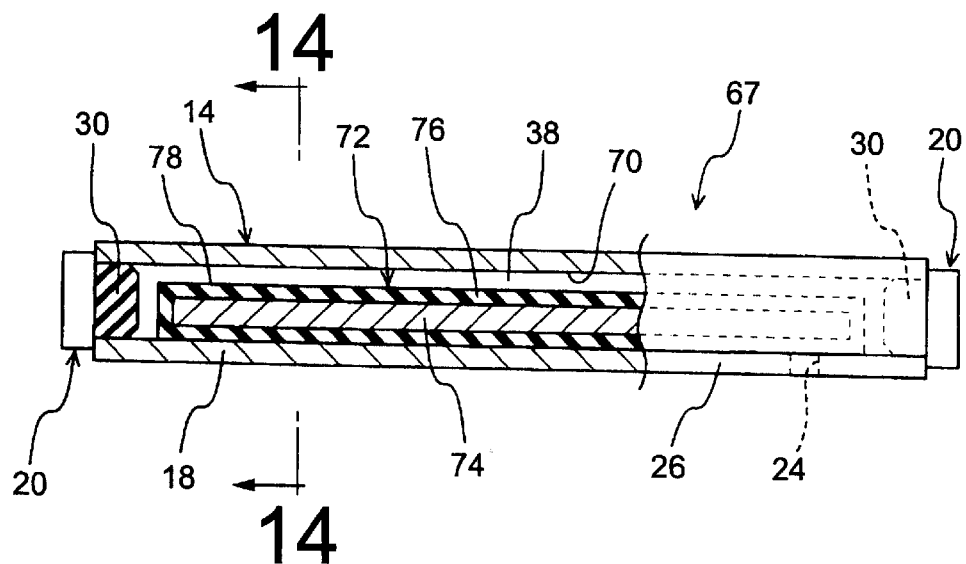
FIG. 15 is a cross sectional view taken along line 15—15 of FIG. 14.

Referring next to FIGS. 14 and 15, there is shown a vibration damper 67 constructed according to a seventh embodiment of the present invention. In the following embodiments, the reference numerals used in the preceding embodiment will be used to identify the structurally or functionally identical or corresponding elements, and redundant description of these elements will not be provided.

In the vibration damper 67 according to the seventh embodiment, the housing body 18 is provided with tree cylindrical through hole 70 which extend in the longitudinal direction of the housing 18 with a constant circular cross sectional shape and are juxtaposed with each other with given spacing therebetween in the direction perpendicular to the longitudinal direction of the housing 18. The opposite openings of the through holes 70 are respectively closed by the cover members 20, 20 fixed to the opposite ends of the housing 14, whereby three cylindrical interior spaces 71 as accommodation spaces are provided within the housing 14.

The vibration damper 67 includes three independent mass members 72 to be accommodated within the respective interior spaces 71, are also formed in a cylindrical shape. Each of the independent mass members 72 has an axial length which is slightly smaller than an axial length of the corresponding interior space 71. The each independent mass member 72 includes a cylindrical rod-shaped metallic mass 74 as a mass body and an abutting rubber elastic body 76 which is secured to and covers the entire area of the surface of the metallic mass 74. The abutting rubber elastic body 76 has constant wall thickness over the entire area, to thereby provide a smooth outer circumferential surface 78. In this embodiment, the smooth outer circumferential surface 78 of the abutting rubber elastic body 76 serves as the abutting surface of the independent mass member. The outer circumferential surface 78 have a Shore D hardness of 80 or lower, more preferably, within a range of 20–40, a modulus of elasticity within a range of $1$–$10^4$ MPa, more preferably, $1$–$10^3$ MPa, and a loss tangent is not less than $10^{-3}$, more preferably within a range of 0.01–10. The outer diameter of the abutting rubber elastic body 76 is dimensioned to be slightly smaller than the inner diameter of the interior space 71.

More specifically described, the outer diameter of the abutting rubber elastic body 76, i.e., the diameter of the independent mass member 72 are suitably dimensioned such that the independent mass member 72 and the corresponding interior space 71 are spaced apart from each other with a given radial spacing: δ therebetween, when the mass member 72 and the interior space 71 are positioned in a substantially concentric or coaxial relationship with each other. This arrangement permits a displacement or movement of the independent mass member 72 independent of the housing 14. For establishing a high damping effect of the vibration damper 67 with respect to an input vibration applied in directions perpendicular to the axial direction of the interior space 71, the above-mentioned radial spacing: δ between the interior space 71 and the outer circumferential surface 78 is determined to be held within a range of 0.05–0.8 mm. That is, with the vibration-damping device 67 being installed in position as illustrated in FIG. 14, the each independent mass member 72 is placed on the lower end portion of the interior space 71 as seen in FIG. 14 due to gravity acting on the independent mass member 72, while being spaced apart from the upper end portion of the interior space 71 with a radial spacing: 2δ (2δ=0.1–1.6 mm) therebetween.

The each independent mass member 72 has a suitable amount of mass so that the total amount of mass of the all mass members 72 is held within a range of 5–10% of the mass of the vibrative body. In the present embodiment, for example, the each independent mass member 72 has a mass of 10–1000 g.

In the thus constructed vibration damper 67 of the second embodiment, the independent mass members 72 are forcedly displaced or moved relative to and independent of the housing 14, upon application of a vibrational load to the damper 67. That is, the independent mass members 72 are forced to move into and impact the inner wall of the housing 14, whereby the vibration damper 67 exhibits a desired vibration-damping effects with respect to the input vibrations, owing to effects of impacts of the independent mass members 72 with respect to the housing 14, likewise the first embodiment. Further, the use of the plurality or divided independent mass members 72 (e.g., three mass members 72 in the present embodiment) permits a decrease in a required mass of the each independent mass member 72, effectively exciting bouncing displacement or movement of the independent mass member 72 relative to the housing 14, upon application of a vibrational load to the vibration damper 67. Therefore, the vibration damper 67 using the plurality of mass members 72 can exhibits an excellent vibration-damping effect, in comparison with a damper wherein a single independent mass member is used.

In addition, the outer circumferential surface 78 of the each independent mass member 72 and the inner circumferential surface of the through hole 70, in other words, the abutting surfaces of the each independent mass member 72 and the housing 14 have similar cylindrical configurations. In this arrangement, the vibration damper 72 is capable of exhibiting a high and stable damping effect with respect to input vibrations applied in any radial directions perpendicular to the axial directions of the interior spaces 71 of the housing 14.

Figure 16:
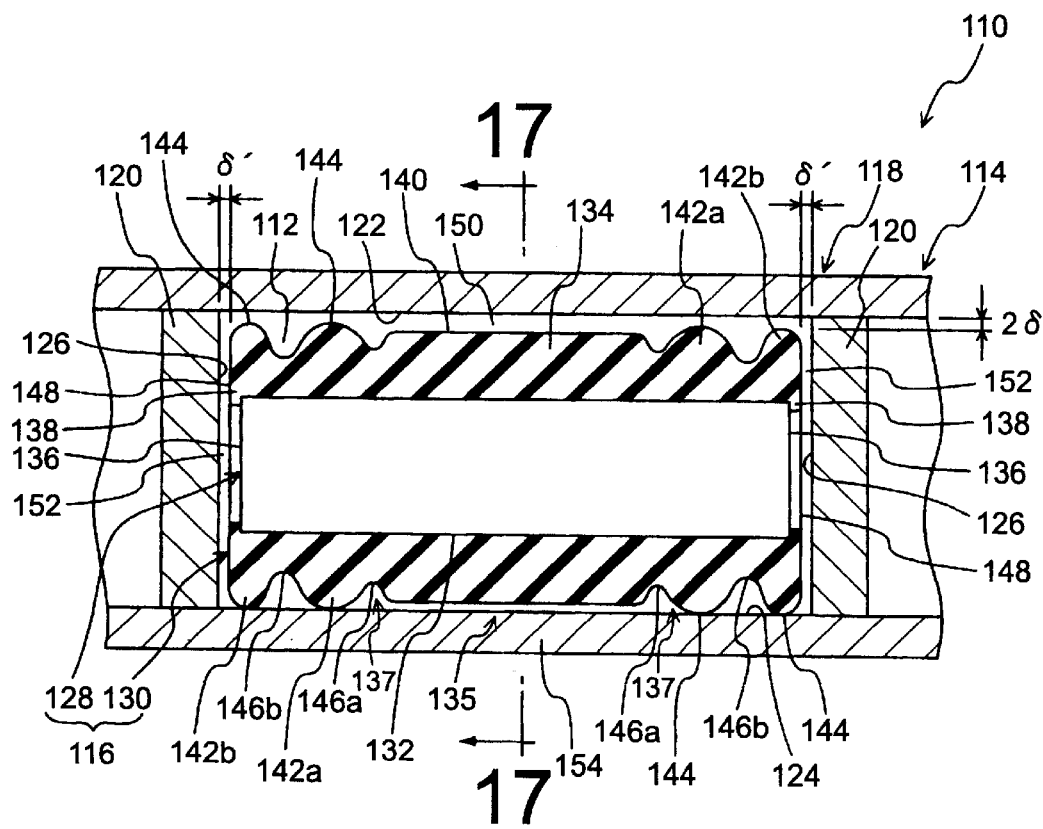
FIG. 16 is an longitudinal cross sectional view showing a part of a vibration damper for vehicles constructed according to a eighth embodiment of the present invention.
Figure 17:
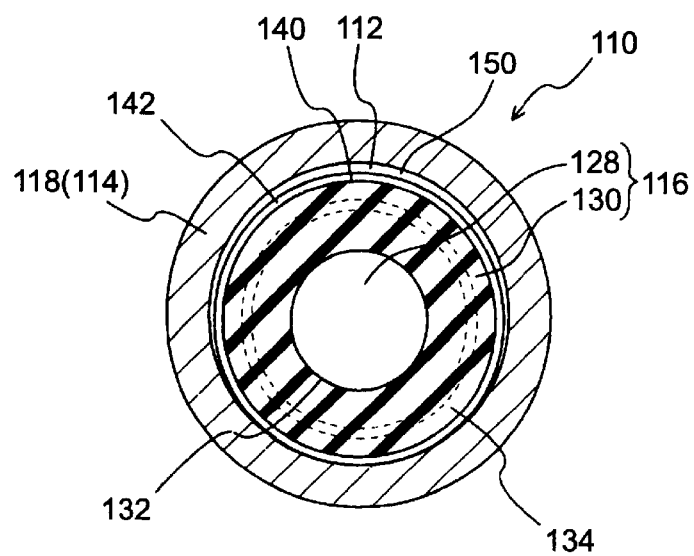
FIG. 17 is a cross sectional view taken along line 17—17 of FIG. 16.

Referring next to FIGS. 16 and 17, there is shown a vibration damper 110 constructed according to a eighth embodiment of the present invention. The vibration damper 110 includes a hollow cylindrical shaped housing 114 having a plurality of interior space 112 which are spaced apart from each other in the axial direction. At least one independent mass member 116 is accommodated within the each interior space 112. It should be noted that the vibrative member such as a suspension arm constitutes the housing 114, in this embodiment. In FIGS. 16 and 17, one of the plurality of interior space 112 and one of the plurality of independent mass members 116 accommodated within the interior space 112 are illustrated.

The housing 114 consists of a housing body 118 in the form of a generally thick-walled cylindrical plate, and cover members 120, 120 fixed to the longitudinally opposite end face of the housing body 118. The housing body 118 has a bore 122 extending therethrough in its longitudinal direction with a constant cylindrical cross sectional shape. The housing body 18 is formed of an aluminum alloy by extrusion. The housing body 18 is also made rigid enough to have a modulus of elasticity of $5 \times 10^3$ MPa or more.

Each of the cover members 120 is a circular plate member whose configuration is similar to that of the corresponding one of the longitudinal opposite end face of the housing body 118. The each cover member 120 has a diameter slightly smaller than the inside diameter of the bore 122, The cover members 120 are forcedly pushed into the bore 122 such that the cover members 120 are fixed into and supported by the axially opposite end portions of the bore 122, respectively, That is, axially opposite open ends of the bore 122 are closed by the cover members 120, thereby providing within the housing 114 the cylindrical interior space 112 which is defined by the inner circumferential surface 124 of the housing body 118 and inner surfaces 126 of the respective cover members 120.

Within the interior space 112, there is accommodated the independent mass member 116 whose configuration is similar to and slightly smaller than that of the interior space 112. The independent mass member 116 includes a metallic mass 128 as a mass body and an abutting rubber elastic body 130. The metallic mass 128 is a solid cylindrical rod member made of a metallic material such as iron. The abutting rubber elastic body 130 is formed on and secured to the outer circumferential surface 132 of the metallic mass 128. The abutting rubber elastic body 130 includes a thick-walled cylindrical portion 134 disposed radially outwardly on the outer circumferential surface 132 of the metallic mass 128 so as to generally entirely cover the outer circumferential surface 132 of the metallic mass 128. The abutting rubber elastic body 130 is also includes a pair of thin-walled annular portions 138, 138 which are formed on and secured to the peripheral portions of the opposite circumferential end faces of the metallic mass 128, respectively.

The thick-walled cylindrical portion 134 of the abutting rubber elastic body 130 includes a plurality of projections 142 (e.g., four projections 142 in the present embodiment) formed on and protrude radially outwardly from the outer circumferential surface thereof with a given height within a range of 0.5–1.0 mm and with a given width within a range of 1.0–3.0 mm. Described in detail, the thick-walled cylindrical portion 134 includes a central portion 135 whose outer diameter is made substantially constant over its axial length, and a pair of side portions 137, 137 which are opposed to each other in the axial direction with the central portion 135 interposed therebetween. Each of the side portions 137 includes a first projection 142a, a second projection 142b, a-first groove 146a and a second groove 146b, which are all extending in the circumferential direction over the circumference of the thick-walled cylindrical portion 134. These projections and grooves are arranged in the axial direction of the thick-walled cylindrical portion, such that the first projection 142a is spaced apart from the central portion 135 with the first groove 146a interposed therebetween, and the second projection 142b is spaced apart from the first projection 142a with the second groove 146b interposed therebetween.

The first and second projections 142a, 142b protrude radially outwardly from the outer circumferential surface of the thick-walled cylindrical portion 134 of the abutting rubber elastic body 130, with a generally semi-circular shape in cross section. That is, each of the first and second projections 142a, 142b has a width or axial dimension whose values gradually decreased in the radially outward direction, so that the protruding end portions of the first and second projections 142a, 142b serve as tip end portions 144, 144 respectively. On the other hand, the first and second grooves 146a, 146b are open in the outer circumferential surface of the thick-walled cylindrical portion 135 and extend in the circumferential direction with a generally semi-circular shape in cross section.

In the each side portion 137 of the thick-walled cylindrical portion 134 of the abutting rubber elastic body 130, the first projection 142a is interposed between the first and second grooves 146a, 146b in the axial direction, while the second protrusion is interposed between the second annular groove 146b and the corresponding one of the opposite axial end faces 136 of the thick-walled portion in the axial direction. This arrangement permits that the first and second projections 142a, 142b have sufficiently large free surface areas thereof enough to exhibit relatively low dynamic spring constants thereof. It should be noted that the configurations of the first and second projections 142a, 142b and the first and second grooves 146a, 146b are not particularly limited. In the present embodiment, for instance, the first projection 142a has an axial dimension which is made larger than that of the second projection 142b, while the second groove 146b has a depth which is made larger than that of the first groove 146a.

The independent mass member 116 including the abutting rubber elastic layer 130 has an outer diameter which is slightly smaller than the inside diameter of the interior space 112, while being disposed within the interior space without being bonded to the interior space 112. In this condition, the independent mass member 116 is independent of the housing 114, while being displaceable relative to the housing 114.

With the independent mass member 116 and the accommodation space 112 being held in substantially coaxial relationship with each other (hereinafter referred to as the "central position of the independent mass member"), the most outer circumferential surface of the independent mass member 116 (i.e., the tip end portions 144, 144 of the first and second projections 142a, 142b) is spaced apart from the inner circumferential surface of the accommodation space 112 with a predetermined radial spacing 150 having a dimension: δ therebetween over the entire circumference. Further, the axial length of the independent mass member is made smaller than that of the accommodation space, such that the axially opposite end faces (i.e., the thin-walled annular portions 138, 138) of the independent mass member are spaced apart from the respective inner surfaces of the cover members 20, 20 by a predetermined axial spacing 150 having a dimension: δ, which is substantially equal to the predetermined radial spacing 150. As is apparent from FIG. 16, the independent mass member 116 is held in contact with the lower surface of the accommodation space 112, and are spaced apart from the upper surface of the accommodation space 112 with a radial spacing: 2δ therebetween, in the static state of the vibration damper 110, where the housing is not subjected to the vibration of the vibrative body.

With the independent mass member 116 being located in the above-indicated central portion, the outer most circumferential surface of the independent mass 116 is opposed to the inner circumferential surface 124 of the housing body 118 with the spacing 150 therebetween. Namely, the independent mass member 116 is movable into the inner circumferential surface 124 of the housing 114 by the distance: δ in opposite diametric directions perpendicular to the axial direction of the housing 114, whereby the independent mass member 116 is brought into elastic impact against the inner circumferential surface 124 of the housing 114, in the diametric directions perpendicular to the axial direction. When the independent mass member 116 is displaced relative to the housing 114 the axial direction, the axially opposite end faces 148, 148 of the independent mass member 116 are movable into the respective inner surfaces 126 of the cover members 120 by the distance: δ in the opposite axial directions, whereby the independent mass member 116 is brought into elastic impact at its axially opposite end faces 148, 148 against the respective inner surfaces 126 of the cover members 120. That is, the independent mass member 116 is reciprocally movable relative to the housing 114 by the distance: 2δ in the axial and diametrical directions. Like the aforementioned embodiments, the distance: δ of the spacing 150 is preferably determined to satisfy the following equation: 0.05 mm $\leq \delta \leq 0.8$ mm.

When the vibrational load is applied to the vibration damper 110 in the diametric direction perpendicular to the axial direction of the housing 114, the independent mass member 116 is excited to make the bouncing displacement relative to the housing 114 within the interior space 112, whereby the independent mass member 116 is forced to move into and impact the housing 114 in the vibration input direction. Based on the impact of the independent mass member 116 on the housing 114, the vibration damper 110 can exhibit excellent vibration damping effect with respect to the input vibrations, likewise the aforementioned embodiments of the present invention.

It should be appreciated that the damping characteristics of the vibration damper 110 of the present embodiment depends upon the spacing distance: δ between the abutting surface of the independent mass member and the abutting surface of the housing. In the present embodiment, particularly, the first and second projections in the abutting rubber elastic body 130 of the independent mass member 116 and the inner circumferential surface 124 of the housing 114, both serving as the abutting surfaces, are cylindrical surfaces which are held in coaxial relationship when the independent mass member is located in the above-indicated central portion thereof. This arrangement permits the substantially constant maximum distance of the relative movement between the independent mass member 116 and the housing 114 toward and away from each other in all diametrical directions. Thus, the vibration-damping device 110 of the present embodiment can exhibits substantially constant damping effect with respect to vibrations applied in any diametrical directions. Owing to this advantage of the present embodiment, the vibration damper 110 may be desirably installed in the vibrative member, without any limitation in orientation. Namely, the vibration damper 110 can exhibit a desired damping effect with high stability, regardless of its orientation.

According to the vibration damper 110 of the present embodiment, the first and second projections 142a, 142b formed on the outer circumferential surface of the abutting rubber elastic body 130 of the independent mass member 116. That is, the independent mass member 116 elastically impacts at the first and second projections 142a, 142b thereof on the inner circumferential surface 124 of the housing 114. This means that the abutting surfaces of the independent mass member 116 is constituted by the first and second projections 142a, 142b, and have a relatively low spring characteristics. This arrangement permits that a coefficient frequency of the bouncing movement of the independent mass member 116 relative to the housing 114, is tune to a relatively low frequency band. Accordingly, the independent mass member 116 is likely to be excited to make the bouncing movement, even upon application of a relatively low vibrational energy or load to the vibration damper 110. Thus, the vibration damper 110 of the present embodiment is capable of exhibiting an excellent damping effect based on the impact of the independent mass member 116 on the housing 114 in the vibration input direction, even in the case where low frequency vibrations are applied to the damper 110.

Since the independent mass member 116 elastically impacts on the housing 114 via the first and second projections 142a, 142b whose spring characteristics are made soft, leading to further improved minimization or elimination of the impact noise upon impact of the mass member 116 on the housing 114.

As is apparent from the forgoing description, the first and second projections 142a, 142b serve as the abutting surface of the independent mass member 116. The first and second projections 142a, 142b have a Shore D hardness of 80 or lower, more preferably, within a range of 20–40, a modulus of elasticity within a range of $1-10^4$ MPa, more preferably, 1–10³ MPa, and a loss tangent is not less than 10⁻³, more preferably within a range of 0.01–10.

Figure 18:
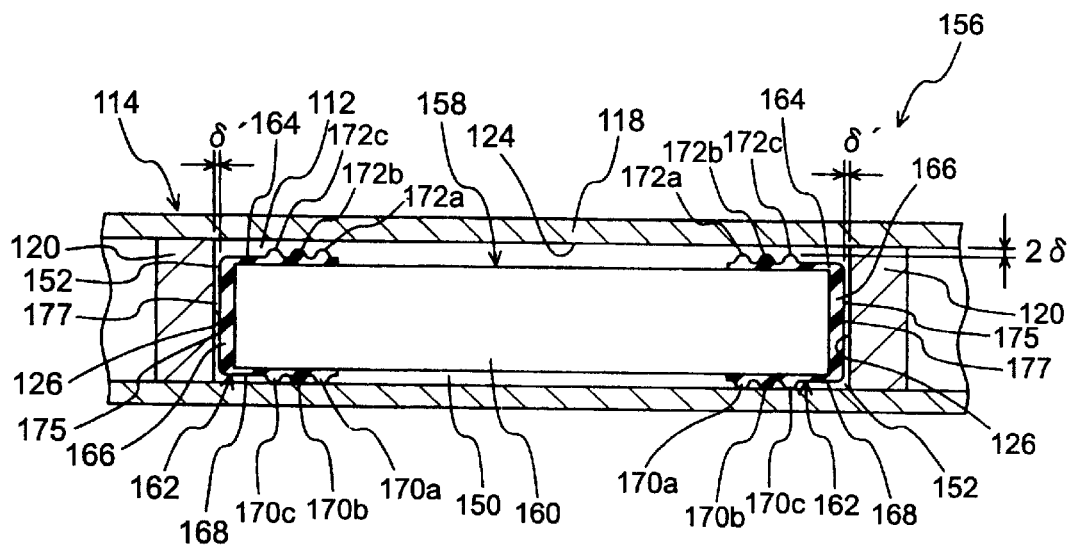
FIG. 18 is an longitudinal cross sectional view showing a part of a vibration damper for vehicles constructed according to a ninth embodiment of the present invention.
Figure 19:
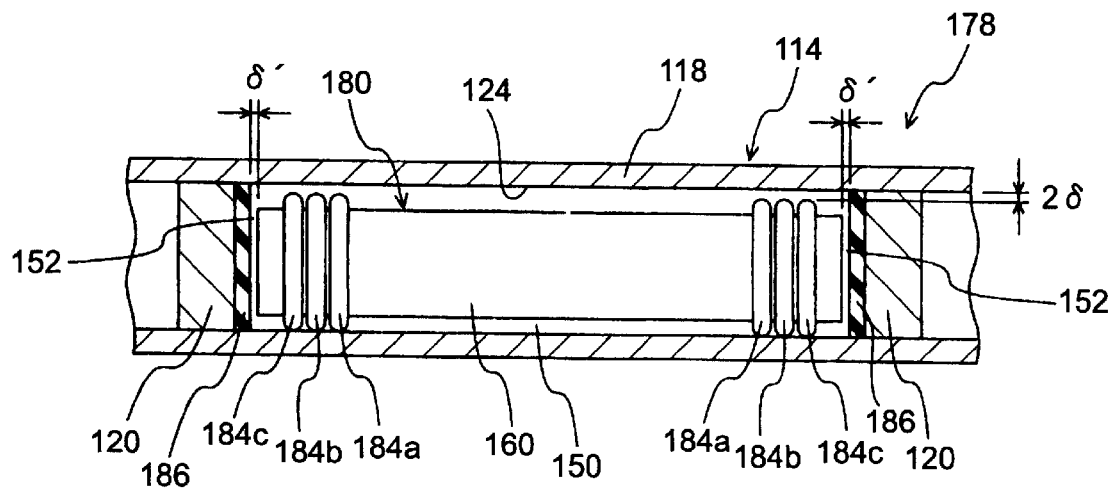
FIG. 19 is an longitudinal cross sectional view showing a part of a vibration damper for vehicles constructed according to a tenth embodiment of the present invention.

Referring next to FIGS. 18 and 19, there are shown a ninth and a tenth embodiment constructed according to the present invention, respectively. These embodiments are different from the aforementioned eighth embodiment in the construction of the independent mass members. In the following ninth and tenth embodiments, the reference numerals used in the eighth embodiment will be used to identify the structurally or functionally identical or corresponding elements, and redundant description of these elements will not be provided, in the interest of brevity and simplification of the description.

Referring to FIG. 18, a vibration damper 156 constructed according to the ninth embodiment of the present invention includes a plurality of independent mass members 158 whose construction is different from the independent mass members 116 used in the vibration damper 110 of the eighth embodiment. Like the eighth embodiment, one of the plurality of independent mass members 158 accommodated within one of the plurality of interior space 112 of the housing 114 is shown in FIG. 18. The independent mass member 158 includes a solid cylindrical rod shaped metallic mass 160 as a mass body and a pair of rubber caps 162, 162 which are fitted onto opposite axial end portions of the metallic mass 160. Each of the rubber caps 162 has a cylindrical shape and includes a cylindrical portion 164 and a bottom wall portion 164 which is integrally fixed to one of axially opposite end faces of the cylindrical portion 164. Namely, the one opening of the cylindrical portion 164 is closed by the bottom wall portion 164. The pair of rubber cups 162 are inserted onto and adhere to axially opposite end portions of the metallic mass 160, respectively. In each of the axially opposite end portion of the metallic mass 160, the circumferential surface and the axial end face are covered by the cylindrical portion 164 and the bottom wall portion 166 of the corresponding rubber cap 162, respectively. The cylindrical and bottom wall portions 164, 166 of the rubber cup 162 are closely fitted on the respective surfaces of the metallic mass 32.

The each rubber cap 162 includes a plurality of ridges 170 (e.g., three ridges 170 in the present embodiment) which are integrally formed on the outer circumferential surface of the cylindrical portion 164. The three ridges 170a, 170b, 170c protrude radially outwardly from the outer circumferential surface 168 with a given height within a range of 0.5–1.0 mm and with a given width within a range of 1.0–3.0 mm, while extending in the circumferential direction over the entire circumference of the cylindrical portion 164. The ridges 170a, 170b, 170c are spaced apart from each other in the axial direction of the cylindrical portion 164. The ridges 170a, 170b, 170c have the same semicircular cross sectional shape, and have respective tapered tip end portions 172a, 172b, 172c. The thus constructed independent mass member 158 is brought into elastic impact at its ridges 170a, 170b, 170c against the housing 114. As is apparent from the forgoing description, these ridges 170a, 170b, 170c constitute the abutting surface (protrusion) of the independent mass member, in the present embodiment. The ridges 170a, 170b, 170c have a Shore D hardness of 80 or lower, more preferably, within a range of 20–40, a modulus of elasticity within a range of 1–10⁴ MPa, more preferably, 1–10³ MPa, and a loss tangent is not less than 10⁻³, more preferably within a range of 0.01–10.

The vibration damper 156 constructed as described above receives vibrations applied primary in the axial direction and the diametrical direction perpendicular to the axial direction of the housing 114. Upon application of the diametrical vibrational load, the independent mass member 158 is forced to move into the housing 114 in the diametrical direction, and elastically impact the housing 114 at its ridges 170a, 170b, 170c having the dynamic spring characteristics which is made lower than that of the outer circumferential surface 168 of the rubber cap 162. Upon application of the axial vibrational load, the independent mass member 158 is forced to move into the housing 114 in the axial direction, and impact at opposite axial end faces of the independent mass member 175 on the respective inner surfaces 126 of the cover members 120. Likewise the eighth embodiment, the vibration damper 156 of the present embodiment can exhibit excellent damping effects with respect to vibrations applied in the axial direction and the radial direction perpendicular to the axial direction.

The rubber caps 162 may be integrally formed with the metallic mass 160 by vulcanizing a suitable rubber material for forming the rubber caps 162 within a mold for molding the rubber caps 162 wherein the metallic mass 160 is disposed in position. Alternatively, the rubber caps 162 may be formed independently of the metallic mass 160, such that the rubber caps 162 is inserted onto the opposite axial end portions of the metallic mass 160. In this case, the rubber caps 162 may be bonded by adhesives to, or alternatively removably fitted onto the opposite axial end portions of the metallic mass 160.

Referring next to FIG. 19, there is shown a vibration damper 178 constructed according to the tenth embodiment of the present invention. The vibration damper 178 includes a plurality of independent mass members 180 each of which is a modification of the independent mass member 158 used in the ninth embodiment. Like the eighth and ninth embodiments, one of the plurality of independent mass members 180 accommodated within one of the plurality of interior space 112 of the housing 114 is shown in FIG. 19. The independent mass member 180 includes a solid cylindrical rod shaped metallic mass 160 and a plurality of rubber rings 184 (e.g., six rubber rings 184 in the present embodiment) inserted onto the outer circumferential surface of the metallic mass 160. More specifically, three rubber rings 184a, 184b, 184c are disposed radially outwardly on each of the axially opposite end portions of the metallic mass 160, such that the three rubber rings 184a, 184b, 184c are spaced apart from one another in the axial direction of the metallic mass 160. That is, the rubber rings 184 protrude radially outwardly from the outer circumferential surface of the metallic mass 182 with a given height within a range of 0.5–1.0 mm and with a given width within a range of 1.0–3.0 mm, so that the independent mass member 180 is brought into elastic impact against the inner circumferential surface of the housing body 118 via the rubber rings 184, upon application of a vibrational load in the diametric direction perpendicular to the axial direction of the housing 114. This means that the rubber rings 184 constitute the abutting surfaces of the independent mass member 180 in this embodiment. The rubber rings 184 have a Shore D hardness of 80 or lower, more preferably, within a range of 20–40, a modulus of elasticity within a range of 1–10⁴ MPa, more preferably, 1–10³ MPa, and a loss tangent is not less than 10⁻³, more preferably within a range of 0.01–10.

The inner surfaces 126 of the cover members 120 are entirely covered by disk-like shaped covering rubber layers 186, which extend in the diametric direction and are secured to the inner surfaces of the cover members 120, respectively. Upon displacement of the independent mass member 180 in the axial direction, the independent mass member 180 is brought into elastic impact against the inner surfaces of the housing 114 (i.e., the cover members 120, 120) via the covering rubber layers 186.

Like the aforementioned eighth and ninth embodiments of the present invention, the vibration damper 178 constructed according to the present embodiment is capable of exhibiting high damping effects with respect to any vibrations applied in any diametric directions and the axial direction, based on the effects of the elastic impact of the independent mass members 180 on the housing 114. In this respect, the rubber rings 184 serving as the abutting surface of the independent mass member 180 have a relatively large free surface area, permitting a relatively low dynamic spring characteristics of the abutting surface of the independent mass member 180. Thus, the vibration damper 179 can exhibit an excellent damping effect with respect to vibrations in the significantly low frequency band.

According to the present embodiment, the independent mass member 180 having the abutting surface with a suitable low dynamic spring characteristics may be formed by simply inserting a desired number of rubber rings 184 onto the outer circumferential surface of the metallic mass 160. This facility in manufacturing the independent mass member 180 results in improved efficiency in the manufacture of the vibration damper 178.

Like the rubber caps 162 of the ninth embodiment, the each rubber ring 184 may be fixedly bonded onto or alternatively removably fitted onto the outer circumferential surface of the metallic mass 160. When the rubber rings 184 are non-adhesively fitted onto the outer circumferential surface of the metallic mass 116, the metallic mass 160 may have grooves open in the outer circumferential surface thereof, so that the rubber rings 184 are engaged at their bottom portion with the grooves, respectively.

In the above-described vibration damper 110, 156, 178 constructed according to the eighth, ninth and tenth embodiments, the plurality of independent mass members 116, 158, 180 are accommodated within the plurality of interior space 112 of the housings 114, respectively. The present invention is not limited to the illustrated construction, but may otherwise be embodied.

Figure 20:
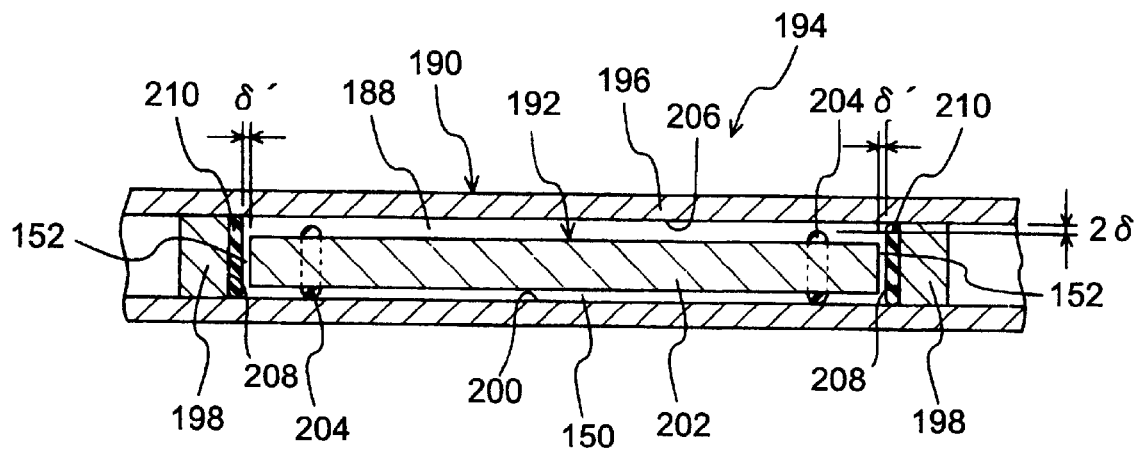
FIG. 20 is an longitudinal cross sectional view showing a part of a vibration damper for vehicles constructed according to a tenth embodiment of the present invention.
Figure 21:
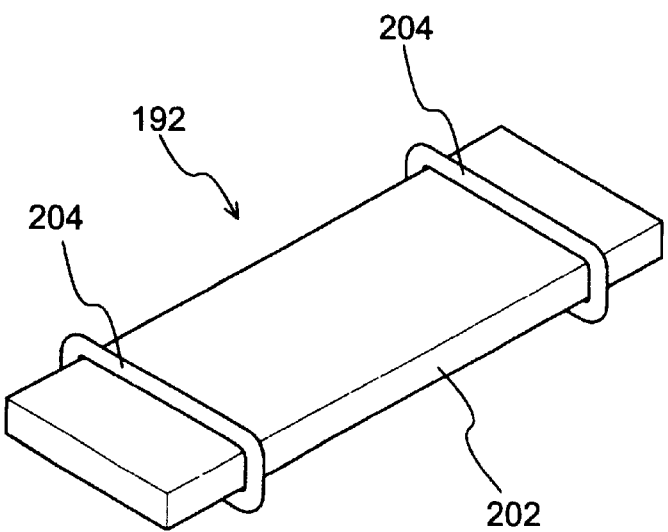
FIG. 21 is a perspective view showing an independent mass member used in the vibration damper of FIG. 20.

Referring next to FIGS. 20 and 21, there is shown a vibration damper 194 constructed according to the eleventh embodiment of the present invention. The vibration damper 194 includes a rectangular box-like shaped housing 190 having a plurality of interior spaces 188 each accommodating a independent mass member 192. FIG. 21 shows one of the plurality of interior spaces 188 and the independent mass 190 accommodated in the one interior space 188. The housing 190 includes a metallic housing body 196 and a pair of metallic cover members 198 which are fitted to the axially opposite end portion of the housing 190. The housing body 190 has a plurality of through holes 200 which extend in the longitudinal direction with a substantially constant rectangular cross sectional shape.

The cover members have a plurality of rectangular shaped protruding portions 198 which are forcedly pressed into the openings of the through holes 200, respectively, whereby are provided a plurality of rectangular shaped interior spaces 188 each defined by the corresponding through hole 200 and the corresponding rectangular protruding portions of the cover members 198, 198.

Within the each interior space 188, there is accommodated the independent mass 192 whose outside configuration is smaller than the configuration of the interior space 188. The independent mass 192 includes a rectangular flat-place shaped metallic mass 202 and a pair of rubber rings 204 which are disposed radially outwardly on the outer circumferential surface of the axially opposite end portions of the metallic mass 202, so as to protrude axially outwardly from the outer circumferential surface of the metallic mass 202 with a given height within a range of 0.5–1.0 mm and with a given width within a range of 1.0–3.0 mm. Upon application of a vibrational load in a direction perpendicular to a longitudinal direction of the housing 190, the independent mass member 192 is displaced relative to the housing 190 in the direction perpendicular to the longitudinal direction. Namely, the independent mass member 192 is forced to move into and impact the inner surface of the interior space 188 (i.e., the inner surface of the housing), via the rubber rings 204. This means that the rubber rings 204 constitute the abutting surface of the independent mass member 192 in the present embodiment. The rubber rings 204 have a Shore D hardness of 80 or lower, more preferably, within a range of 20–40, a modulus of elasticity within a range of $1-10^4$ MPa, more preferably, $1-10^3$ MPa, and a loss tangent is not less than $10^{-3}$, more preferably within a range of 0.01–10.

On the other hand, the protruding end faces 208 of the cover members 198 are entirely covered by covering rubber layers 210 fixedly secured thereto, like in the tenth embodiment. Each of the covering rubber layers 210 extends over the entire area of the corresponding end face 208 with a constant thickness. Upon application of a vibrational load in the axial direction, the independent mass member 192 is forced to move in the axial direction, and elastically impact the cover members 198 of the housing 190 via the covering rubber layers 210.

Figure 22:
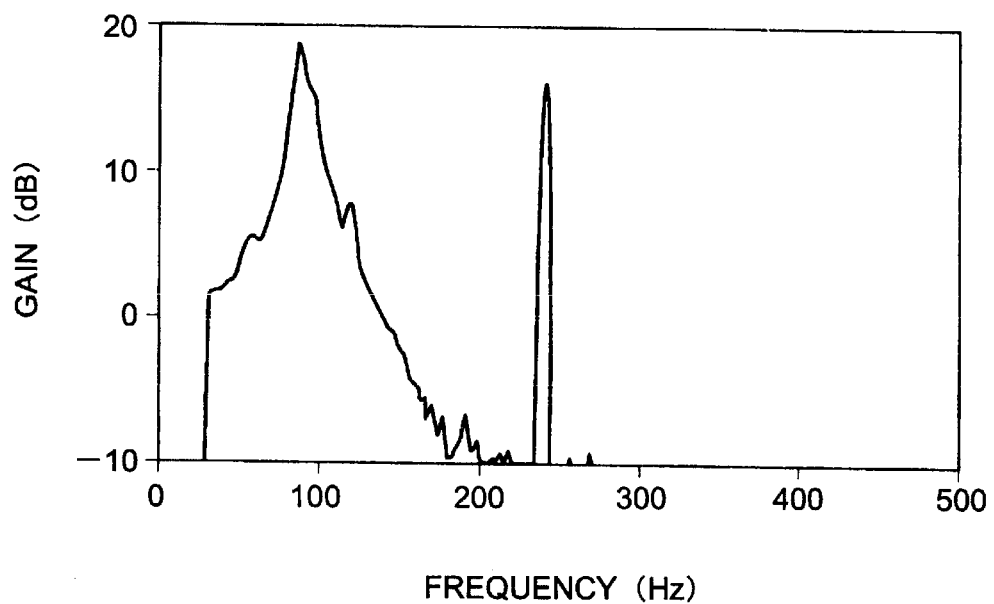
FIG. 22 is a graph showing oscillating characteristics of the independent mass member of FIG. 20.

Accordingly, the vibration damper 194 constructed according to the present embodiment is capable of exhibiting an excellent damping effect with respect to a vibrational load applied in the thickness and longitudinal directions of the independent mass member 192. The frequency characteristics of the vibration excited in the independent mass member 192 of the vibration damper 192 were actually measured, when the vibration damper 192 oscillating by an optional condition. The measurement is indicated in a graph of FIG. 22. As is apparent from the graph of FIG. 22, the vibration damper 194 excites a significantly increased bouncing movement of the independent mass member 192 owing to the resonance of the independent mass member 192, upon application of vibrational loads over the frequency range between 50 Hz and 130 Hz. Namely, the independent mass member 192 can be easily bounced upon application of the low frequency vibration, owing to resonance thereof. Therefore, the vibration damper 194 is capable of exhibiting a high damping effect with respect even to the low frequency vibrations, e.g. vibrations having a frequency of not greater than 100 Hz, owing to the resonance of the independent mass member 192 which excite increased number of impacts of the independent mass member 192 on the housing 190.

With respect to the vibration dampers 110, 156, 178, 194 constructed according to the eighth through eleventh embodiments of the present invention, the arrangements of the annular ridges 142, 170 and the rubber rings 184, 204 are not particularly limited to the illustrated embodiments. For instance, it is possible to form an elastic projections on the axially opposite end faces of the independent mass member 116, 158, so that the independent mass member 116, 158 is brought into impact against the cover members of the housing 114 via the elastic projections. These elastic projections may be employed in place of or in addition to the annular ridges 142, 170 or rubber rings 184, 204 formed on the outer circumferential surface of the metallic mass 128, 160, 182, 202, so that the vibration damper may exhibit an excellent damping effects with respect to vibrations applied in the axial direction and the diametric directions perpendicular to the axial direction. Alternatively, a plurality of elastic projections having a cone shape or a dot shape may be formed on the outer surface of the metallic mass 128, 160, 182, 202. These elastic projections are desirably arranged taking into account a vibration input direction, an orientation of the vibration damper in the vibrative member, or the like. While the rubber rings 184, 204 are disposed so as to extend in the circumferential direction of the metallic mass 182, 202, these rubber rings may be fixed on the metallic mass member so as to extend parallel to each other in the axial direction.

In the above-described vibration damper 110, 156, 178, 194, the housing 114, 190 includes the closed interior space 112, 188 for accommodating the independent mass member 116, 158, 180, 192. The closed interior space of the housing is not essential to practice the present invention. For instance, the interior space may be open in its opposite end portions. In this case, the surface of the independent mass member, which is opposed to the interior space in the vibration input direction, serves as the abutting surface of the independent mass member.

The vibration damper constructed according to the present invention may be made compact in size, leading to high degree of freedom in determining a position for installing the vibration damper. For instance, the vibration damper of the present invention may be installed in members of suspension systems such as a control arm, an engine bracket, a body, members of a suspension system, such as a suspension arm, and the like. In any cases, the vibration damper can exhibit an excellent damping effect with respect to vibrations over different frequency bands, based on loss of energy upon impact of the independent mass member on the housing, and a sliding friction generated between the abutting surfaces of the mass member and the housing upon impact of the mass and housings.

Figure 23:
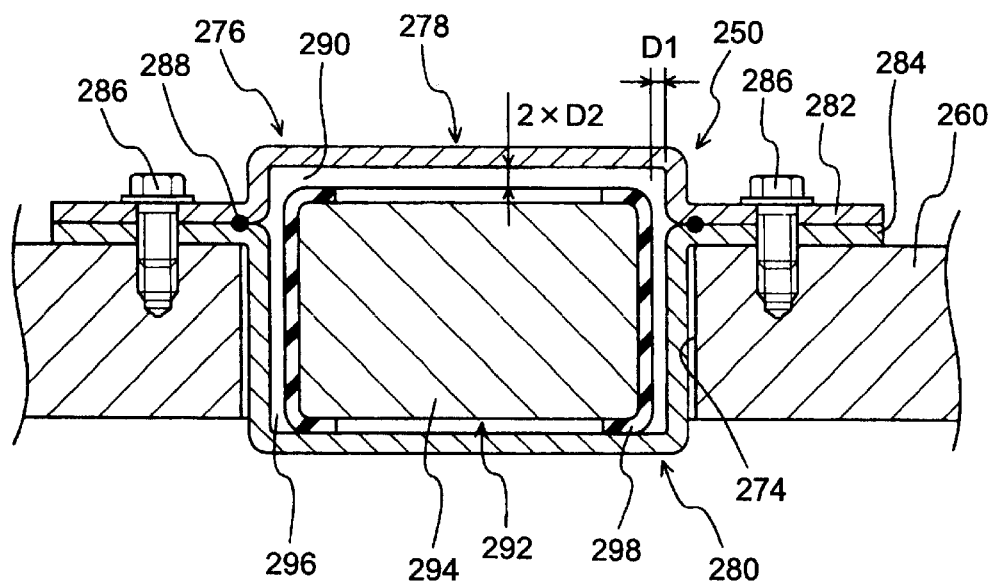
FIG. 23 is an elevational view in axial cross section of a part of a vibration damper for vehicles constructed according to a twelfth embodiment of the present invention.

Referring next to FIG. 23, there is shown a vibration damper 250 constructed according to a twelfth embodiment of the present invention, which is preferably applied to a plate member, such as a L-shaped front-lower arm 260, for example. The lower arm 260 includes a plurality of through hole 274 for reducing the weight thereof. At least two vibration dampers 250 are fixed to two through holes 274. FIG. 23 shows one of the at least two vibration dampers 250 fixed to the through holes 274.

The vibration damper 250 includes a hollow box-like housing 276. The housing 276 has a lower housing member 280 made of a metallic material and having a cylindrical cup shape. The lower housing member 280 includes an outward flange 284 integrally formed at a peripheral portion of an open-end portion thereof. The housing member 276 also has an upper housing member 278 made of a metallic material and having an inverted cylindrical cup shape. The upper housing member 278 includes an outward flange 282 integrally formed at a peripheral portion of an open-end portion thereof. The upper and lower housing members 278, 280 are superposed on each other at their outward flanges 282, 284 in the axial or vertical direction. The thus assembled housing 276 is attached to the lower arm 260 by blots that are screwed in the threaded holes formed through the outward flanges 282, 284. Namely, the upper and lower housing member 278, 280 are fixedly bolted together at the outward flanges 282, 284, so as to constitute a hollow structure of the housing member 276.

That is, the housing 176 includes therein an interior space 290 which are separated from the outside area, and which are defined by and between the inner surfaces of the upper and lower housing members 278, 280. The upper and lower housing members 278, 280 are made of a steel which has a modulus of elasticity of $5 \times 10^3$ MPa or more. An annular sealing ring 288 is compressed by and between the outward flanges 282, 284 of the upper and lower housing members 278, 280, so as to extend in the circumferential direction, thereby preventing entrance of contaminants, water or the like into the interior space 290.

Within the interior space 290 of the housing 276, there is accommodated an independent mass member 292. The independent mass member 292 includes a metallic mass 294 as a mass body in the form of a solid cylindrical metallic block, and an abutting rubber elastic body 298 which is formed on and secured to the entire circumferential surface of the metallic mass 294 and a peripheral portion of each of axially opposite end faces of the metallic mass 294, with a generally constant thickness. The outside configuration of the abutting rubber elastic body 298 is made similar to and slightly smaller than the configuration of the interior space 290 of the housing 276. With the independent mass member 292 located in the central position of the interior space 290, the outer surface of the abutting rubber elastic body 298 and the inner surface of interior space 290 (i.e., inner surfaces of the upper and lower housing members 282, 284) are opposed to each other with a spacing 296 therebetween. The distance: D1 of the spacing 296 in the axial direction and the distance: D2 of the spacing 296 in the diametric direction perpendicular to the axial direction, are both dimensioned to be held within a range of 0.05–0.8 mm, more preferably 0.05–0.5 mm. In the static state of the vibration damper 250 as shown in FIG. 23, where the housing 276 is not subjected to the vibration of the lower arm 260, the independent mass members 292 is held in contact with the lower surface of the interior space 290, and are space apart from the upper surface of the interior space 290 with the double sized spacing 296 having a distance of 2×D2.

The housing 276 having the independent mass member 292 accommodated therein is installed in the lower arm 260 such that the lower housing member 280 extending through the through hole 274, and is bolted to the lower arm 260 at the outward flanges 282, 284 of the upper and lower housing members 278, 280, as shown in FIG. 23.

According to the vibration damper 250 constructed as described above, the housing 276 is integrally constructed with the lower arm 260 and is oscillated integrally with the lower arm 260. Upon application of a vibrational load to the housing member 276, the independent mass member 292 is forced to alternately impact and bounce off the housing member 276 independently of the housing member 276, resulting in the bouncing displacement of the independent mass member 292 relative to the housing 276, within the interior space 290, whereby the vibration damper exhibit a desired vibration damping effect with respect to vibrations of the lower arm 260, based on the impact of the independent mass member 292 against the housing 276 via the abutting rubber elastic body 298, like the vibration damper 10 constructed according to the first embodiment. As is apparent from the forgoing description, the abutting rubber elastic body 298 serves as the abutting surface of the independent mass member 292. The abutting rubber elastic body 298 has a Shore D hardness of 80 or lower, more preferably, within a range of 20–40, a modulus of elasticity within a range of $1$–$10^4$ MPa, more preferably, $1$–$10^3$ MPa, and a loss tangent is not less than $10^{-3}$, more preferably within a range of 0.01–10.

Figure 24:
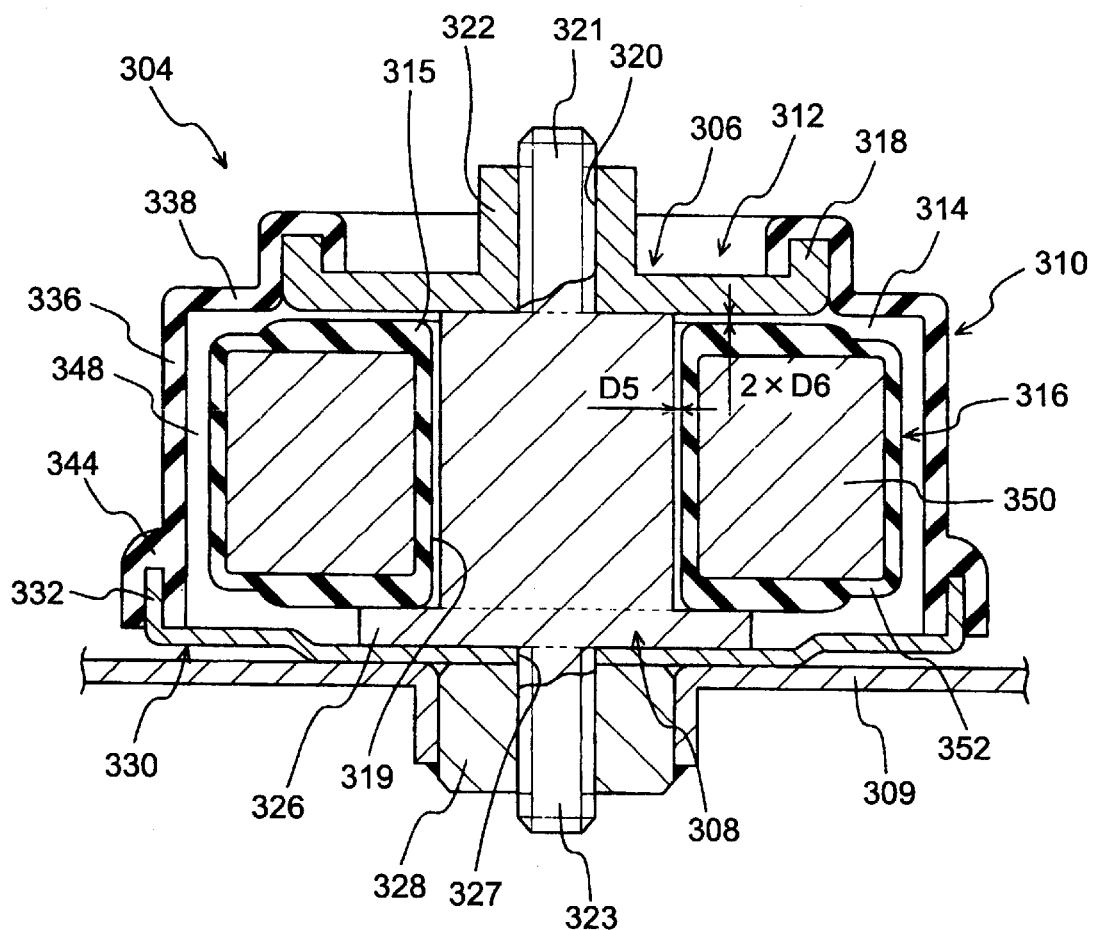
FIG. 24 is an elevational view in axial cross section of a part of a vibration damper for vehicles constructed according to a thirteenth embodiment of the present invention.

Referring next to FIG. 24, there is shown a vibration damper 304 constructed according to a thirteenth embodiment of the present invention, which is suitably applicable to a floor panel of a body of an automotive vehicle, a sheet panel, or the like. Like the twelfth embodiment, at least two vibration damper 304 are fixed to such a vibrative member. The vibration damper 304 includes a housing 312 having a generally annular interior space 314, and an annular block shaped independent mass member 316 accommodated within the interior space 314. Upon application of a vibrational load in a diametrical direction perpendicular to the axial direction, the independent mass member 316 is brought into impact against the housing 312 in the vibrational input direction, whereby the vibration damper 304 exhibit a desired damping effect based on the impact of the independent mass member 316 and the housing 312.

Described more specifically, the housing 312 includes a solid cylindrical rod shaped center shaft 308 as a supporting rod disposed on the center axis thereof. The housing 312 also includes an upper-side abutting plate 306 and a cover support member 330, which are fixed to the axially upper and lower end portions of the center shaft 308. The housing 312 further includes a cylindrical cover 310 which is fixed at its upper and lower end portions to the upper abutting plate 306 and the cover support member 330, respectively.

The center shaft 308 is a solid cylindrical rod shaped member and includes a lower-side abutting portion 326 integrally formed at its axially lower end portion. The center shaft 308 also includes mounting bolts 321, 323, as integral parts, which protrude axially outwardly from the axially opposite end faces of the center shaft 308. The vibration damper 304 is fixedly attached to a vibrative member such as a body panel of an automotive vehicle, by screwing the bolts 321, 323 of the center shaft 308 into suitable nuts fixedly formed on the vibrative member. Thus, the vibration-damping device 304 is fixedly installed in the vibrative member 309.

The upper-side abutting plate 306 is an annular shaped member and includes a threaded portion 322 integrally formed at an inner peripheral portion thereof, and an annular shaped upper engaging portion 318 integrally formed at an outer peripheral portion thereof and extending axially outwardly direction (i.e., axially upward direction as seen in FIG. 1). The threaded portion 322 has a small-diameter cylindrical shape and extends axially outward direction (i.e., axially upward direction as seen in FIG. 1). The threaded portion 322 is screwed onto the upper-side fixing bolt 321 downwardly, whereby the upper-side abutting plate 306 is firmly fixed to the upper end portion of the center shaft 308, such that the upper-side abutting plate 306 is disposed on the axially upper end portion of the center shaft 308, and extend in the diametric direction perpendicular to the axial direction. In this condition, the upper-side abutting plate 306 and the lower-side abutting plate 326 disposed in the axially lower end portion of the center shaft 308 are opposed to each other in the axial direction with the center shaft 308 interposed therebetween.

It should be noted that the center shaft 308 and the upper-side abutting plate 306 cooperate to provide a housing body to which the independent mass member 350 is brought into impact. Thus, the center shaft 308 and the upper-side abutting plate 306 are made of ferrous metal having a modulus of elasticity of $5 \times 10^3$ MPa or more.

The cover support member 330 fixed to the axially lower end portion of the center shaft 308 is a thin-walled large-diameter disk plate member having a central through hole 327. The cover support member 330 is inserted onto the lower-side bolt 323 at its through hole 327, and superposed on the lower end face of the center shaft 308, whereby the cover support member 330 is firmly fixed to the center shaft 308 such that the cover support member 330 is compressed by and between the center shaft 308 and the vibrative member 309. The outer peripheral portion of the cover support member 330 is bent in the axially upward direction as seen in FIG. 24, thereby providing an annular lower-side engaging portion 332 as an integral part of the cover support member 330. Between the lower side engaging portion 332 and the upper-side engaging portion 318, there is disposed the cylindrical cover 310. The cylindrical cover 310 is made of a flexible material such as a rubber elastic body and a synthetic resin material. The cylindrical cover 310 includes a circumferential wall portion 336 having a large-diameter cylindrical shape, and an upper wall portion 338 having an annular plate shape and integrally formed on the axially upper end face of the circumferential wall portion 336 so as to extend radially inwardly from the axially upper end face of the circumferential wall portion 336. The cylindrical cover 310 is engaged at its axially lower end portion 344 with the lower-side engaging portion 332, and at its upper wall portion 338 with the upper-side engaging 318. In this condition, the center shaft 308 and the cylindrical cover 310 are opposed to each other in the diametric direction with an annular space therebetween. The axially upper and lower opening of the annular space is closed by the upper-side abutting plate 306 and the lower-side abutting plate 326, respectively, thereby providing an interior space 314 which is separate from the outside.

Within the interior space 314, there is accommodated a independent mass member 316. The independent mass member 316 includes an annular block-shaped metallic mass 350 having a constant rectangular cross sectional shape over a circumference thereof, and a thin-walled abutting rubber elastic body 352 formed on and bonded to the entire surface of the metallic mass member 350. That is, the abutting rubber elastic body 352 covers the entire surface of the metallic mass member 350. The thus constructed independent mass member 316 is disposed within the interior space 314 such that the inner surface of the independent mass member 316 is disposed radially outwardly of the center shaft 308, while being interposed between the upper-side abutting plate 308 and the lower-side abutting plate 326 in the axial direction. The metallic mass 350 is made of a high gravity material such as ferrous metal. The abutting rubber elastic body 352 includes a thick-walled portions 315 formed on the inner circumferential surface of the metallic mass 350 which is opposed to the circumferential surface of the center shaft 308 in the radial direction, and radially inner portions of the axially opposite end faces of the metallic mass 350, which portions are opposed to the upper-side abutting plate 306 and the lower-side abutting plate 326 in the axial direction. Namely, the thick-walled portions 315 serve as the abutting surfaces of the independent mass member 316 in this embodiment. The thick-walled portions 315 have a Shore D hardness of 80 or lower, more preferably, within a range of 20–40, a modulus of elasticity within a range of $1-10^4$ MPa, more preferably, $1-10^3$ MPa, and a loss tangent is not less than $10^{-3}$, more preferably within a range of 0.01–10.

The inner diameter of the independent mass member 316 is made slightly larger than the diameter of the center shaft 308. With the independent mass member 316 and the center shaft 308 being held in substantially co-axial relationship with each other, the inner circumferential surface 319 of the independent mass member 316 and the circumferential surface of the center shaft 308 are spaced from each other with a spacing 348 therebetween. The spacing 348 has a predetermined distance: D5. On the other hand, the axial length of the independent mass member 316 is made slightly smaller than the axial distance between the upper-side abutting plate 306 and the lower-side abutting plate 326. With the independent mass member 316 being located in the central portion of the above-indicated axial distance between the upper- and lower-side abutting plate 306, 326, the axial end faces of the independent mass member 316 and the respective upper- and lower-side abutting plate 306, 326 are spaced apart from each other with a spacing having a predetermined distance:D6. In the static state of the vibration damper 304 shown in FIG. 24, where the housing 312 is not subjected to the vibration of the vibrative body, the independent mass members 316 is held in contact with the lower-side abutting plate 326, and is space apart from the upper-side abutting plate 306 with the doubled spacing: 2×D6 therebetween. The cylindrical cover 310 has an outer diameter which is made sufficiently larger than the outer diameter of the independent mass member 316. This arrangement is effective to avoid a collision of the independent mass member 316 against the cylindrical cover 310 and/or the cover support member 330, upon displacement of the independent mass member 316 in the radial direction.

The outer diameter of the lower-side abutting plate 326 is made sufficiently smaller than the outer diameter of the independent mass member 316, so that the independent mass member 316 is brought in abutting contact with the lower-side abutting plate 326 at an inner peripheral portion of the axially lower end face thereof. That is, ⅓ (one-third) or lower of the entire area of the lower end face of the independent mass member 316 serves as the abutting surface.

When the thus constructed vibration damper 304 is subjected to vibrations of the vibrative member 309, the housing 312 is oscillated integrally with the vibrative member 309. The independent mass member 316 is forced to alternatively impact and bounce off the housing 312 independently of the housing 312, resulting in the bouncing displacement of the independent mass member 316 independent of the housing 312, within the interior space 314, whereby the vibration damper exhibit a desired vibration damping effect with respect to vibrations applied in the axial direction and any radial directions perpendicular to the axial direction, based on the impact of the independent mass member 316 and the housing 312.

Moreover, the independent mass member 316 is arranged to be brought into impact against the housing 312 in the axial direction, at only radially inner portion of the axially opposite end faces thereof, facilitating bouncing movement of the independent mass member 316, resulting in further improved damping effects of the vibration damper 304.

The present invention is also applicable to a vibrative member which is rotatable about a rotation axis thereof, so as to damp vibrations applied in a circumferential direction about the rotation axis of the vibrative member, as well as vibrations applied in diametric directions perpendicular to the rotation axis. There will be describe vibration dampers constructed according to fourteenth through eighteenth embodiments of the present invention, with reference to FIGS. 25–34, which dampers are applied in various kinds of rotatable vibrative members.

Figure 25:
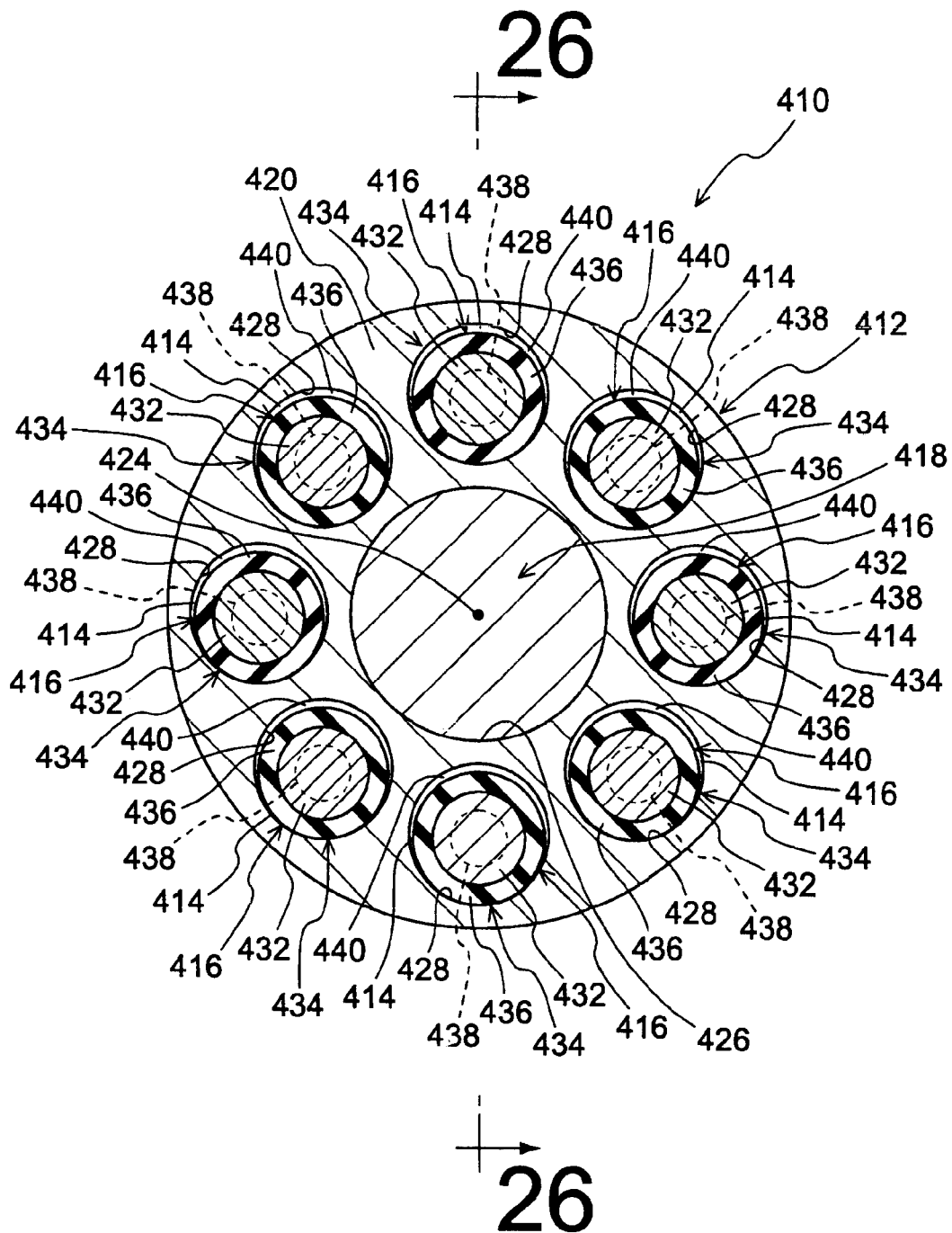
FIG. 25 is an elevational view in transverse cross section of a vibration damper for vehicles constructed according to a fourteenth embodiment of the present invention, taken along line 25—25 of the present invention.
Figure 26:
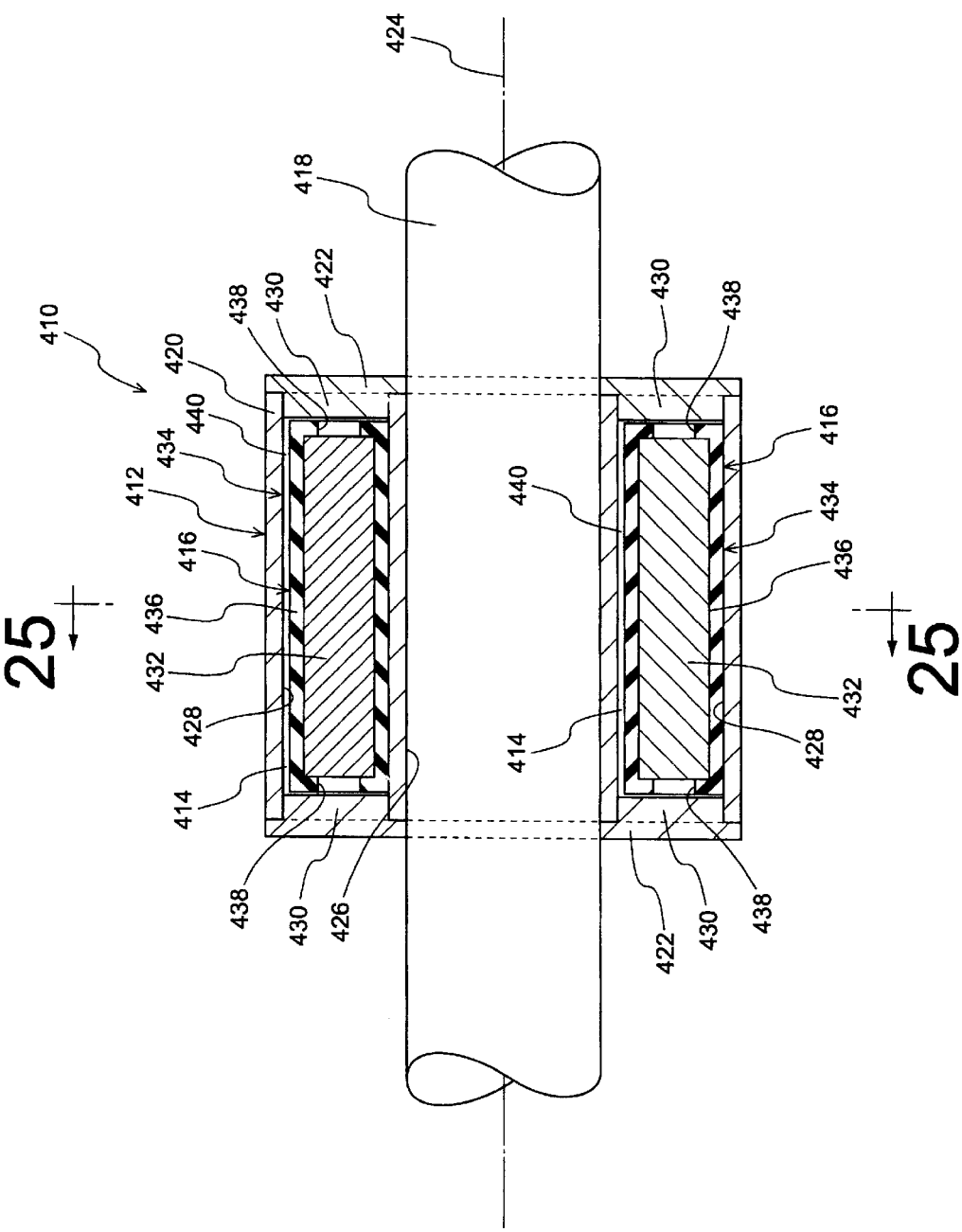
FIG. 26 is a cross sectional view taken along line 26—26 of vibration damper of FIG. 25.

Referring first to FIGS. 25–26, there is illustrated a vibration damper 410 which is suitably used for damping vibrations of a drive shaft of an automotive vehicle. The vibration damper 410 includes a housing 412 having a plurality of interior spaces 414 and a plurality of independent masses 416 disposed within the interior spaces 414, respectively. The vibration damper 410 is fixed to a drive shaft 418 such that the housing 412 is fixedly disposed radially outwardly on the drive shaft 418.

More specifically, the housing 412 includes a housing body 420 and a pair of cover members 422, 422. The housing body 420 in a thick-walled cylindrical member having a cylindrical bore serving as a fixing hole 426 extending through a radially central portion thereof along with a center axis 424 thereof. The housing body 420 includes a plurality of through holes 428 (e.g., eight through holes 424 in the present embodiment) in respective circumferential portions thereof which are spaced apart from each other in the circumferential direction at regular intervals. These through holes 428 are identical in configuration with each other and extend straightly in the axial direction over the entire axial length of the housing body 420, with a constant circular cross sectional shape over their axial length. The housing body 420 having the through holes 428 is arranged so that a center of gravity of the housing body 420 is located on the center axis 424 of the housing body 420, upon rotation of the housing body 420 about the center axis 424 thereof.

The housing body 420 is made of a rigid material having a modulus of elasticity of $5 \times 10^3$ MPa or more. For instance, the housing body 18 may be formed of an aluminum alloy by extrusion, whereby the fixing hole 426 and the through hole 428 are simultaneously formed, upon forming the housing body 420.

Each of the cover members 422, 422 has a thin-disk shaped member whose configuration is corresponding to the corresponding axial end face of the housing body 420. One of axially opposite end faces of the cover member 422 includes a plurality of cylindrical fixing protrusions 430 which are formed in the circumferential position of the cover member 422 which are corresponding to the circumferential portions of the through holes 428 of the housing body 420. The one end face of the cover member 422 which have the fixing protrusions 430 is placed on and fixed to the corresponding end face of the housing body 420, such that the fixing protrusions 430 are pressed into the openings of the through holes 428, respectively. It may be possible that the cover members 422, 422 are fixed to the respective axial end face of the housing body 420 by bolting or welding. The cover members 422 are made of a rigid material such as metal and a synthetic resin material.

With the cover members 422, 422 and the housing body 420 integrally assembled with each other as described above, the axially opposite open ends of the through holes 428 are closed by the cover members 422, 422, whereby there is formed the plurality of interior spaces 414 (eight interior spaces 414) which is separated from the outside of the housing 412. That is, each interior space 414 is defined by the inner circumferential surface of the corresponding through hole 428, and the protruding end face of the corresponding fixing protrusions 430 of the cover members 422, 422.

The each interior space 414 of the housing 412 accommodates one of the plurality of independent mass member 416. The independent mass members 416 are identical with each other, each having a solid cylindrical rod shape. The independent mass members 416 includes a metallic mass 432 as a mass body and an abutting elastic body layer 434.

The metallic mass 432 is made of high gravity materials such as steel. The abutting elastic body layer 434 are formed on and secured to the surface of the metallic mass 432 with a constant thin-thickness. The abutting elastic body layer 434 serves as the abutting surface of the independent mass member in this embodiment. The abutting elastic body 434 has a Shore D hardness of 80 or lower, more preferably, within a range of 20–40, a modulus of elasticity within a range of $1-10^4$ MPa, more preferably, $1-10^3$ MPa, and a loss tangent is not less than $10^{-3}$, more preferably within a range of 0.01–10. The abutting elastic body layer 434 includes a cylindrical portion 436 which covers the circumferential surface of the metallic mass 432, and annular portions 438 which cover outer peripheral portions of the axially opposite end faces of the metallic mass 432, respectively.

The independent mass member 416 has an outside configuration which is made slightly smaller than the configuration of the interior space 414. The thus constructed independent mass member 416 disposed within the interior space 414, such that the independent mass member is independent of the housing 412 and is not bonded to the housing 412. With the independent mass member 416 located in the central portion of the interior space 414, the independent mass member 416 are spaced apart from the inner surface of the interior space 414 with a spacing 440 therebetween over the entire surface thereof. In this respect, the spacing 440 may be controlled to have a distance: δ within a range of 0.05–0.8 mm, so that the vibration damper 410 can exhibit an improved damping effect with a reduced impact noise.

According to the vibration damper 410 constructed as described above, the independent mass member 416 is forced to move into the inner surface of the housing 412 by the distance: δ in any diametric directions, thereby impacting the housing 412. That is, the independent mass member 416 is reciprocally movable relative to the housing 412 by the distance: 2δ in any diametric directions.

The vibration damper 410 constructed as described above is fixed to the drive shaft 418 such that the fixing hole 426 of the housing body 420 is forcedly inserted onto the drive shaft 418. Preferably, the vibration damper 410 is disposed on a portion of the drive shaft where amplitude of the input vibration is maximized, upon application of vibrational load.

In the vibration damper 410 fixed to the drive shaft 418 as described above, the plurality of independent mass members 416 are disposed within the respective interior spaces 414 so as to extend parallel to the center axis 424 of the drive shaft 418, and are displaceable relative to the housing 414 by a given distance in any diametrical directions, within the interior spaces 414. When the drive shaft excites therein vibrations in the diametrical directions, the independent mass members 416 are forced to reciprocally displace or bounce within the interior spaces 414 in the vibration input directions, whereby the independent mass members 416 are brought into elastic impact against the housing 412 in the vibration input directions.

In particular, the drive shaft 418 is likely to excite torsional vibrations caused by a change of the transmitted torque. In this case, the torsional vibrations applied to the vibration damper 410 in the circumferential direction about the center axis 424. Eventually, the circumferential vibrational load is applied to each independent mass member 416 in substantially diametric direction of the independent mass member 416. Thus, the each independent mass member 416 is brought into impact against the housing 412 in the vibrational direction (i.e., in the circumferential direction about the center axis 412).

Therefore, the vibration damper 410 exhibits a desired damping effect with respect to the vibrations excited in the drive shaft 418, since the vibration energy of the drive shaft 418 is absorbed or attenuated by effects of impacts between the independent mass members 416 and the housing 414, and by sliding friction caused by the deformation of the abutting elastic body layer 434 upon collision or impact between these two members 416, 414. In this respect, the damping effect of the vibration damper 410 is based on the loss or dissipation of vibrative energy caused by the impact of the independent mass members 416 on the housing 412, and is not clearly based on her than the resonance of the independent mass member 416. Therefore, the damping effect of the present vibration damper 410 is less likely to be sensitive to the frequency of the input vibration, and is capable of exhibiting high an excellent vibration damping effect with respect to vibrations over the wide frequency range.

Thus, the vibration damper 410 constructed according to the present invention can exhibit an excellent damping effect with respect to vibrations applied in the diametric direction and the circumferential direction (torsional direction) of the drive shaft 418, based on the impact of the independent mass members 416 and the housing 412, even if the vibration in the diametric direction and the vibration in the torsional direction have different frequencies.

Moreover, the each independent mass member 416 is bonded to the housing 414 via the abutting elastic body layer 434 and is independent of the housing 414. This arrangement and the above-indicated insensitivity of the vibration damper 410 with respect to the vibration frequency permits a low dependency of the damping effect of the vibration damper 410 on the spring characteristics of the independent mass member 416. Therefore, the vibration damping characteristics of the vibration damper 410 is less likely to suffer from adverse effect of a change in elasticity of the abutting elastic body layer 434 due to the temperature change, resulting in high stability of the vibration damping effect of the vibration damper 410.

In the vibration damper 410, the housing 412 rotates integrally with the drive shaft 418. In this condition, the each independent mass member 416 is displaced radially outwardly and pressed onto the housing 412 due to centrifugal force acting thereon. Since the plurality of independent mass member 416 are arranged in the circumferential direction, the force acting on the housing 412 due to the centrifugal force applied to the each independent mass member 416 is effectively offset with each other in the circumferential direction about the center axis 424, whereby the center of gravity of the all independent mass members 416 is positioned on the center axis 424. In this arrangement the drive shaft 418 is less likely suffer from or free from a problem of bending force applied thereto, resulting in stability of the rotation of the drive shaft 418.

In the vibration damper 410 of the present embodiment, the outside configuration of the each independent mass member 416 and the configuration of the inner circumferential surface of the interior space 414 are both made cylindrical, permitting rotation of the independent mass member 416 about an axis thereof. This arrangement is effective to prevent that the independent mass member 416 continuously impact at the same local portion thereof on the housing, leading to improved durability of the independent mass member 416.

Figure 27:
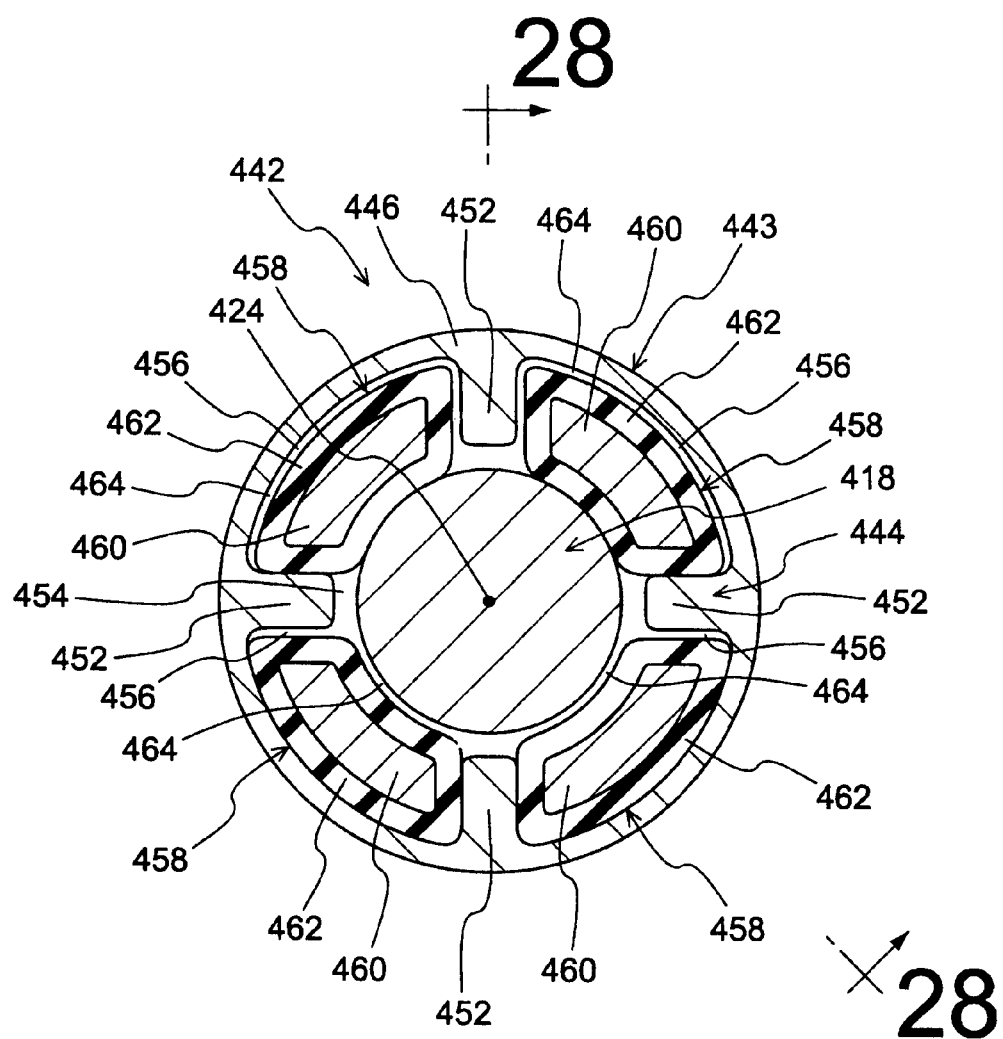
FIG. 27 is an elevational view in transverse cross section of a vibration damper for vehicles constructed according to a fifteenth embodiment of the present invention, taken along line 27—27 of FIG. 28.
Figure 28:
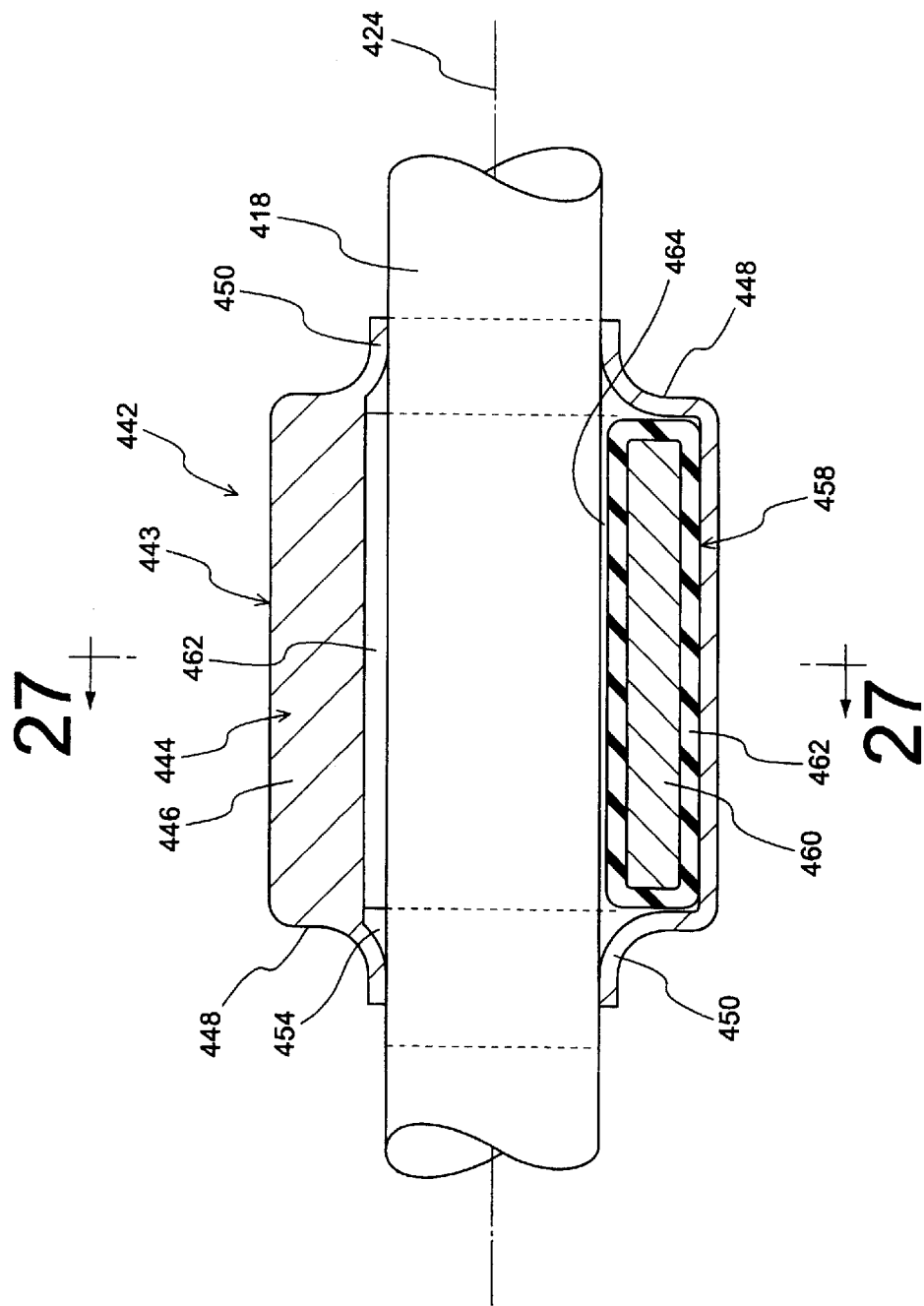
FIG. 28 is a cross sectional view taken along line 28—28 of the vibration damper of FIG. 27.

Referring next to FIGS. 27 and 28, there is shown a vibration damper 442 constructed according to the fifteenth embodiment of the present invention. In the following description, the same reference numerals as used in the fourteenth embodiment of FIGS. 25 and 26 are used to identify the structurally or functionally corresponding elements, which will not be described to avoid redundant explanation.

In the vibration damper 442, a housing 443 is constituted by utilizing the drive shaft 418. Namely, the vibration damper 442 includes an outer-wall member which cooperates with the outer circumferential surface of the drive shaft 418 to define the housing 443. The outer-wall member 444 has a cylindrical shape and includes a cylindrical wall portion 446 and a pair of annular end-wall portions integrally formed with the axially opposite end portions of the cylindrical wall portion 446, respectively so as to extend radially inwardly. The radially inner portion of each of the annular end wall portions 448 is bent in the axially outward direction, to thereby provide fitting portion 450 having a small-diameter cylindrical shape.

The outer-wall member 446 further includes a plurality of partition wall portion 452 (four partition wall portions 452 in this embodiment) integrally formed at the respective circumferential portions of the inner circumferential surface of the cylindrical wall portion 446. Each of the partition wall portion 452 protrudes radially inwardly from the inner cylindrical surface of the cylindrical wall portion 446, with a radial length which is made smaller than the radial length of the annular end wall portions 448. The partition wall portions 452 are spaced apart from each other in the circumferential direction at regular intervals.

The outer wall member 444 is fixed to the drive shaft 418 such that the outer wall member 444 is disposed radially outwardly of the drive shaft 418 and press-fitted on the outer circumferential surface of the drive shaft 418 at its fitting portions 450. Like the fourteenth embodiment, the drive shaft 418 is a rotation member which has a solid or hollow cylindrical circular cross sectional shape, and which is rotatable about the straight center axis 424 of the drive shaft 418. With the vibration damper 442 installed in position as described above, the partition wall portions 452 protrude radially outwardly from the cylindrical wall portion 446 toward the drive shaft 418 such that the protruding end faces of the partition wall portions 452 are opposed to the outer circumferential surface of the drive shaft in the radial direction with a distance therebetween.

In this condition, the openings of the annular end wall portions 448 are closed by the drive shaft 418, thereby providing an interior space 454 which is separated from the exterior space and which is defined by and between the outer circumferential surface of the drive shaft 418 and the inner surface of the outer wall member 444. That is, the housing 443 of the present vibration damper 442 is partially constituted by the drive shaft 418. The interior space 454 is divided into a plurality of sub-spaces 456 (four sub-spaces 456 in the present invention) by the partition wall portions 452. Each of the sub-spaces 456 extends in the circumferential direction so as to have an arcuate shape in transverse cross section as shown in FIG. 27. The drive shaft 418 and the outer wall member 444, which cooperate to define the housing 443, are both made of rigid materials having a modulus of elasticity of 5×10³ MPa or more.

The each sub-space 456 is adapted to accommodate at least one independent mass member 458 whose outside configuration is made similar to and slightly smaller than the configuration of the sub-space 456. Like the fourteenth embodiment, the independent mass 458 includes a metallic mass 460 made of a high gravity material and an abutting elastic body layer 462 which is formed on and bonded to the entire surface of the metallic mass 460, for covering the metallic mass 460 entirely. The abutting elastic body layer 462 serves as the abutting surface of the independent mass member in this embodiment. The abutting elastic body 462 has a Shore D hardness of 80 or lower, more preferably, within a range of 20–40, a modulus of elasticity within a range of $1-10^4$ MPa, more preferably, $1-10^3$ MPa, and a loss tangent is not less than $10^{-3}$, more preferably within a range of 0.01–10. With the independent mass member 458 located in the central portion of the sub-space 456, the independent mass member 458 is opposed to the inner surface of the outer wall member 444 and the outer circumferential surface of the drive shaft 418, which cooperate to define a sub-space 456, with a constant spacing 464 therebetween. Described in detail, the independent mass member 458 includes a radially inner and outer circumferential surface and circumferentially opposite end faces which extend in the radial directions perpendicular to the axial direction. The independent mass member 458 disposed in its central position as described above, is opposed at its inner circumferential surface to the outer circumferential surface of the drive shaft 418 with the spacing 464 therebetween in the radial direction, while being opposed at its outer circumferential surface to the inner circumferential surface of the cylindrical wall portion 446 of the outer wall member 444 with the spacing 464 therebetween in the radial direction. In the same condition, the circumferentially opposite end faces of the independent mass member 458 are opposed to the respective partition wall portions 452 with the spacing therebetween in the circumferential direction.

In the vibration damper 442 constructed as described above, the plurality of independent mass members 458 are disposed within the respective interior spaces 454 so as to extend parallel to the center axis 424 of the drive shaft 418, and are displaceable relative to the housing 444 by a given distance in any diametrical directions, within the interior spaces 454. When the drive shaft excites therein vibrations in the diametrical directions, the independent mass members 458 are forced to reciprocally displace or bounce within the interior spaces 454 in the vibration input directions, whereby the independent mass members 458 are brought into elastic impact against the housing 443 in the vibration input directions.

Therefore the vibration damper 442 constructed according to the present embodiment can exhibit an excellent damping effect with respect to bending vibrations applied in the diametric direction and torsional vibrations applied in the circumferential direction about the center axis 424, as in the fourteenth embodiments of the present invention.

Figure 29:
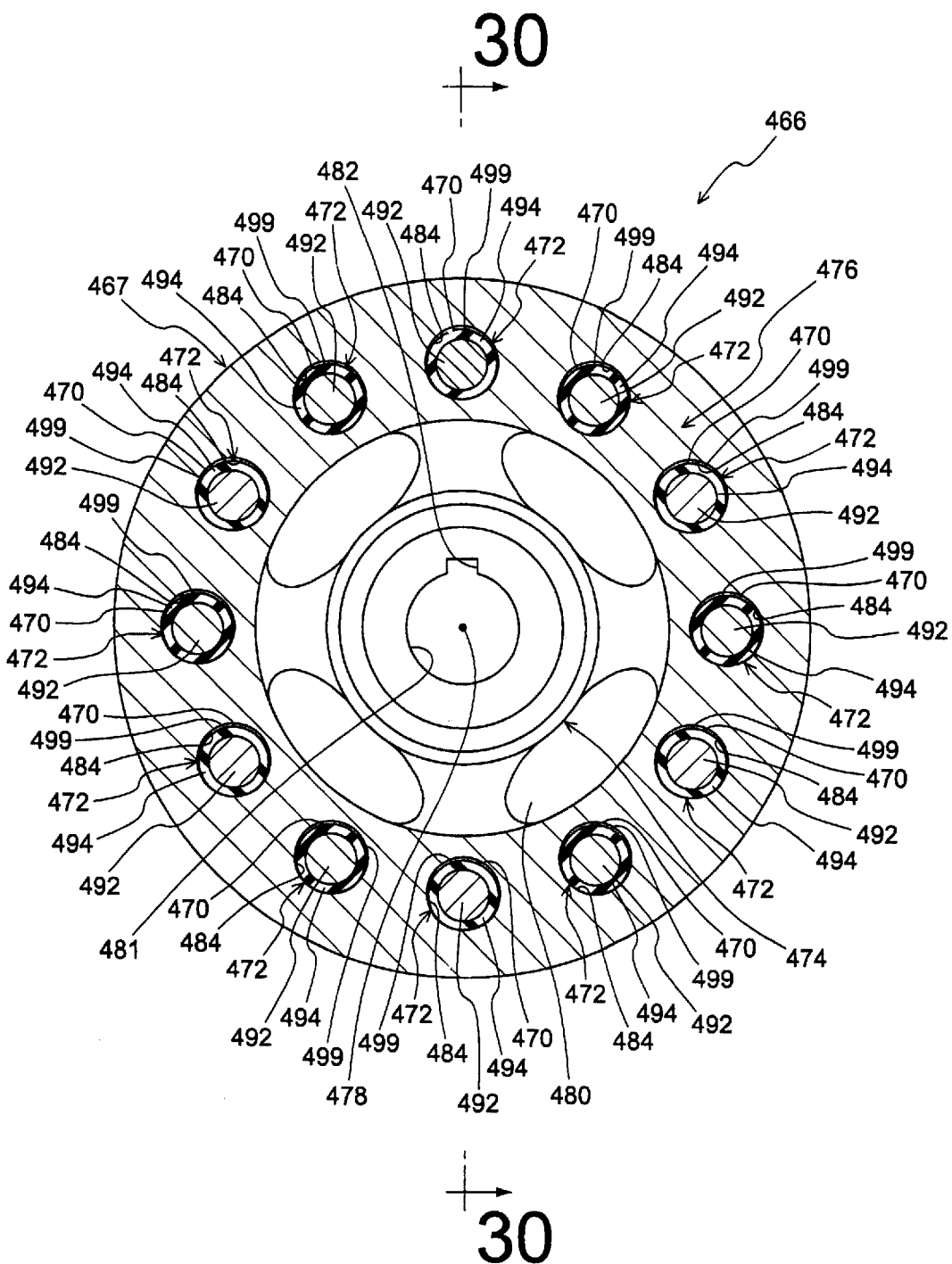
FIG. 29 is an elevational view in transverse cross section of a vibration damper for vehicles constructed according to a sixteenth embodiment of the present invention, taken along line 29—29 of FIG. 30.
Figure 30:
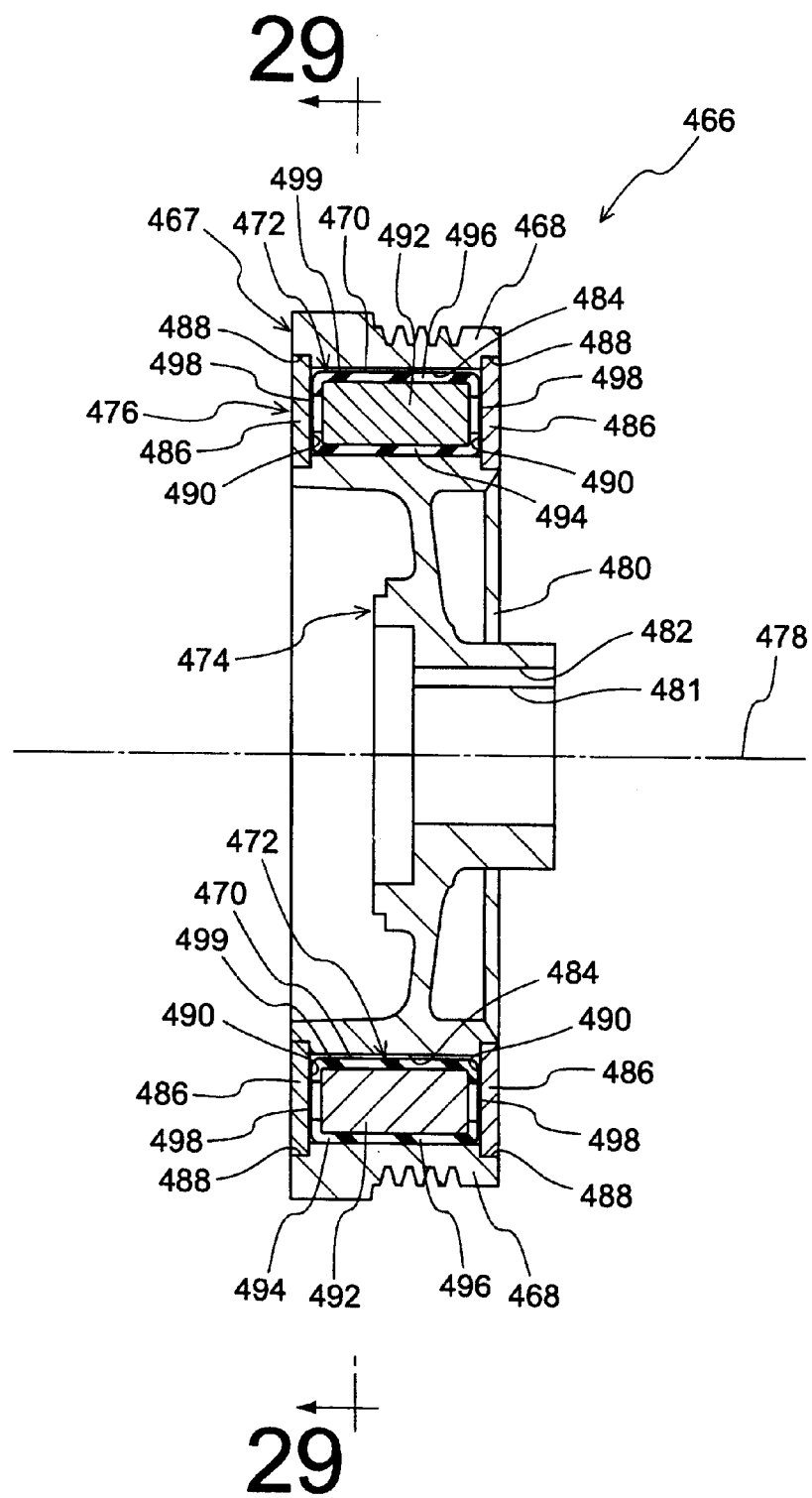
FIG. 30 is a cross sectional view taken along line 30—30 of the vibration damper of FIG. 29.

Referring next to FIGS. 29 and 30, there is shown a poly V-pulley 466 equipped with vibration damper for an automotive vehicle, which is constructed according to the sixteenth embodiment of the present invention. In the following description, the same reference numerals as used in the fourteenth embodiment of FIGS. 25 and 26 are used to identify the structurally or functionally corresponding elements, which will not be described to avoid redundant explanation.

The poly V-pulley 466 with the vibration damper includes a pulley body 468 having a plurality of interior spaces 470 and a plurality of independent mass members 472 accommodated within the interior space 470, respectively. The V-pulley 466 is fixed to a subject rotational shaft (not-shown) whose vibrations to be damped such that a fixing bore 418 of the V-pulley 466 is disposed radially outwardly on and press fitted onto the outer circumferential surface of the rotational shaft.

Described in detail, the pulley body 468 includes a boss 474 having a small-diameter cylindrical shape and a rim 476 having a large-diameter cylindrical shape. The boss 468 and the rim 476 are disposed coaxially with each other with a suitable radial spacing therebetween. The boss 468 and the rim 476 are connected with each other via an annular connecting plate 480 interposed therebetween. The boss 468 has the fixing bore 481 formed at its diametrically central portion extending through the axial direction. The boss 468 also has a keyway 482 extending in the axial direction and open in the inner circumferential surface of the boss 468. Upon fixing the V-pulley 460 to the rotational shaft as described above, a key formed on the outer circumferential surface of the rotational shaft is fitted into the keyway 482, so that the V-pulley is fixed to the rotational shaft so as not to rotate relative to the rotational shaft. On the other hand, the rim 476 includes a plurality of V-shaped grooves extending in the circumferential direction formed on and open in the outer circumferential surface thereof. These grooves are adapted to receive V-belts (not-shown). In this arrangement, the pulley body 468 transmit a rotational power from the rotational shaft into the V-belts. The pulley body 468 may be formed of rigid materials such as steel or an aluminum alloy, which has a modulus of elasticity of $5\times10^3$ MPa or more.

The rim 476 of the pulley body 468 includes a plurality of through holes 484 (e.g., twelve through holes 484 in this embodiment) are formed on respective circumferential positions of the rim 476 which are spaced apart from each other in the circumferential direction at regular intervals. The through holes 484 have the same configuration, and each of the through holes 484 extends in the axial direction of the rim 476 over the entire axial length oft he rim 476, with a constant circular cross sectional shape. Namely, the through hole 484 extends parallel to the rotation axis 478. The pulley body 468 having the thus constructed through holes 484 are arranged such that the center of gravity of the pulley body 468 is located on the rotation axis 478.

A pair of cover members 486, 486 are fixed to the axially opposite open end portions of each of the through holes 484, respectively. Each of the cover members 486, 486 has a thin-disk shaped member whose diameter is slightly larger than that of the diameter of the through hole 484. The each cover member 486 is press fitted into a circular recess 488 formed in each of the open end portion of the through hole 484, whereby the openings of the each through hole 484 are closed by the pair of cover members 486, respectively. The cover members 486 are made of a rigid material such as metallic materials including an aluminum alloy and steel, and a synthetic resin material.

With the openings of the plurality of through holes 484 closed with the cover members 486, there are formed a plurality of interior spaces 470 (e.g., twelve interior spaces 470 in this embodiment) in the rim 476 of the pulley body 468. Each interior space 470 is defined by the inner circumferential surface of the corresponding through hole 484, the inner surfaces of the corresponding cover members 486. As is apparent from the forgoing description, the pulley body 468 and the closure members 486 cooperate to define the housing 467.

Each of the interior space 470 formed in the housing 467, accommodates one of the plurality of independent mass member 472. The independent mass members 472 are identical in construction and configuration with each other. Each of the independent mass members 472 includes a metallic mass 492 and an abutting elastic body layer 494 formed on and bonded to the entire surface of the independent mass member 472. The abutting elastic body layer 494 is an thin elastic body layer extending over the entire area of the independent mass member 472 with a substantially constant thickness. Described in detail, the abutting elastic body layer 494 includes a cylindrical wall portion 496 which covers the circumferential surface of the metallic mass 492 and annular portions 498 which cover the outer peripheral portions of the axially opposite end faces of the metallic mass 492. The abutting elastic body layer 494 serves as the abutting surface of the independent mass member in this embodiment. The abutting elastic body 494 has a Shore D hardness of 80 or lower, more preferably, within a range of 20–40, a modulus of elasticity within a range of $1$–$10^4$ MPa, more preferably, $1$–$10^3$ MPa, and a loss tangent is not less than $10^{-3}$, more preferably within a range of 0.01–10.

The each independent mass member 472 has an outside configuration which is made similar to and slightly smaller than the configuration of the interior space 470. The independent mass member 472 is accommodated within the interior space 470, without being bonded to the housing 467, namely the pulley body 468 and the cover members 486. With the independent mass member 472 located in the central portion the interior space 470, the independent mass member 472 are spaced apart from the inner surface of the interior space 470 with a spacing 499 therebetween over the entire surface thereof. In this respect, the spacing 499 may be controlled to have a distance: δ within a range of 0.05–0.8 mm, likewise the fourteenth embodiment.

According to the V-pulley 66 with the vibration damper constructed as described above, the plurality of independent mass members 472 are disposed within the respective interior spaces 470 so as to extend parallel to the rotation axis 478 of the rotational member, and are displaceable relative to the housing 467 by a given distance in any diametrical directions, within the interior spaces 414. Upon application of vibrations in the diametric or circumferential directions to the V-pulley 466, the independent mass members 472 are forced to reciprocally displace or bounce within the interior spaces 470 in the vibration input directions, whereby the independent mass members 472 are brought into elastic impact against the housing 467 in the vibration input directions.

Therefore, the V-pulley 466 as the vibration damper exhibits an excellent damping effect with respect to the vibrations excited in the V-pulley 466 it self and the rotational member to which the V-pulley 466 is fixed, such as bending vibrations in the diametric direction and torsional vibrations about the rotation axis 478, based on the above-indicated effects of the impact of the independent mass members 472 on the housing 467.

In the V-pulley 466 constructed as described above, the boss 474 on the power input side and the rim 476 on the power output side are integrally connected with each other via the connecting portion 480. The provision of the independent mass members 474 within the interior spaces 470 formed in the rim 470 does not interfer the-above indicated power transmitting path from the boss 474 to the rim 476, whereby the V-pulley 466 can exhibit an excellent power transmitting capacity, and free from a problem of deterioration in its power transmitting capacity and its durability due to the provision of the independent mass member in the rim 470.

Figure 31:
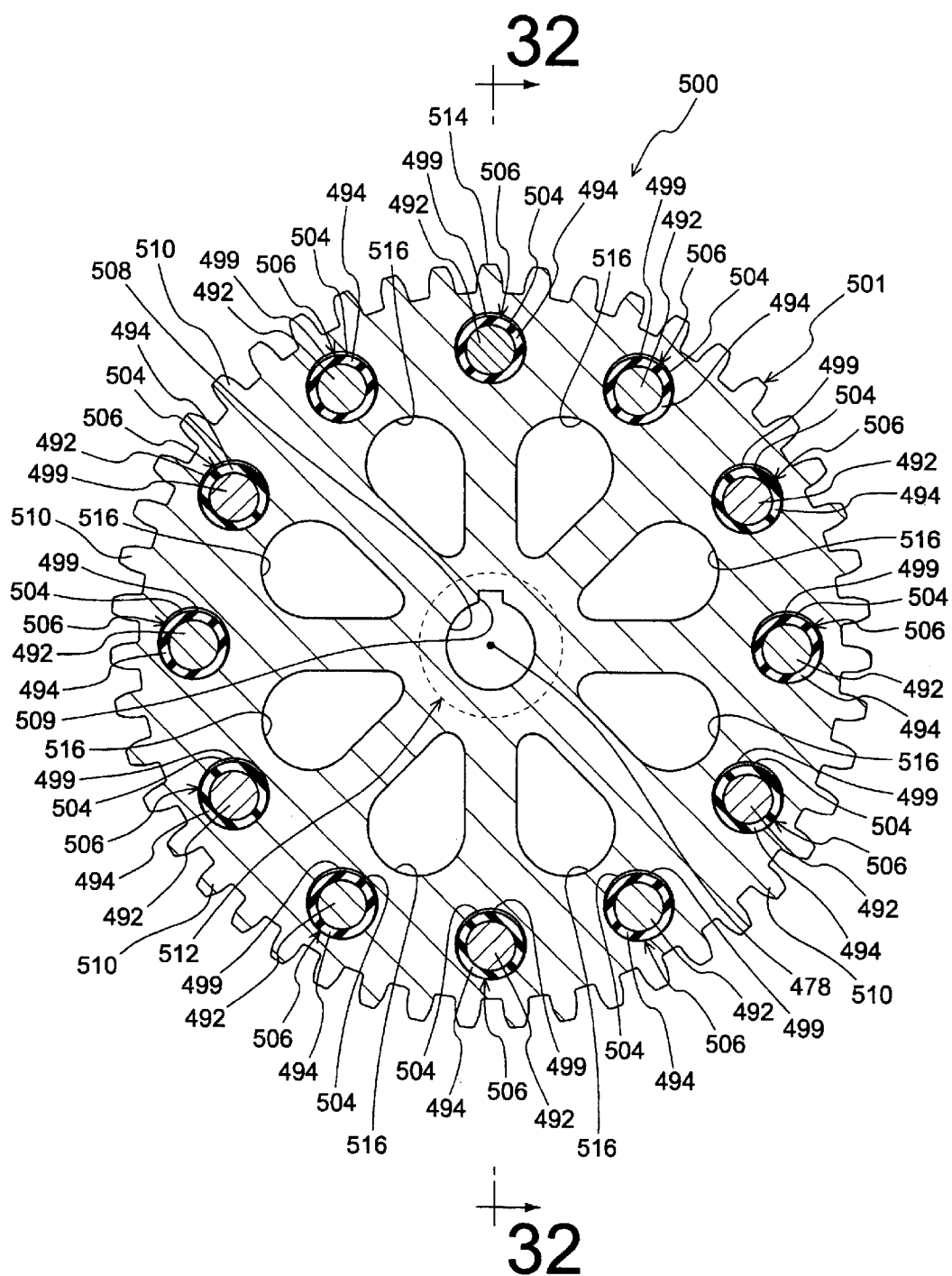
FIG. 31 is an elevational view in transverse cross section of a vibration damper for vehicles constructed according to a seventeenth embodiment of the present invention, taken along line 31—31 of FIG. 32.
Figure 32:
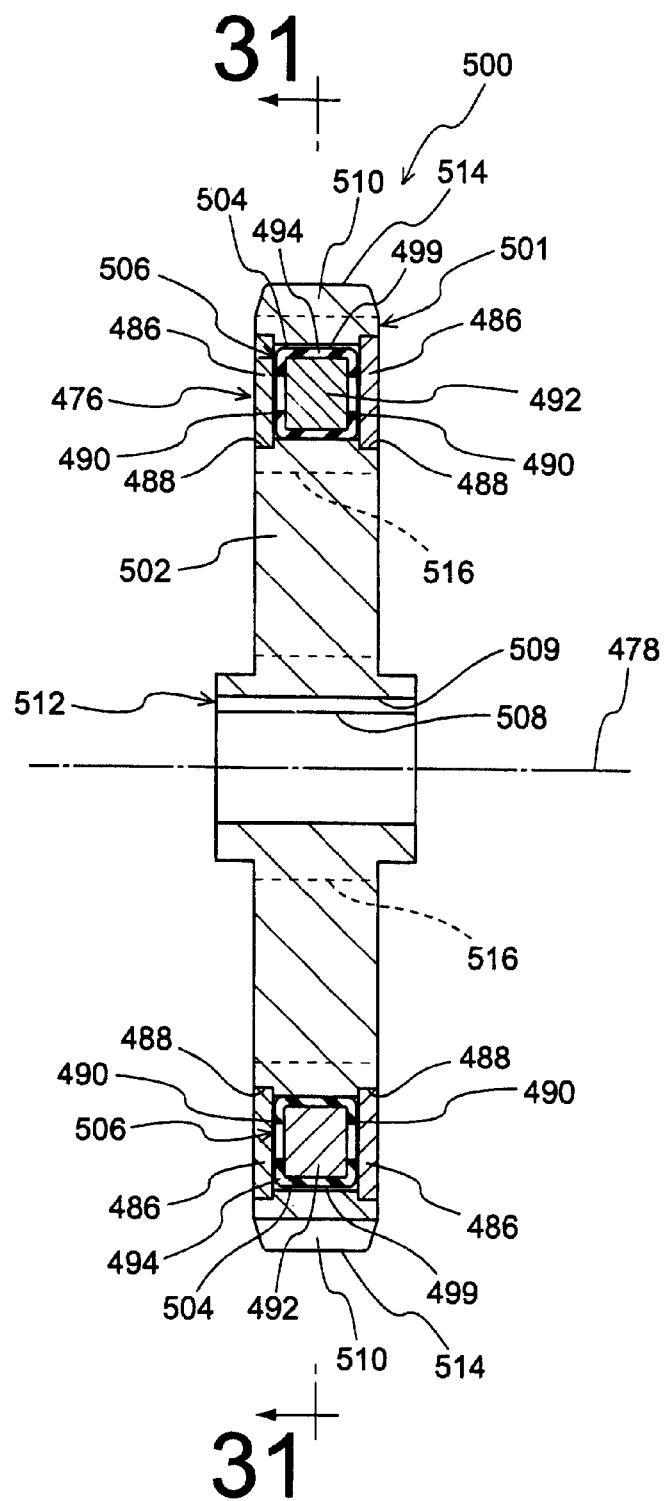
FIG. 32 is a cross sectional view taken along line 32—32 of the vibration damper of FIG. 31.

Referring next to FIGS. 31 and 32, there is shown a gear 500 equipped with vibration damper for an automotive vehicle, which is constructed according to seventeenth embodiment of the present invention. In the following description, the same reference numerals as used in the sixteenth embodiment of FIGS. 29 and 30 are used to identify the structurally or functionally corresponding elements, which will not be described to avoid redundant explanation.

The gear 500 as the vibration damper of the present embodiment includes a gear body 502 having a plurality of interior spaces 504, and a plurality of independent mass members 506 accommodated in the plurality of interior space 504, respectively. The gear body 502 is made of a rigid material such as steel.

More specifically described, the gear body 502 is made of a rigid material such as steel, and has a disk shape as a whole. In the central portion of the gear 502, there is formed a fixing bore 508 extending therethrough in the axial direction. The gear body 508 further includes a keyway 509 extending in the axial direction and open in the inner circumferential surface of the gear body 508. Upon fixing the gear 500 to the rotational shaft as described above with respect to the sixteenth embodiment, a key formed on the outer circumferential surface of the rotational shaft is fitted into the keyway 509, so that the gear 500 is fixed to the rotational shaft so as not to rotate relative to the rotational shaft. The gear 500 yet further includes a plurality of gear teeth 510 formed in its outer peripheral portion. The gear teeth 510 are engaged with a timing-belt disposed around the gear 500. The gear 500 is fixed to the rotational shaft at its boss 512 formed around the fixing bore 508. In this condition, the gear 500 is adapted to transmit a rotational power between the rotational shaft and the timing-belt. A plurality of voids 516 are formed in the radially intermediate portion of the gear body 502 so as to extend in the axial direction, for reducing the total weight of the gear 500.

Like the sixteenth embodiment, a plurality of interior spaces 504 (e.g., twelve interior spaces 504 in this embodiment) are formed in the outer circumferential portion of the gear body 502. Each of the interior spaces 504 accommodates one of the plurality of independent mass members 506, in a movable and non-bonded state. The independent mass member 506 has an outside configuration which is made similar to and slightly smaller than the configuration of the interior space 504. With the independent mass member 506 located in the central portion of the interior space 504, the independent mass member 506 is opposed to the inner surface of the interior space 504 with the spacing 499 therebetween over the entire surface thereof. In this condition, the independent mass member 506 is independently displaceable by the given spacing, upon application of vibrations to the gear 500. In this embodiment, the gear body 502 and the cover members 486 cooperate to define a housing 501.

Accordingly, the gear 500 as a vibration damper can exhibit high damping effect with respect to bending vibrations applied in the diametric direction and torsional vibrations applied in the circumferential direction about the rotation axis 478, which vibrations are excited in the gear 500 it self and the rotational shaft to which the gear 500 is fixed.

In the gear 500 of the present embodiment, the provision of the independent mass member 506 in the gear body 502 does not interferer the above-indicated rotational power transmitting path, whereby the gear 500 can exhibit an excellent power transmitting capacity, and high durability.

Figure 33:
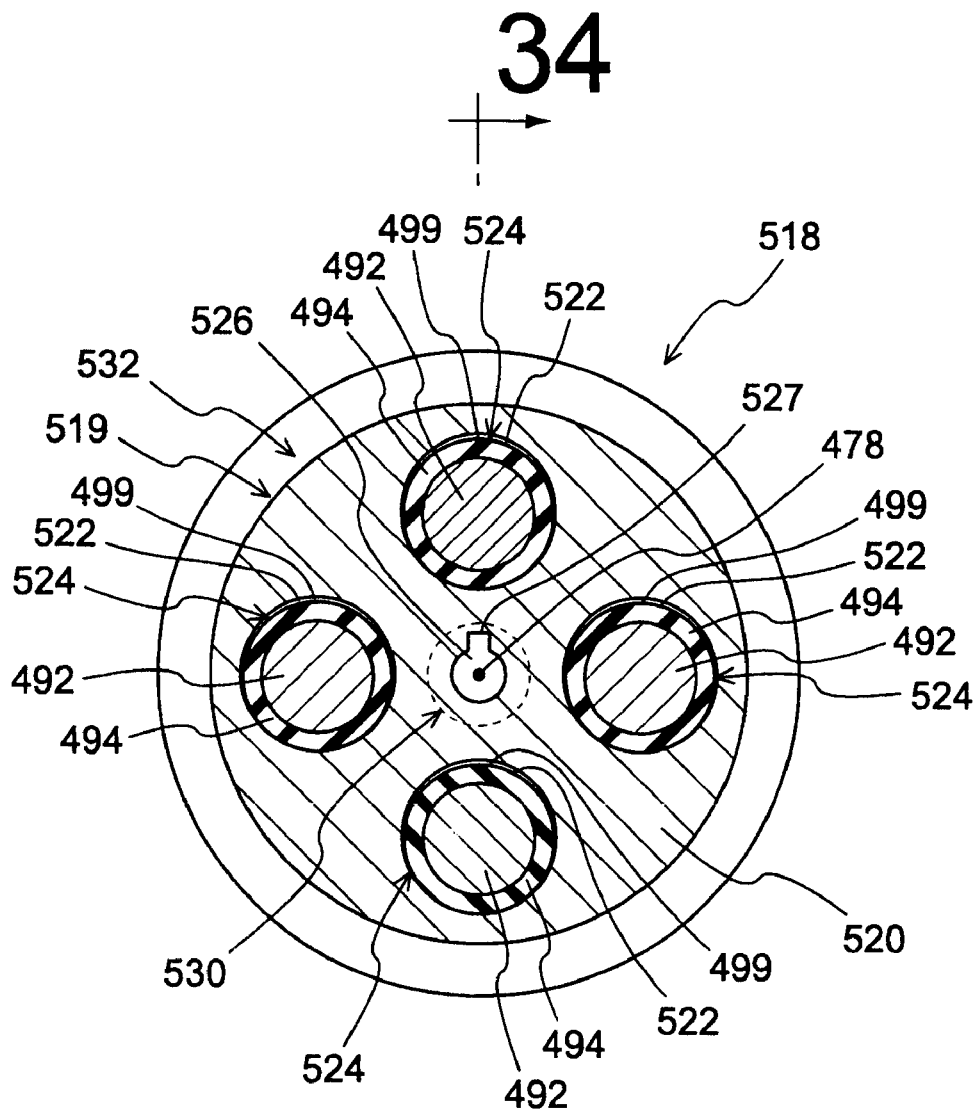
FIG. 33 is an elevational view in transverse cross section of a vibration damper for vehicles constructed according to a eighteenth embodiment of the present invention, taken along line 33—33 of FIG. 34.
Figure 34:
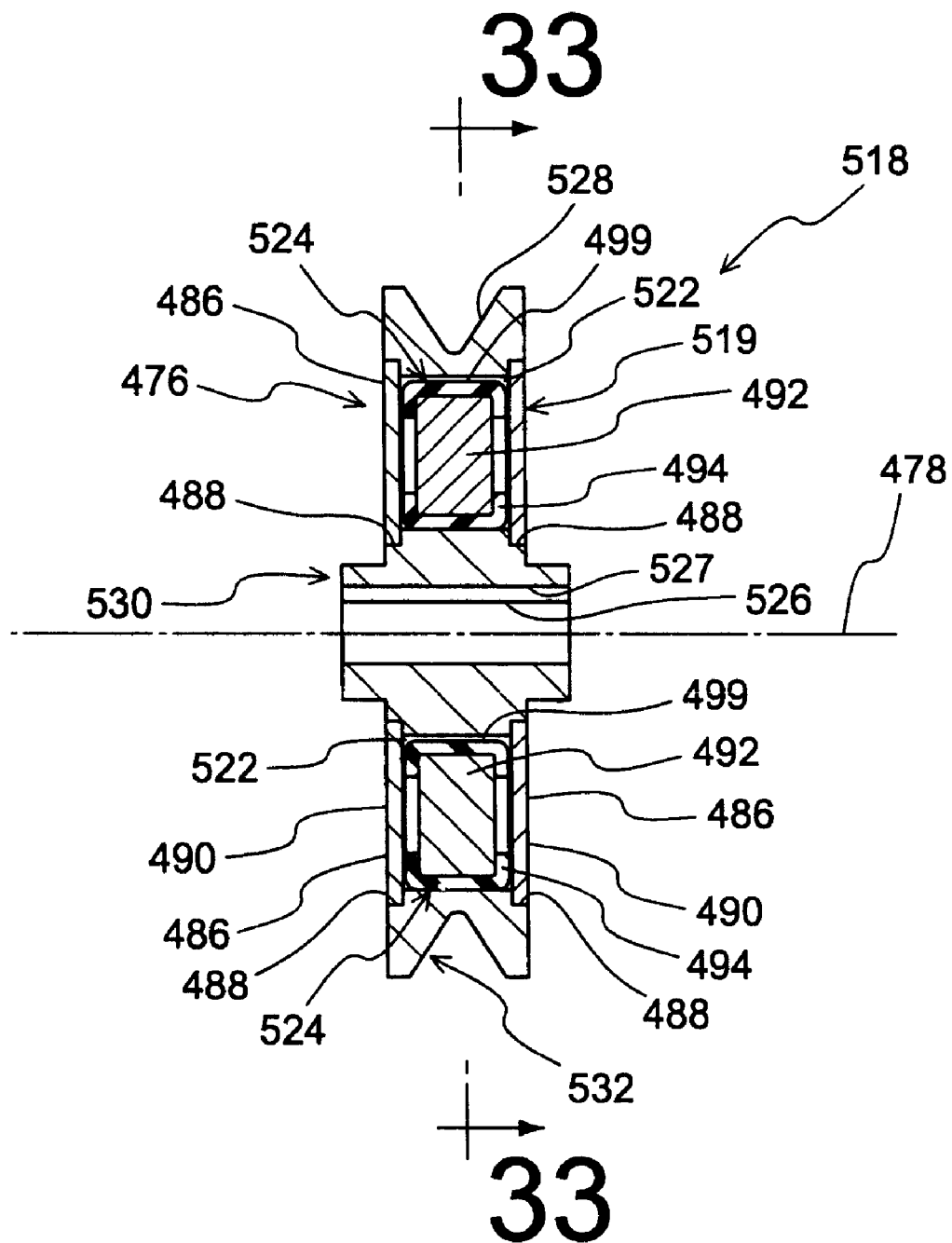
FIG. 34 is a cross sectional view taken along line 34—34 of the vibration damper of FIG. 33.

Referring next to FIGS. 33–34, there is shown a pulley 518 as a vibration damper for an automotive vehicle, which is constructed according to an eighteenth embodiment of the present invention. In the following description, the same reference numerals as used in the sixteenth embodiment of FIGS. 29 and 30 are used to identify the structurally or functionally corresponding elements, which will not be described to avoid redundant explanation.

The pulley 518 of the present embodiment includes a pulley body 520 having a plurality of interior spaces 522 and a plurality of independent mass members 524 accommodated within the plurality of interior spaces 522, respectively.

Described in detail, the pulley body 520 is made of a rigid material such as steel, and has a disk shape as a whole. In the central portion of the pulley body 520, there is formed a fixing bore 526 extending therethrough in the axial direction. The pulley body 520 further includes a keyway 527 extending in the axial direction and open in the inner circumferential surface of the pulley body 520. The pulley body 520 is disposed radially outwardly on and fixed to the outer circumferential surface of a rotational shaft (not shown) such that a key formed on the outer circumferential surface of the rotational shaft is fitted into the keyway 527, SO that the pulley body 520 is fixed to the rotational shaft so as not to rotate relative to the rotational shaft. The pulley 518 yet further includes a circumferential V-shaped groove 528 formed at and open in the outer circumferential surface thereof, for receiving a V-belt disposed around the pulley body 520. The pulley body 520 is fixed to the rotational shaft at its boss 530. In this condition, the pulley body 520 is adapted to transmit a rotational power between the rotational shaft and the V-belt.

Like the sixteenth embodiment, a plurality of interior spaces 522 (e.g., four interior spaces 522 in this embodiment) are formed in the radially intermediate portion of the pulley body 520. Each of the interior spaces 522 accommodates one of the plurality of independent mass members 524, in a movable and non-bonded state. The independent mass member 524 has an outside configuration which is made similar to and slightly smaller than the configuration of the interior space 522. With the independent mass member 524 located in the central portion of the interior space 522, the independent mass member 524 is opposed to the inner surface of the interior space 522 with the spacing 499 therebetween over the entire surface thereof. In this condition, the independent mass member 524 is independently displaceable by the given spacing, upon application of vibrations to the pulley 518. In this embodiment, the pulley body 520 and the cover members 486 cooperate to define a housing 519.

Accordingly, the pulley 518 as a vibration damper can exhibit high damping effect with respect to bending vibrations applied in the diametric direction and torsional vibrations applied in the circumferential direction about the rotation axis 478, which vibrations are excited in the pulley 518 itself and the rotational shaft to which the pulley 518 is fixed.

In the pulley 518 of the present embodiment, the provision of the independent mass member 524 in the pulley body 520 does not interferer the above-indicated rotational power transmitting path, whereby the pulley 518 can exhibit an excellent power transmitting capacity, and high durability.

As is apparent from the foregoing description regarding from the fourteenth through eighteenth embodiments of the present invention, the vibration dampers of the present invention can exhibit an excellent damping effect with respect to vibrations applied in the diametric direction perpendicular to the rotation axis and in the circumferential direction about a center axis of the rotation axis. It should be noted that the vibration dampers may also exhibit a high damping effect with respect to the vibration applied in the axial direction along with the rotation axis, based on the impact between the independent mass members and the housing.

In the aforementioned fourteenth through eighteenth embodiments, the plurality of independent mass members are arranged in the circumferential direction at regular intervals. These independent mass members may be connected to each other in the circumferential direction to be integrated. For instance, the vibration damper 442 constructed according to the fifteenth embodiment as shown in FIGS. 27 and 28, may be modified as follows: The inner circumferential portion of the each independent mass member 458 extends in the opposite circumferential directions to provide a rigid connecting portion which extend through a radial gap between the partition wall portion 452 and the drive shaft 418. The independent mass members 458 are connected with each other at their connecting portion, whereby the four independent mass members 458 are integrally connected with each other in the circumferential direction. Alternatively, the independent mass members used in the fourteenth and eighteenth embodiments of the present invention may be integrally connected to each other such that at least one of opposite axial ends of the independent mass members are connected to each other, to thereby provide a single rigid independent mass member. When such a single independent mass member is employed, a plurality of vibration dampers are disposed on the rotation axis such that the plurality of vibration dampers are spaced apart from each other in the axial direction.

In the vibration dampers constructed according to the fourteenth through eighteenth embodiments of the present invention, the outside configuration of the independent mass member is made similar to the configuration of the inner surface of the housing member which defines the interior space. This arrangement may be desirably changed, provided the stability of the impact between the each independent mass member and the housing can be established. For instance, each of the vibration dampers 410, 460, 500, 518 constructed according to the fourteenth and sixteenth through eighteenth embodiments, may be modified such that, the configuration of the inner surface of the housing is changed into a rectangular shape in cross section. This leads to an increase of the displacement and impact of the independent mass member relative to the housing in the circumferential direction, whereby the each vibration damper exhibits further improved damping effect with respect to vibrations applied in the circumferential direction.

In the above-described vibration dampers constructed according to the first though eighteenth embodiments, the abutting surfaces of the independent mass members and the housings may be arranged to have a low friction structure, or may be subjected to a surface treatment to lower their coefficients of friction, as needed. Preferably, the abutting surfaces of the independent mass members and the housings have a coefficient of kinetic friction of not greater than 0.4.

In order to lower the coefficient of kinetic friction between the abutting surfaces of the independent mass members and the housings, the abutting surfaces may be made by vulcanization of a rubber material selected from natural rubber or diene rubbers having a double bond in a primary chain, such as isoprene rubber, and the vulcanized rubber is subjected to a surface hardening treatment based on chlorination, namely executed by dropping the vulcanized rubber to a hydrochloric acid aqueous solution having a predetermined concentration of the hydrochloric acid. As a result of the surface hardening treatment, a chlorine layer (i.e., a replacement of the double bond by the chlorine) is formed on the outer surface of the rubber elastic body. The thickness of the chlorine layer is preferably determined within a range of 2–3 $\mu$m. Such a surface hardening treatment using the hydrochloric acid may be performed on only a rubber member constituting the abutting surface. When the abutting elastic body is bonded to the rigid, e.g., metallic mass body, the abutting elastic body is subjected to the surface hardening treatment, and then is secured to the surface of the mass body.

Alternatively, the abutting elastic body may be covered with a thin-resin layer formed on and secured to the entire surface of the abutting elastic body. For instance, the vibration damper 10 constructed according to the sixth embodiment of the present invention, the coating rubber layer 34 is bonded by vulcanization to the entire surface of the metallic mass body 32. Fine particles of polyamide synthetic resins such as nylon are applied and stuck on the outer surface of the coating rubber layer 34, by means of electrostatic coating. The particles of the polyamide synthetic resins are fused by heat application, e.g., by heat ray irradiation or by induction heating, whereby the particles of nylon are fused together to form a thin layer secured to the surface of the coating rubber layer 34.

In order to lower the coefficient of kinetic friction between the abutting surfaces of the independent mass members and the housings, the surface of the abutting elastic body may be covered by a thin nylon layer secured thereto, preferably. This arrangement permits low friction characteristics of the surface of the abutting elastic body owing to the physical properties of nylon. In this respect, such a resin coating layer can be formed on the abutting elastic body with a sufficiently reduced thickness, whereby the independent mass member can exhibits a sufficient elasticity with respect to the housing owing to the elasticity of the abutting elastic body, even if the resin coating layer is formed on the surface of the abutting elastic body.

Further arrangement for lowering the coefficient of kinetic friction between the abutting surfaces of the independent mass members and the housings may be considered. For example, the abutting surface of the housing is covered by a solid lubricating coating layer made of a resin material having a low friction coefficient, more preferably is a solid-lubricating layer formed of a fluororesin by baking coating. The arrangement makes it possible to decrease coefficient of friction of the abutting surface of the housing with ease, even in the case where the abutting surface of the housing is constituted by a metallic member.

Even in the case where the abutting surface of the housing is subjected to any one of the above-indicated surface treatment for lowering the coefficient of friction thereof, the abutting surface of the abutting elastic body is also subjected to such a surface treatment for lowering the coefficient of friction thereof, preferably. To this end, it is effective to form the overall abutting elastic body of a rubber composition including a known rubber material such as butyl rubber or chlorine rubber and polytetorafluoroethylene.

In the vibration dampers which are constructed according to the first through eighteenth embodiments of the present invention, and which are subjected to the above-indicated surface treatment of the abutting surfaces thereof, the kinetic friction between the abutting surfaces of the independent mass member and the housing is not greater than 0.4, preferably. In this arrangement, the independent mass member is likely to be displaced relative to the housing, resulting in high damping effect based of the vibration damping devices based on the impact of the independent member against the housing.

EXAMPLES

To further clarify the above-described effects of lowered coefficient of kinetic friction between the abutting surfaces of the independent member and the housing of the vibration damper constructed according to the present invention, there will be described in detail some specimens of the abutting surfaces used in the vibration damper of the present invention. However, it is to be understood that the present invention is by no means limited to the details of these examples, but may be embodied with various changes modifications and improvements which may occur to those skilled in the art, without departing the scope of the invention.

Example 1

Initially, two rubber blocks as test samples were prepared by vulcanizing natural rubber. One of the obtained rubber blocks was subjected to cleaning, and then was subjected to a hydrochloric acid treatment by being immerged in a 25% hydrochloric acid aqueous solution, or a 25% soda hypochlorous acid aqueous solution. Subsequently, the rubber block were subjected to cleaning, neutralization, cleaning, washing with hot water, and drying in the order of description. The two obtained rubber block as the test samples were measured in terms of conditions of chlorination, coefficient of frequency, and physical properties as a rubber. The measurement is indicated in Table 1.

TABLE 1

| | CHLORINE LEVEL IN RUBBER BLOCK SURFACE (cps) | THICKNESS OF CHLORINE LAYER ON RUBBER BLOCK SURFACE ($\mu$m) | COEFFICIENTS OF FRICTION | | PHYSICAL PROPERTIES OF RUBBER BLOCK | | |
|---|---|---|---|---|---|---|---|
| | | | $\mu s$ | $\mu k$ | $H_S$ (JIS: A) | $T_B$ (MPa) | $E_B$ (%) |
| UNTREATED | 200 | | 1.7 | 1.3 | 76 | 16 | 270 |
| HYDROCHLORIC ACID TREATMENT PERFORMED | 10800 | 2~3 | 0.4 | 0.3 | 76 | 15 | 220 |

In Table 1, the chlorine level in the surface of each rubber block and the thickness of chlorine layer formed on the each rubber block were measured by means of an electron probe X-ray microanalyzer (EPMA). Both of a coefficient of kinetic friction ($\mu k$) and a coefficient of static friction ($\mu s$) of each rubber block were measured. The physical properties of each rubber block were measured in terms of hardness (Hs: JIS-A), tensile strength ($T_B$: MPa), and elongation ($E_B$: %).

As is apparent from the measurement indicated in Table 1, the hydrochloric acid treatment makes it possible to establish a remarkable decrease in the coefficient of kinetic friction of the rubber blocks, while maintaining sufficiently the physical properties of the rubber blocks.

Example 2

Initially, a rubber block as a test sample was prepared by vulcanizing natural rubber. The obtained rubber block was subjected to cleaning. Charged particles of nylon were dispersed on the surface of the rubber block by electrostatic coating. The rubber block covered by the particles of nylon was subjected to baking in 220° C. atmosphere, whereby a resin coating layer is formed on and secured to the surfaces of the rubber blocks.

The obtained rubber block was measured in terms of a coefficient of kinetic friction, according to the same manner as in the Example 1. The measurement was 0.15. As a comparative example, a rubber block formed of natural rubber by vulcanization was prepared with no resin-coating layer, and was measured about a coefficient of kinetic friction. The measurement was 1.2. The physical properties of both of the rubber blocks were also measured according to the same manner as in the Example 1, and revealed that there is no significant difference between the Example 2 and the comparative example.

As is apparent from the measurement with respect to the Example 2, the resin coating layer formed on the rubber block makes it possible to establish a remarkable decrease in the coefficient of kinetic friction of the rubber blocks, while maintaining sufficiently the physical properties of the rubber blocks.

Example 3

Initially, a rubber block as a test sample was prepared by vulcanizing a rubber composition which is prepared by adding 20 parts by weight of fluororesin to 100 parts by weight of natural rubber. As a comparative example, a rubber block was prepared by vulcanizing natural rubber only.

The both rubber blocks were measured in terms of a coefficient of kinetic friction, according to the same manner as in the Example 1. The measurement of Example 3 was 0.03, while the measurement of the comparative example was 0.95. The physical properties of both of the rubber blocks were also measured according to the same manner as in the Example 1, and revealed that there is no significant difference between the Example 3 and the comparative example.

As is apparent from the measurement with respect to the Example 3, the addition of the fluororesin to the rubber material makes it possible to establish a remarkable decrease in the coefficient of kinetic friction of the rubber blocks, while maintaining sufficiently the physical properties of the rubber blocks.

As is understood from the foregoing description of the presently preferred embodiments of the invention, the vibration damper of the present invention includes the plurality of independent mass member each of which is forced to elastically impact against the housing member and easily bounces off the housing member based on elasticity of the independent mass member. The each independent mass member has a mass that is sufficiently made smaller, further facilitating the bouncing displacement of the independent mass member. Accordingly, the vibration damper of the present invention ensures the elastic impact of the independent mass members on the housing member, even in the case where the independent mass member is installed in a vibrative member of an automotive vehicle, which is prone to excite vibrations have a relatively small vibration energy. Thus, the vibration damper of the present invention is capable of exhibiting an excellent damping effect with respect to the vibrations to be desirably damped in the vehicle, based on the impact of the independent mass member on the housing member.

While the presently preferred embodiments of the invention have been described above in detail for illustrative purpose only, it is to be understood that the invention is not limited to the details of these illustrated embodiments, but may be embodied with various other changes, modifications, and improvement which may occur to those skilled in the art, without departing from the spirit and scope of the invention defined in the following claims:

What is claimed is:

1. A vibration-damping device for damping vibrations of a vibrative member of a vehicle, comprising:
    at least one rigid housing member being fixable to the vibrative member; and
    a plurality of independent mass members disposed non-adhesively and independently in said at least one housing member such that each of said plurality of independent mass members is opposed to said at least one housing member with a given spacing therebetween in a vibration input direction, and is displaceable relative to said at least one housing member,
    said each of said plurality of independent mass members being independently displaceable relative to said at least one housing member so that said each of said plurality of independent mass members and said housing member are brought into elastic impact against each other at respective abutting surfaces thereof which are opposed to each other in said vibration input direction.

2. A vibration-damping device according to claim 1, wherein at least one of surfaces of at least one of said plurality of independent mass members and said housing member is covered by a coating rubber layer formed thereon by coating said at least one of surfaces with a liquid rubber so that at least one of said abutting surfaces of said at least one of said plurality of independent mass members and said housing member is formed of said coating rubber layer.

3. A vibration-damping device according to claim 1, wherein the vibrative member comprises a rotational member which is rotatable about a center axis thereof, and said housing member is fixable to said rotational member, said abutting surfaces of said at least one of said plurality of independent mass members and said housing member being opposed to each other in a circumferential direction about said center axis of said rotational member.

4. A vibration-damping device according to claim 3, wherein said plurality of independent mass members are disposed with respect to said rotational member such that said plurality of independent mass members are spaced apart from each other in said circumferential direction about said center axis, and that a center of gravity of overall of said plurality of independent mass members is located on said center axis of said rotational member, upon rotation of said rotational member about said center axis.

5. A vibration-damping device according to claim 4, wherein each of said plurality of independent mass members includes two circumferentially opposite end portions which are opposed to each other in said circumferential direction about said center axis of said rotational member and which serve as said abutting surfaces of said each of plurality of independent mass members, said each of said plurality of independent mass members being brought into elastic impact at said circumferentially opposite abutting surfaces thereof against said housing member in said circumferential direction about said axis of said rotational member.

6. A vibration-damping device according to claim 5, wherein at least one of said plurality of independent mass members is constituted by an arcuate block member which extends parallel to said rotation axis of said rotational member with an arc cross sectional shape which extends in the circumferential direction of said rotational member with a given circumferential length.

7. A vibration-damping device according to claim 6, wherein at least one of said plurality of independent mass members is constituted by a solid rod having a circular cross sectional shape and extending parallel to said center axis of said rotational member.

8. A vibration-damping device according to claim 3, wherein said housing member is at least partially constituted by utilizing said rotational member.

9. A vibration-damping device according to claim 3, wherein said rotational member comprises a power transmitting rotational disk extending in a direction perpendicular to said center axis, said plurality of independent mass members being disposed in said at least one housing member fixable to a radially intermediate portion of said rotational disk.

10. A vibration-damping device according to claim 3, wherein at least one of said plurality of independent mass members is constituted by an annular mass member continuously extending in said circumferential direction of said rotational member, said abutting surfaces of said annular mass member and said housing member being opposed to each other in said circumferential direction of said rotational member and being brought into elastic impact against each other in the circumferential direction.

11. A method of manufacturing a vibration-damping device defined in claim 2, comprising a step of:
    forming said coating rubber layer on said at least one surfaces of said at least one of said plurality of independent mass members and said housing member, by coating said at least one surfaces with a liquid rubber.

12. A method of manufacturing a vibration-damping device according to claim 11, wherein said step of forming said coating rubber layer on said at least one surfaces of said at least one of said plurality of independent mass members and said at least one housing member, is executed a plurality of times to thereby form a lamination of said coating rubber layer.

13. A vibration-damping device according to claim 2, wherein said abutting surface of said at least one of said plurality of independent mass members is covered by said coating rubber layer, and having a chamfered corner.

14. A vibration-damping device according to claim 2, wherein said coating rubber layer has a thickness within a range of 0.03–0.5 mm.

15. A vibration-damping device according to claim 2, wherein said at least one of said plurality of independent mass members is partially covered by said coating rubber layer, and is exposed to the atmosphere at a portion which does not constitute said abutting surface thereof.

16. A vibration-damping device according to claim 2, wherein the vibrative member comprises a rotational member which is rotatable about a center axis thereof, and said housing member is fixable to said rotational member, said abutting surfaces of said at least one of said plurality of independent mass members and said housing member being opposed to each other in a circumferential direction about said center axis of said rotational member.

17. A vibration-damping device according to claim 1, wherein at least one of said plurality of independent mass members is arranged such that at least one of said abutting surface of said independent mass members and the abutting surface of said at least one housing member is formed of a rubber elastic body, said at least one of said plurality of independent mass members and said housing member being brought into impact against each other via said rubber elastic body, with a coefficient of kinetic friction of 0.4 or lower between the abutting surfaces thereof.

18. A vibration-damping device according to claim 17, wherein said rubber elastic body is subjected to a surface treatment by hydrochloric acid.

19. A vibration-damping device according to claim 17, wherein said rubber elastic body being coated by a low-frictional thin resin layer secured thereto.

20. A vibration-damping device according to claim 17, wherein said rubber elastic body is made of a rubber composition which contains at least one of mica, polytetorafluoroethylene, and graphite.

21. A vibration-damping device according to claim 17, wherein said abutting surface of said at least one of said plurality of independent mass members is formed of said elastic rubber body, while said abutting surface of said housing member is covered by a solid coating layer made of a resin material having a low friction coefficient.

22. A vibration-damping device according to claim 17, wherein said at least one of said plurality of independent mass members and said housing member are opposed to each other at respective surfaces which are opposed to each other in said vibration input direction, at least one of said surfaces of said at least one of said plurality of independent members and said housing member having a partially protruding portion protruding toward an other one of said surface, a protruding end face of said protruding portion serving as said abutting surface, said abutting surface being formed of said rubber elastic body, and a coefficient of kinetic friction between said abutting surfaces of said at least one of said plurality of independent mass members and said at least one housing member is set to 0,4 or lower.

23. A vibration-damping device according to claim 17, wherein at least one of surfaces of at least one of said independent mass members and said housing member is covered by a coating rubber layer formed thereon by coating said at least one of surfaces with a liquid rubber so that at least one of said abutting surfaces of said at least one of said plurality of independent mass members and said housing member is formed of said coating rubber layer.

24. A vibration-damping device according to claim 17, wherein the vibrative member comprises a rotational member which is rotatable about a center axis thereof, and said housing member is fixable to said rotational member, said abutting surfaces of said at least one of said plurality of independent mass members and said housing member being opposed to each other in a circumferential direction about said center axis of said rotational member.

25. A vibration-damping device according to claim 1, wherein at least one of said plurality of independent mass member includes at least one abutting projection in the form of a projection or a ridge which is formed at a surface thereof which are opposed to said housing member in the vibration input direction, said at least one abutting projection being made of an elastic material, protruding toward the housing member in the vibration input direction, and having a protruding end portion serving as said abutting surface of said independent mass member.

26. A vibration-damping device according to claim 25, wherein said at least one independent mass members includes a rigid mass body, said abutting projection formed of an elastic material being formed on an outer circumferential surface of said rigid mass body.

27. A vibration-damping device according to claim 26, wherein said at least one of said plurality of independent mass members further includes an elastic layer formed on and bonded to said circumferential surface of said rigid mass body with a generally constant thickness, said abutting projection being integrally formed on an outer surface of said elastic layer.

28. A vibration-damping device according to claim 25, wherein said at least one abutting projection has a height within a range of 0.5–1.0 mm and a width within a range of 1.0–3.0 mm.

29. A vibration-damping device according to claim 25, wherein said protruding end portion of said at least one abutting projection has a tapered shape.

30. A vibration-damping device according to claim 25, wherein said at least one of said plurality of independent mass members is a longitudinally extended member, and said abutting projection is a ridge formed on the outer circumferential surface of said at least one of said plurality of independent mass members and continuously extending in a circumferential direction of said at least one of said plurality of independent mass members.

31. A vibration-damping device according to claim 25, wherein said at least one of said plurality of independent mass members includes a rigid mass body longitudinally extending with a constant cross sectional shape, and said abutting projection is formed of an elastic ring inserted onto an outer circumferential surface of said rigid mass body.

32. A vibration-damping device according to claim 25, wherein at least one of said plurality of independent mass members is arranged such that at least one of said abutting surface of said at least one of said plurality of independent mass members and the abutting surface of said housing member is formed of a rubber elastic body, said at least one of said independent mass members and said housing member being brought into impact against each other via said rubber elastic body, with a coefficient of kinetic friction of 0.4 or lower between said abutting surfaces thereof.

33. A vibration-damping device according to claim 25, wherein at least one of surfaces of at least one of said independent mass members and said housing member is covered by a coating rubber layer formed thereon by coating said at least one of surfaces with a liquid rubber so that at least one of said abutting surfaces of said at least one of said plurality of independent mass members and said housing member is formed of said coating rubber layer.

34. A vibration-damping device according to claim 25, wherein the vibrative member comprises a rotational member which is rotatable about a center axis thereof, and said housing member is fixable to said rotational member, said abutting surfaces of said at least one of said plurality of independent mass members and said housing member being opposed to each other in a circumferential direction about said center axis of said rotational member.

35. A vibration-damping device according to claim 1, wherein at least one of said plurality of independent mass members has a flat-plate shape, and said housing member includes an accommodation space for accommodating said flat-plate shaped independent mass member, said flat-plate shaped independent mass member having opposite surfaces thereof which are opposed to each other in a thickness direction thereof, and which are opposed to respective portions of an inner surface of said housing member in said vibration input direction, at least one of each of said opposite surfaces of said flat-plate shaped independent mass member and the corresponding opposed portion of said inner surface of said housing member including a partially protruding portion having a plane protruding end face which serves as said abutting surface.

36. A vibration-damping device according to claim 35, wherein said opposite surfaces of said flat-plate shaped independent mass member include partially protruding portions, respectively.

37. A vibration-damping device according to claim 35, wherein said flat-plate shaped independent mass member having a rectangular shape, and including said partially protruding portions formed at longitudinally opposite end portions thereof, respectively.

38. A vibration-damping device according to claim 35, wherein said flat-plate shaped independent mass member includes: a flat-plate shaped mass body made of metal and having opposite plane surfaces which are opposed to each other in a thickness direction thereof, and which are opposed to respective portions of said inner surface of said housing member in said vibration input direction; and an elastic layer formed on and secured to a surface of said flat-plate mass body, said partially protruding portion being formed of said elastic layer.

39. A vibration-damping device according to claim 35, wherein at least one of said plurality of independent mass members includes at least one abutting projection in the form of a projection or a ridge which is formed at a surface thereof which are opposed to said housing member in the vibration input direction, said at least one abutting projection being made of an elastic material, protruding toward the housing member in the vibration input direction, and having a protruding end portion serving as said abutting surface of said independent mass member.

40. A vibration-damping device according to claim 35, wherein at least one of said plurality of independent mass members is arranged such that at least one of said abutting surface of said at least one of said plurality of independent mass members and the abutting surface of said housing member is formed of a rubber elastic body, said at least one of said independent mass members and said housing member being brought into impact against each other via said rubber elastic body, with a coefficient of kinetic friction of 0.4 or lower between the abutting surfaces thereof.

41. A vibration-damping device according to claim 35, wherein at least one of surfaces of at least one of said independent mass members and said housing member is covered by a coating rubber layer formed thereon by coating said at least one of surfaces with a liquid rubber so that at least one of said abutting surfaces of said at least one of said plurality of independent mass members and said housing member is formed of said coating rubber layer.

42. A vibration-damping device according to claim 35, wherein the vibrative member comprises a rotational member which is rotatable about a center axis thereof, and said housing member is fixable to said rotational member, said abutting surfaces of said at least one of said plurality of independent mass members and said housing member being opposed to each other in a circumferential direction about said center axis of said rotational member.

43. A vibration-damping device according to claim 1, wherein a total mass of said plurality of independent mass members is held within a range of 5–10% of a mass of the vibrative member.

44. A vibration-damping device according to claim 1, wherein said each of said plurality of independent mass members has a mass within a range of 10–1000 g.

45. A vibration-damping device according to claim 1, wherein said plurality of independent mass members comprise at least two of said independent mass members, said at least two of said independent mass members being identical with each other.

46. A vibration-damping device according to claim 1, wherein at least one of said plurality of independent mass members is tuned differently from the other independent mass members.

47. A vibration-damping device according to claim 1, wherein at least one of said plurality of independent mass members includes a mass body made of a rigid material.

48. A vibration-damping device according to claim 1, wherein said at least one housing member includes a space for accommodating at least one of said plurality of independent mass members, which space is separated from the external space.

49. A vibration-damping device according to claim 1, wherein said at least one housing member is formed with a plurality of through holes which are independent of each other and extend parallel to each other, each of said through holes being adapted to accommodate at least one of said plurality of independent mass members.

50. A vibration-damping device according to claim 1, wherein said at least one housing member has a supporting rod, and at least one of said plurality of independent mass members has an annular block shape and is disposed radially outwardly of said supporting rod of said housing member, said at least one of said plurality of independent mass members being brought into elastic impact against an outer circumferential surface of said supporting rod, upon application of a vibrational load.

51. A vibration-damping device according to claim 1, wherein a plurality of said independent mass members are connected with each other via a flexible connecting member such that said plurality of said independent mass members are separately displaceable relative to each other, and said at least one housing member having a plurality of accommodation spaces which are substantially continuous with each other and cooperate to accommodate said plurality of said independent mass members.

52. A vibration-damping device according to claim 1, wherein at least one of said abutting surfaces of said housing member and said each of said plurality of independent mass members has a Shore D hardness of 80 or lower, as measured in accordance with ASTM method D-2240.

53. A vibration-damping device according to claim 1, wherein said housing member is formed of a rigid material having a modulus of elasticity of $5 \times 10^3$ MPa or more.

54. A vibration-damping device according to claim 1, wherein said given spacing between said abutting surface of said each of said plurality of independent mass members and said abutting surface of said at least one housing member has a distance within a range of 0.05–0.8 mm, and said each of said plurality of independent mass members may be reciprocally movable by a distance of 0.1–1.6 mm between at least two abutting surfaces of said housing member which are opposed to each of said plurality of other with said each independent mass member therebetween in said vibration input direction.

55. A vibration-damping device according to claim 1, wherein said housing member is at least partially constructed by the vibrative member.

56. A vibration-damping device according to claim 1, wherein said abutting surfaces of said each of said plurality of independent mass members and said housing member are opposed to each other at least in a vertical direction.

57. A vibration-damping device according to claim 1, wherein said plurality of independent mass members comprise at least three of said independent mass members, said at least three of said independent mass members being identical with each other.

58. A vibration-damping device for damping vibrations of a vibrative member of a vehicle, comprising:

at least one rigid housing member being fixable to the vibrative member; and a plurality of independent mass members disposed non-adhesively and independently in said at least one housing member such that each of said plurality of independent mass members is opposed to said at least one housing member with a given spacing therebetween in a vibration input direction, and is displaceable relative to said at least one housing member, wherein said each of said plurality of independent mass members is independently displaceable relative to said at least one housing member so that said each of said plurality of independent mass members and said housing member are brought into elastic impact against each other at respective abutting surfaces thereof which are opposed to each other in said vibration input direction, and wherein said abutting surface of said each of said plurality of independent mass members is formed of an elastic body.

* * * * *